United States Patent
Noyes

(10) Patent No.: US 9,896,341 B2
(45) Date of Patent: Feb. 20, 2018

(54) METHODS OF FORMING CARBON NANOTUBES HAVING A BIMODAL SIZE DISTRIBUTION

(71) Applicant: Seerstone LLC, Provo, UT (US)

(72) Inventor: Dallas B. Noyes, Provo, UT (US)

(73) Assignee: SEERSTONE LLC, Provo, UT (US)

( * ) Notice: Subject to any disclaimer, the term of this patent is extended or adjusted under 35 U.S.C. 154(b) by 0 days.

(21) Appl. No.: 14/389,015

(22) PCT Filed: Mar. 15, 2013

(86) PCT No.: PCT/US2013/000079
§ 371 (c)(1),
(2) Date: Sep. 29, 2014

(87) PCT Pub. No.: WO2013/162650
PCT Pub. Date: Oct. 31, 2013

(65) Prior Publication Data
US 2015/0064097 A1 Mar. 5, 2015

Related U.S. Application Data

(60) Provisional application No. 61/637,229, filed on Apr. 23, 2012.

(51) Int. Cl.
*C01B 31/02* (2006.01)
*C01B 32/16* (2017.01)
(52) U.S. Cl.
CPC .......... *C01B 32/16* (2017.08); *C01P 2004/53* (2013.01)
(58) Field of Classification Search
CPC .... C01B 31/0233; C01B 2202/00; B82B 1/00
See application file for complete search history.

(56) References Cited

U.S. PATENT DOCUMENTS

| 1,478,730 | A | 12/1923 | Brownlee |
| 1,735,925 | A | 11/1929 | Jaeger |

(Continued)

FOREIGN PATENT DOCUMENTS

| EP | 0945402 A1 | 9/1999 |
| EP | 2186931 A1 | 5/2010 |

(Continued)

OTHER PUBLICATIONS

Baddour, Carole E., et al. "A simple thermal CVD method for carbon nanotube synthesis on stainless steel 304 without the addition of an external catalyst." Carbon 47.1 (2009): 313-318.*

(Continued)

*Primary Examiner* — Richard M Rump
(74) *Attorney, Agent, or Firm* — TraskBritt, P.C.

(57) ABSTRACT

A composition comprising a mixture of carbon nanotubes having a bi-modal size distribution are produced by reducing carbon oxides with a reducing agent in the presence of a catalyst. The resulting mixture of nanotubes include a primary population of multiwall carbon nanotubes having characteristic diameters greater than 40 nanometers, and a secondary population of what are apparently single wall nanotubes with characteristic diameters of less than 30 nanometers. The resulting mixture may also contain one or more other allotropes and morphologies of carbon in various proportions. The mixture of carbon nanotubes has specific apparently uncommon properties, including unusual resistivity and density

16 Claims, 71 Drawing Sheets

(56) References Cited

U.S. PATENT DOCUMENTS

| | | |
|---|---|---|
| 1,746,464 A | 2/1930 | Fischer et al. |
| 1,964,744 A | 7/1934 | Odell |
| 2,404,869 A | 7/1946 | Sorrentino |
| 2,429,980 A | 11/1947 | Allinson |
| 2,440,424 A | 4/1948 | Wiegand et al. |
| 2,745,973 A | 5/1956 | Rappaport |
| 2,796,331 A | 6/1957 | Kauffman et al. |
| 2,800,616 A | 7/1957 | Becker |
| 2,811,653 A | 10/1957 | Moore |
| 2,819,414 A | 1/1958 | Sherwood et al. |
| 2,837,666 A | 6/1958 | Linder |
| 2,976,433 A | 3/1961 | Rappaport et al. |
| 3,094,634 A | 6/1963 | Rappaport |
| 3,172,774 A | 3/1965 | Diefendorf |
| 3,249,830 A | 5/1966 | Adany |
| 3,378,345 A | 4/1968 | Bourdeau |
| 3,634,999 A | 1/1972 | Howard |
| 3,714,474 A | 1/1973 | Hoff |
| 3,846,478 A | 11/1974 | Cummins |
| 3,905,748 A | 9/1975 | Cairo et al. |
| 4,024,420 A | 5/1977 | Anthony et al. |
| 4,126,000 A | 11/1978 | Funk |
| 4,197,281 A | 4/1980 | Muenger |
| 4,200,554 A | 4/1980 | Lauder |
| 4,602,477 A | 7/1986 | Lucadamo et al. |
| 4,628,143 A | 12/1986 | Brotz |
| 4,663,230 A | 5/1987 | Tennett |
| 4,710,483 A | 12/1987 | Burk et al. |
| 4,725,346 A | 2/1988 | Joshi |
| 4,727,207 A | 2/1988 | Paparizos et al. |
| 4,746,458 A | 5/1988 | Brotz |
| 4,900,368 A | 2/1990 | Brotz |
| 5,008,579 A | 4/1991 | Conley et al. |
| 5,021,139 A | 6/1991 | Hartig et al. |
| 5,082,505 A | 1/1992 | Cota et al. |
| 5,122,332 A | 6/1992 | Russell |
| 5,133,190 A | 7/1992 | Abdelmalek |
| 5,149,584 A | 9/1992 | Baker et al. |
| 5,187,030 A | 2/1993 | Firmin et al. |
| 5,260,621 A | 11/1993 | Little et al. |
| 5,396,141 A | 3/1995 | Jantz |
| 5,413,866 A | 5/1995 | Baker et al. |
| 5,456,897 A | 10/1995 | Moy et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |
| 5,780,101 A | 7/1998 | Nolan et al. |
| 5,859,484 A | 1/1999 | Mannik et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Margrave et al. |
| 6,843,843 B2 | 1/2005 | Takahashi et al. |
| 6,855,301 B1 | 2/2005 | Rich et al. |
| 6,855,593 B2 | 2/2005 | Andoh |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |

(56) References Cited

U.S. PATENT DOCUMENTS

| | | |
|---|---|---|
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 2001/0009119 A1 | 7/2001 | Murray et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2003/0059364 A1 | 3/2003 | Prilutskiy |
| 2003/0147802 A1 | 8/2003 | Smalley et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0032330 A1 | 2/2006 | Sato |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1* | 8/2007 | Charlier et al. ........... 423/447.1 |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |

(56) References Cited

U.S. PATENT DOCUMENTS

| | | |
|---|---|---|
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0298071 A9 | 12/2011 | Spencer et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2013/0154438 A1 | 6/2013 | Tan Xing Haw |
| 2014/0021827 A1 | 1/2014 | Noyes |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0071848 A1 | 3/2015 | Denton et al. |

FOREIGN PATENT DOCUMENTS

| | | | |
|---|---|---|---|
| EP | 2383255 A1 * | 11/2011 | |
| EP | 2404869 A1 | 1/2012 | |
| JP | 339339 B2 | 10/2002 | |
| JP | 3339339 B2 | 10/2002 | |
| JP | 2004517789 A | 6/2004 | |
| JP | 2004360099 A | 12/2004 | |
| JP | 2005075725 A | 3/2005 | |
| JP | 2005532976 A | 11/2005 | |
| JP | 2007182352 A | 7/2007 | |
| JP | 2007191840 A | 8/2007 | |
| JP | 2010159209 A | 7/2010 | |
| JP | 2011068509 A | 4/2011 | |
| KR | 1020050072056 A | 7/2005 | |
| WO | 0230816 A1 | 4/2002 | |
| WO | 03018474 A1 | 3/2003 | |
| WO | 2004007820 A1 | 1/2004 | |
| WO | 2004096704 A3 | 11/2005 | |
| WO | 2005103348 A1 | 11/2005 | |
| WO | WO 2006003482 A2 * | 1/2006 | ............ B82Y 30/00 |
| WO | 2006003482 A3 | 8/2006 | |
| WO | 2007086909 A3 | 11/2007 | |
| WO | 2007139097 A1 | 12/2007 | |
| WO | 2007126412 A3 | 6/2008 | |
| WO | 2009011984 A1 | 1/2009 | |
| WO | 2006130150 A3 | 4/2009 | |
| WO | 2009122139 A1 | 10/2009 | |
| WO | 2009145959 A1 | 12/2009 | |
| WO | 2010047439 A1 | 4/2010 | |
| WO | 2010087903 A1 | 8/2010 | |
| WO | 2010120581 A1 | 10/2010 | |
| WO | 2011009071 A1 | 1/2011 | |
| WO | 2011020568 A1 | 2/2011 | |
| WO | 2011029144 A1 | 3/2011 | |
| WO | 2010146169 A3 | 4/2011 | |
| WO | 2010124258 A3 | 5/2011 | |
| WO | 2011053192 A2 | 5/2011 | |
| WO | 2013090274 | 6/2013 | |
| WO | 2013158155 | 10/2013 | |
| WO | 2013158155 A1 | 10/2013 | |
| WO | 2013158156 | 10/2013 | |
| WO | 2013158156 A1 | 10/2013 | |
| WO | 2013158157 A1 | 10/2013 | |
| WO | 2013158158 A1 | 10/2013 | |

(56) References Cited

FOREIGN PATENT DOCUMENTS

| | | |
|---|---|---|
| WO | 2013158159 A1 | 10/2013 |
| WO | 2013158160 A1 | 10/2013 |
| WO | 2013158161 | 10/2013 |
| WO | 2013158161 A1 | 10/2013 |
| WO | 2013158438 | 10/2013 |
| WO | 2013158439 | 10/2013 |
| WO | 2013158441 | 10/2013 |
| WO | 2013162650 A1 | 10/2013 |
| WO | 2014011206 | 1/2014 |
| WO | 2014011206 A1 | 1/2014 |
| WO | 2014011631 | 1/2014 |
| WO | 2014011631 A1 | 1/2014 |
| WO | 2014085378 A1 | 6/2014 |

OTHER PUBLICATIONS

Cheung, Chin Li, et al. "Diameter-controlled synthesis of carbon nanotubes." The Journal of Physical Chemistry B 106.10 (2002): 2429-2433.*

Suda, Yoshiyuki, et al. "Growth promotion and etching of carbon nanotubes by carbon dioxide in chemical vapor deposition using methane gas." MRS Proceedings. vol. 1057. Cambridge University Press, 2007.*

Agboola, Adedeji E., et al. "Conceptual design of carbon nanotube processes." Clean Technologies and Environmental Policy 9.4 (2007): 289-311.*

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Baker, B. A. and G. D. Smith "Metal Dusting in a Laboratory Environment—Alloying Addition Effects," Special Metals Corporation, undated.

Baker, B. A. and G. D. Smith, "Alloy Solutions to Metal Dusting Problems in the PetroChemical Industry," Special Metals Corporation, undated.

Bogue, Robert, Powering Tomorrow's Sensor: A Review of Technologies—Part 1, Sensor Review, 2010, pp. 182-186, vol. 30, No. 3.

Cha, S. I., et al., "Mechanical and electrical properties of cross•linked carbon nanotubes," Carbon 46 (2008) 482-488, Elsevier, Ltd.

Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98_APL_72_3282-ChengH M.pdf).

Chun, Changmin, and Ramanarayanan, Trikur A., "Metal Dusting Corrosion of Metals and Alloys," 2007.

Chung, U.C., and W.S. Chung, "Mechanism on Growth of Carbon Nanotubes Using CO—H2 Gas Mixture," Materials Science Forum vols. 475-479 (2005) pp. 3551-3554.

Dai, et al., "Single-wall nanotubes produced by metal-catalyzed disproportionation of carbon monoxide," Chemical Physics Letters 260 (1996) 471-475, Elsevier.

Dresselhaus et al., Carbon Nanotubes Synthesis, Structure, Properties, and Applications. 2001, pp. 1-9, Springer.

Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanotubes—becoming clean," Materials Today, vol. 10, No. 1-2, Jan.-Feb. 2007, Elsevier, pp. 28-35.

Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.

Hiraoka, Tatsuki, et al., "Synthesis of Single- and Double-Walled Carbon Nanotube Forests on Conducting Metal Foils," 9 J. Am. Chem. Soc. 2006, 128, 13338-13339.

Holmes, et al.; A Carbon Dioxide Reduction Unit Using Bosch Reaction and Expendable Catalyst Cartridges; NASA; 1970; available at https://archive.org/details/nasa_techdoc_19710002858.

Huang, Z.P., et al., "Growth of highly oriented carbon nanotubes by plasma-enhanced hot filament chemical vapor deposition," Applied Physics Letters 73:3845-3847, Dec. 28, 1998.

"INCONEL® alloy 693—Excellent Resistance to Metal Dusting and High Temperature Corrosion" Special Metals Product Sheet, 2005.

Kavetsky et al., Chapter 2, Radioactive Materials, Ionizing Radiation Sources, and Radioluminescent Light Sources for Nuclear Batteries, Polymers, Phosphors, and Voltaics for Radioisotope Microbatteries, Edited by Bower et al., 2002, pp. 39-59, CRC Press.

Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

Lal, Archit, "Effect of Gas Composition and Carbon Activity on the Growth of Carbon Nanotubes," Masters Thesis, University of Florida, 2003.

Manasse et al., Schottky Barrier Betavoltaic Battery, IEEE Transactions on Nuclear Science, vol. NS-23, No. 1, Feb. 1976, pp. 860-870.

Manning, Michael Patrick, "An Investigation of the Bosch Process," PhD Dissertation, Massachusetts Institute of Technology, Jan. 1976.

Unknown author, "Metal Dusting," unknown publisher, undated.

Unknown author, "Metal Dusting of reducing gas furnace HK40 tube," unknown publisher, undated.

Muller-Lorenz and Grabke, Coking by metal dusting of steels, 1999, Materials and Corrosion 50, 614-621 (1999).

Nasibulin, Albert G., et al., "An essential role of CO2 and H2O during single-walled CNT synthesis from carbon monoxide," Chemical Physics Letters 417 (2005) 179-184.

Nasibulin, Albert G., et al., "Correlation between catalyst particle and single-walled carbon nanotube diameters," Carbon 43 (2005) 2251-2257.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina• nanofibers-and-composites).

Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.

Ruckenstein, E. and H.Y. Wang, "Carbon Deposition and Catalytic Deactivation during CO2 Reforming of CH4 over CO/?-Al2O3 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.

SAE 820875 Utilization of Ruthenium and Ruthenium-Iron Alloys as Bosch Process Catalysts. Jul. 19-21, 1982.

SAE 911451 Optimization of Bosch Reaction, Jul. 15-18, 1991.

Singh, Jasprit, Semiconductor Devices, An Introduction, 1994, pp. 86-93, 253-269.

Singh, Jasprit, Semiconductor Devices, Basic Principles, Chapter 6, Semiconductor Junctions with Metals and Insulators, 2001, pp. 224-244, Wiley.

Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.

(56) References Cited

OTHER PUBLICATIONS

Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).

Szakalos, P., "Mechanisms and driving forces of metal dusting," Materials and Corrosion, 2003, 54, No. 10, pp. 752-762.

Tsai, Heng-Yi, et al., "A feasibility study of preparing carbon nanotubes by using a metal dusting process," Diamond & Related Materials 18 (2009) 324-327, Elsevier.

Tse, Anthony N., Si—Au Schottky Barrier Nuclear Battery, A Thesis submitted to the Faculty in partial fulfillment of the requirement for the degree of Doctor of Engineering, Thayer School of Engineering, Dartmouth College, Hanover, New Hampshire, Nov. 1972, pp. 31-57.

Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.

Wei, et al. "The mass production of carbon nanotubes using a nano-agglomerate fluidized bed reactor: a multiscale space-time analysis," Powder Technology 183 (2008) 10-20, Elsevier. XP-002719593 Thomson abstract.

Zeng, Z., and Natesan, K., Relationship between the Growth of Carbon Nanofilaments and Metal Dusting Corrosion, 2005, Chem. Mater. 2005, 17, 3794-3801.

PCT International Search Report and Written Opinion, PCT/US2013/000079, dated Jul. 12, 2013.

International Preliminary Report on Patentability, for International Application No. PCT/US2013/000079, dated Oct. 28, 2014, 9 pages.

Wiegand et al., Fabrication of High Strength Metal-Carbon Nanotube Composites, U.S. Army Research and Development, Picatinny, New Jersey, and New Jersey Institute of Technology, Newark, New Jersey, report date Dec. 2008, 6 pages.

Baddour et al., A simple thermal CVD method for carbon nanotube synthesis on stainless steel 304 without the addition of an external catalyst, 2008, Science Direct, Elsevier pp. 313-318.

Notice of Reasons for Rejection, Japanese Patent Application No. 2015-508936, dated Mar. 27, 2017.

\* cited by examiner

| (n,m) Index | E11 (x) | Diameter (nm) | Chiral Angle | E11 (y) | Solution Vector | Abundance (y) | Relative Abundance |
|---|---|---|---|---|---|---|---|
| 8,4 | 8950.00 | 0.84 | 19.11 | 200.65 | 83.21 | 749.20 | 20.3% |
| 6,5 | 10161.76 | 0.76 | 27.00 | 192.97 | 30.86 | 347.27 | 9.4% |
| 13,2 | 7571.83 | 1.12 | 7.05 | 183.70 | 37.37 | 316.85 | 8.6% |
| 7,6 | 8822.57 | 0.89 | 27.46 | 165.68 | 222.57 | 265.74 | 7.2% |
| 7,5 | 9664.89 | 0.83 | 24.50 | 169.41 | 145.23 | 247.24 | 6.7% |
| 8,6 | 8457.11 | 0.97 | 25.29 | 213.19 | 50.50 | 221.55 | 6.0% |
| 12,4 | 7346.74 | 1.15 | 13.90 | 179.56 | 30.27 | 194.99 | 5.3% |
| 10,2 | 9379.09 | 0.88 | 8.95 | 193.51 | 33.41 | 190.32 | 5.2% |
| 11,1 | 7815.90 | 0.92 | 4.31 | 254.94 | 67.99 | 175.82 | 4.8% |
| 10,5 | 7943.83 | 1.05 | 19.11 | 154.94 | 26.33 | 168.56 | 4.6% |
| 12,3 | 9279.81 | 1.01 | 11.74 | 182.70 | 23.22 | 138.10 | 3.8% |
| 9,5 | 7984.13 | 0.98 | 20.63 | 182.46 | 19.93 | 93.98 | 2.6% |
| 11,9 | 6249.94 | 1.38 | 26.70 | 183.64 | 18.86 | 87.96 | 2.4% |
| 8,3 | 10367.29 | 0.78 | 15.30 | 153.28 | 11.31 | 85.17 | 2.3% |
| 9,2 | 8688.32 | 0.81 | 9.83 | 254.56 | 17.82 | 79.38 | 2.2% |
| 15,1 | 7026.50 | 1.23 | 3.20 | 92.68 | 7.68 | 56.61 | 1.5% |
| 12,7 | 6428.45 | 1.32 | 21.36 | 161.15 | 6.73 | 47.58 | 1.3% |
| 14,3 | 6852.02 | 1.25 | 9.52 | 172.58 | 6.50 | 43.00 | 1.2% |
| 11,4 | 7736.42 | 1.07 | 14.92 | 98.93 | 10.30 | 42.50 | 1.2% |
| 8,7 | 7832.60 | 1.03 | 27.80 | 126.94 | 8.76 | 41.27 | 1.1% |
| 12,1 | 8511.82 | 0.99 | 3.96 | 125.66 | 5.79 | 30.20 | 0.8% |
| 12,5 | 6621.14 | 1.20 | 16.63 | 106.84 | 5.01 | 29.97 | 0.8% |
| 9,8 | 7058.33 | 1.17 | 28.05 | 154.82 | 3.14 | 17.40 | 0.5% |
| 9,7 | 7473.05 | 1.10 | 25.97 | 121.50 | 1.85 | 11.47 | 0.3% |

*FIG. 92A*

METHODS OF FORMING CARBON NANOTUBES HAVING A BIMODAL SIZE DISTRIBUTION

PRIORITY CLAIM

This application claims the benefit of the filing date of U.S. Provisional Patent Application Ser. No. 61/637,229, filed Apr. 23, 2012, for "Carbon Nanotubes Having a Bimodal Size Distribution," the disclosure of which is hereby incorporated herein in its entirety by this reference.

TECHNICAL FIELD

Embodiments of the disclosure relate generally to compositions consisting of carbon nanotubes having a wide range of size distributions and having a generally bi-modal size distribution. The disclosure further provides methods for the production of a bi-modal composition comprised substantially of two or more distinct populations of carbon nanotubes, the primary growth population comprised of characteristically significantly larger carbon nanotubes (typically multiwall carbon nanotubes), accompanied by a secondary growth population comprised of characteristically much smaller nanotubes (typically single-wall carbon nanotubes).

BACKGROUND

U.S. Patent Publication No. 2012/0034150 A1, published Feb. 9, 2012, the disclosure of which is hereby incorporated herein in its entirety by this reference, discloses background information hereto.

Additional information is disclosed in the following documents, listing Dallas B. Noyes as inventor, the disclosure of each of which is incorporated herein in its entirety by this reference:
1. International Application No. PCT/US2013/000072, filed on even date herewith, for "Methods and Structures for Reducing Carbon Oxides with Non-Ferrous Catalysts," which claims the benefit of U.S. Ser. No. 61/624,702, filed Apr. 16, 2012, in the name of Dallas B. Noyes;
2. International Application No. PCT/US2013/000076, filed on even date herewith, for "Methods and Systems for Thermal Energy Recovery from Production of Solid Carbon Materials by Reducing Carbon Oxides," which claims the benefit of U.S. Ser. No. 61/624,573, filed Apr. 16, 2012, in the name of Dallas B. Noyes;
3. International Application No. PCT/US2013/000077, filed on even date herewith, for "Methods for Producing Solid Carbon by Reducing Carbon Dioxide," which claims the benefit of U.S. Ser. No. 61/624,723, filed Apr. 16, 2012, in the name of Dallas B. Noyes;
4. International Application No. PCT/US2013/000073, filed on even date herewith, for "Methods and Reactors for Producing Solid Carbon Nanotubes, Solid Carbon Clusters, and Forests," which claims the benefit of U.S. Ser. No. 61/624,753, filed Apr. 16, 2012, in the name of Dallas B. Noyes;
5. International Application No. PCT/US2013/000075, filed on even date herewith, for "Methods for Treating an Offgas Containing Carbon Oxides," which claims the benefit of U.S. Ser. No. 61/624,513, filed Apr. 16, 2012, in the name of Dallas B. Noyes;
6. International Application No. PCT/US2013/000071, filed on even date herewith, for "Methods for Using Metal Catalysts in Carbon Oxide Catalytic Converters," which claims the benefit of U.S. Ser. No. 61/624,848, filed Apr. 16, 2012, in the name of Dallas B. Noyes;
International Application No. PCT/US2013/000081, filed on even date herewith, for "Methods and Systems for Capturing and Sequestering Carbon and for Reducing the Mass of Carbon Oxides in a Waste Gas Stream," which claims the benefit of U.S. Ser. No. 61/624,462, filed Apr. 16, 2012, in the name of Dallas B. Noyes; and
7. International Application No. PCT/US2013/000078, filed on even date herewith, for "Methods and Systems for Forming Ammonia and Solid Carbon Products," which claims the benefit of U.S. Ser. No. 61/671,464, filed Jul. 13, 2012, in the name of Dallas B. Noyes.

Solid carbon has numerous commercial applications. These applications include longstanding uses such as uses of carbon black and carbon fibers as a filler material in tires, inks, etc., many uses for various forms of graphite (e.g., pyrolytic graphite in heat shields) and innovative and emerging applications for buckminsterfullerene and carbon nanotubes. CNTs may be particularly valuable because of their unique material properties, including strength, current-carrying capacity, and thermal and electrical conductivity. Current bulk use of CNTs includes use as an additive to resins in the manufacture of composites. Research and development on the applications of CNTs is very active with a wide variety of applications in use or under consideration. One obstacle to widespread use of CNTs has been the cost of manufacture.

Conventional methods for the manufacture of various forms of solid carbon typically involve the pyrolysis of hydrocarbons in the presence of a suitable catalyst. Hydrocarbons are typically used as the carbon source due to historically abundant availability and relatively low cost. The use of carbon oxides as the carbon source in the production of solid carbon has largely been unexploited.

Carbon oxides, particularly carbon dioxide, are abundant gases that may be extracted from point-source emissions such as the exhaust gases of hydrocarbon combustion or from some process offgases. Carbon dioxide may also be extracted from the air. Because point-source emissions have much higher concentrations of carbon dioxide than does air, they are often economical sources from which to harvest carbon dioxide. However, the immediate availability of air may provide cost offsets by eliminating transportation costs through local manufacturing of solid carbon products from carbon dioxide in air.

Carbon dioxide is also increasingly available and inexpensive as a byproduct of power generation and chemical processes in which an object may be to reduce or eliminate the emission of carbon dioxide into the atmosphere by capture and subsequent sequestration of the carbon dioxide (e.g., by injection into a geological formation). For example, the capture and sequestration of carbon dioxide is the basis for some "green" coal-fired power stations. In current practice, capture and sequestration of the carbon dioxide entails significant cost.

There is a spectrum of reactions involving carbon, oxygen, and hydrogen wherein various equilibria have been identified. Hydrocarbon pyrolysis involves equilibria between hydrogen and carbon that favors solid carbon production, typically with little or no oxygen present. The Boudouard reaction, also called the "carbon monoxide disproportionation reaction," is the range of equilibria between carbon and oxygen that favors solid carbon production, typically with little or no hydrogen present. The Bosch reaction is within a region of equilibria where all of carbon, oxygen, and hydrogen are present under reaction conditions that also favor solid carbon production.

The relationship between the hydrocarbon pyrolysis, Boudouard, and Bosch reactions may be understood in terms of a C—H—O equilibrium diagram, as shown in FIG. 94. The C—H—O equilibrium diagram includes various known routes to solid carbon, including carbon nanotubes ("CNTs"). The hydrocarbon pyrolysis reactions occur on the equilibrium line that connects H and C and in the region near the left edge of the triangle of FIG. 94, to the upper left of the dashed lines. Two dashed lines are shown because the transition between the pyrolysis zone and the Bosch reaction zone may change with reactor temperature. The Boudouard, or carbon monoxide disproportionation reactions, occur near the equilibrium line that connects O and C (i.e., the right edge of the triangle). The equilibrium lines for various temperatures that traverse the diagram show the approximate regions in which solid carbon will form. For each temperature, solid carbon may form in the regions above the associated equilibrium line, but will not generally form in the regions below the equilibrium line. The Boudouard reaction zone appears at the right side of the triangle. See FIG. 94. In this zone, the Boudouard reaction is thermodynamically preferred over the Bosch reaction. In the region between the pyrolysis zone and the Boudouard reaction zone and above a particular reaction temperature curve, the Bosch reaction is thermodynamically preferred over the Boudouard reaction.

U.S. Pat. No. 7,794,690 (Abatzoglou et al.) teaches a dry reforming process for sequestration of carbon from an organic material. Abatzoglou discloses a process utilizing a 2D carbon sequestration catalyst with, optionally, a 3D dry reforming catalyst. For example, Abatzoglou discloses a two-stage process for dry reformation of an organic material (e.g., methane, ethanol) and $CO_2$ over a 3D catalyst to form syngas, in a first stage, followed by carbon sequestration of syngas over a 2D carbon steel catalyst to form CNTs and carbon nanofilaments. The 2D catalyst may be an active metal (e.g., Ni, Rh, Ru, Cu—Ni, Sn—Ni) on a nonporous metallic or ceramic support, or an iron-based catalyst (e.g., steel), on a monolith support. The 3D catalyst may be of similar composition, or may be a composite catalyst (e.g., $Ni/ZrO_2$—$Al_2O_3$) over a similar support. Abatzoglou teaches preactivation of a 2D catalyst by passing an inert gas stream over a surface of the catalyst at a temperature beyond its eutectic point to transform the iron into its alpha phase. Abatzoglou teaches minimizing water in the two-stage process or introducing water in low concentrations (0 to 10 wt %) in a reactant gas mixture during the dry reformation first stage.

DISCLOSURE

The present disclosure relates to new and useful compositions, that is, a mixture of carbon nanotubes having a generally bi-modal distribution of sizes comprising a primary population of relatively larger diameter carbon nanotubes and a distinct secondary population of relatively smaller diameter carbon nanotubes. The type, purity, and homogeneity of solid carbon product are controlled by the reaction conditions (time, temperature, pressure, partial pressure of reactants) and the catalyst (including the size, method of formation, and form of the catalyst). The carbon nanotube's primary population may be themselves organized in various morphologies, including a "forest" morphology, a "pillow" morphology and agglomerations of various sizes and shapes with the secondary population distributed throughout. In general, the primary population is a multi-walled carbon nanotube material that may include carbon nanofibers, while the secondary population is a smaller diameter single-, double-, or triple-walled carbon nanotube material. Typically, the primary population appears to have a significantly wider variation in characteristic size than the secondary population.

This disclosure also relates to methods for production of carbon nanotubes having a generally bi-modal distribution of sizes, that is, the vast majority of the resulting nanotubes fall into one of two separate populations of nanotubes, one population being nanotubes having a relatively larger diameter and a second population being nanotubes having a relatively smaller diameter. In some embodiments, two or more populations may include a gradation of various sizes with various relative percentages of the total composition. Furthermore, in certain embodiments, carbon allotropes and morphologies may also co-occur with the carbon nanotube populations.

Early indications are that this bi-modal composition may have unusual engineering properties that combine the enhanced tensile strength typical of larger multi-wall CNTs with the enhanced electrical and thermal conductance properties typical of single-wall CNTs. Thus, this bi-modal composition may be a significant improvement in the art of manufacturing CNTs for at least some applications.

BRIEF DESCRIPTION OF DRAWINGS

Other features and advantages of the disclosed methods will be apparent from reference to the following detailed description taken in conjunction with the accompanying graphs and drawings, in which:

FIGS. 92A-92F depict charts and graphs showing properties of a single-wall population of bi-modal material from another sample;

MODE(S) FOR CARRYING OUT THE INVENTION

Figure 1A:
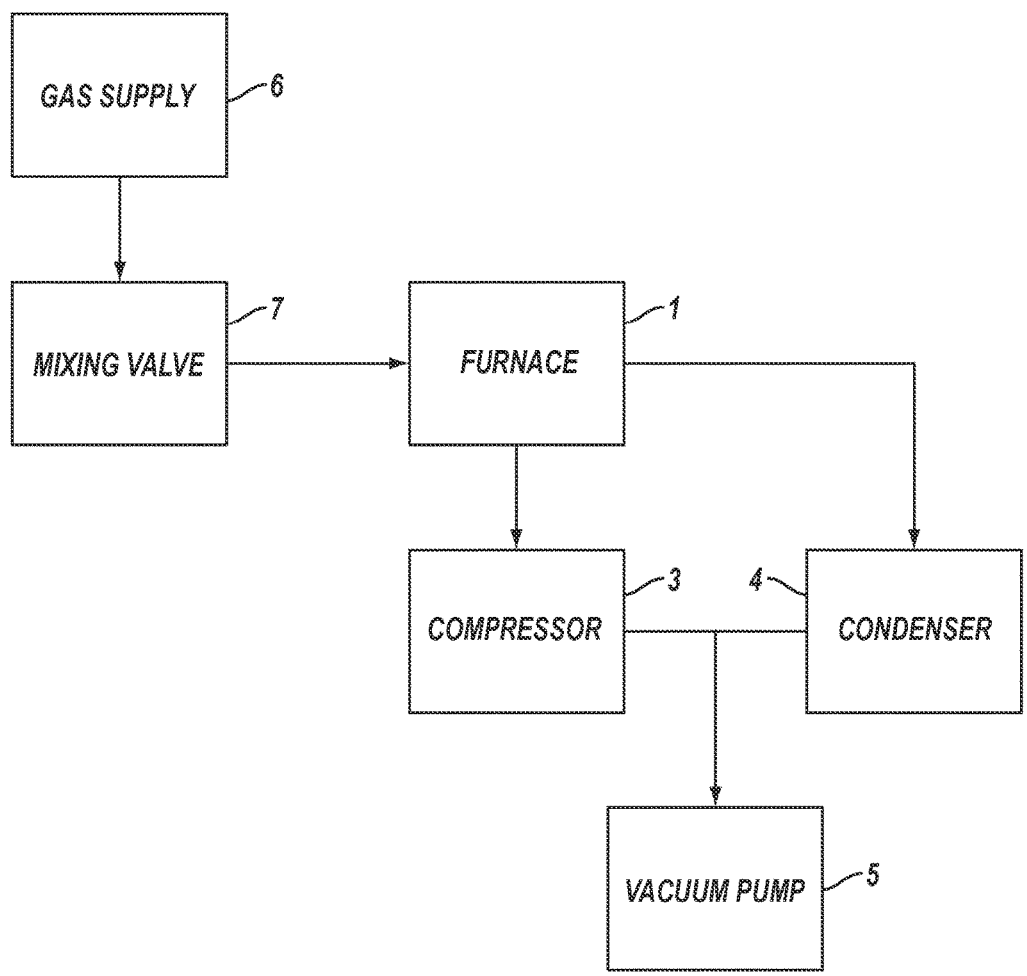
FIG. 1A illustrates a process flow diagram indicating how processes of the current disclosure may be performed using recirculation of reaction gases.

Various embodiments of processes disclosed herein result in a mixture of carbon nanotubes having a bi-modal size distribution, that is, a primary growth population of relatively larger diameter multi-wall carbon nanotubes and secondary growth population of relatively smaller diameter carbon nanotubes typically including at least some single-wall carbon nanotubes. There may be additional populations of carbon nanotubes and other allotropes and morphologies of carbon present in the bi-modal compositions as described herein. A multi-wall carbon nanotube may contain multiple rolled, stacked, or nested layers of nanotubes, for example, 2, 3, 4, or more layers thick. Current analysis indicates that based on mass, the majority of the nanotubes may belong to the primary growth population and have a larger diameter, while numerically there may actually be more of the smaller diameter nanotubes associated with the secondary growth population. Thus, the large diameter nanotubes typically constitute the primary constituent by mass, with the smaller diameter population occurring as a secondary growth highly entangled with, and appearing in some cases to be attached to or growing from, the surface of the large diameter nanotubes. This bi-modal composition appears to combine the properties of both sizes, delivering the greater strength typical of larger diameter nanotubes and the enhanced thermal and electrical conductivity typical of smaller diameter nanotubes.

In certain embodiments, one or more carbon nanotubes in a second population may be chemically bonded to at least one of the carbon nanotubes in the primary population.

Note that for the purposes of this disclosure, "bi-modal compositions" and similar terms and references are intended to include the described compositions of matter wherein two or more populations of carbon nanotubes having different average diameters are present, and may include various other allotropes and morphologies of carbon. Specific allotropes that have been observed to co-occur with carbon nanotubes include fullerenes, graphitic forms, carbon nanofibers, amorphous carbon, including apparently coke and various morphologies, and mixtures of these allotropes. In some embodiments, a bi-modal composition may include two or more populations of carbon nanotubes, wherein a primary population of nanotubes is relatively significantly larger in diameter, on average, than a secondary population on nanotubes. In some embodiments, the primary population may include carbon nanotubes with average characteristic diameters between, for example, about 20 and 200 nm, particularly between 80 and 150 nm. For example, the primary population may have an aspect ratio of at least 50:1. In some embodiments, a secondary population may include carbon nanotubes with average characteristic diameters less than about 30 nm, particularly less than 25 nm, more particularly less than about 10 nm. In certain embodiments, a secondary population may include single-, double- and triple-wall carbon nanotubes having average diameters of less than about 25 nm. In certain embodiments, a bi-modal composition may include a third population of nanotubes having a diameter generally intermediate to the primary and secondary populations.

In certain embodiments, a bi-modal composition of carbon nanotubes may exhibit unique properties, including unique structural, chemical, and electrical properties. In some embodiments, a bi-modal mixture of carbon nanotubes has a resistivity at 29.0 kPa that is between 2.25 and 2.75 times its resistivity at 87.6 kPa. In some embodiments, a mixture of carbon nanotubes has a compacted density at 29.0 kPa in excess of 320 kilograms per cubic meter (20 pounds per cubic foot) and a compacted density at 87.6 kPa in excess of 480 kilograms per cubic meter (30 pounds per cubic foot).

In some embodiments, a process for producing such compositions of matter, with the carbon nanotubes generally having a bi-modal size distribution, includes the reduction of carbon dioxide with any of a variety of reducing gases such as hydrogen or methane in the presence of a catalyst such as iron, and under reaction conditions optimized for the particular desired morphology of carbon nanotubes. A wide variety of carbon sources (e.g., hydrocarbons, carbon monoxide, carbon dioxide, alcohols) and various mixtures thereof may be used together with a wide variety of reducing agents (e.g., methane, hydrogen, hydrocarbons, alcohols) and various mixtures thereof. Using the processes disclosed here, bi-modal compositions can readily be formed and have value in that the resulting composition has beneficial properties contributed by each of the constituent populations.

In embodiments, methods for production of a bi-modal composition, as disclosed herein, may employ the Bosch reaction or variations thereof, by reduction of carbon dioxide with any of a variety of reducing gases such as hydrogen or methane in the presence of a catalyst and under reaction conditions optimized for any particular desired type of solid carbon. The Bosch reactions include reactions in the interior region of the C—H—O equilibrium diagram (i.e., the region between the Boudouard reaction zone and the pyrolysis zone) as previously described, where equilibrium may be established between solid carbon, compounds of carbon, hydrogen and oxygen. The central region of the C—H—O equilibrium diagram has several points that are favorable for the formation of CNTs and other forms of solid carbon. The type of solid carbon produced can be selectively controlled through selection and processing of catalysts, reaction gases, and reaction conditions. Thus these methods open new routes to the production of valuable solid carbon products such as CNTs. This catalytic conversion process may be incorporated with a variety of separation technologies, and with a variety of carbon dioxide generation processes.

The Bosch reactions, as described herein, use a reducing agent (e.g., hydrogen, a hydrocarbon, etc.) to reduce carbon oxides to solid carbon (e.g., graphite, graphene, carbon black, fibrous carbon, buckminsterfullerene, single-wall CNTs, multi-wall CNTs, carbon platelets, nanodiamond, etc.) and water. The reactions may be conducted at temperatures in excess of approximately 600° C., such as in excess of about 650° C., in the presence of a catalyst. In the formation of CNTs, graphite, or $C_{60}$ fullerene, the Bosch reaction of carbon dioxide with hydrogen is mildly exothermic (heat producing) and proceeds with the stoichiometry:

$$CO_2 + 2H_2 \leftrightarrows C_{(s)} + 2H_2O \quad \text{(Equation 1).}$$

The formation of CNTs in Equation 1 releases approximately 24.9 kcal/mol at 650° C. (i.e., $\Delta H = -24.9$ kcal/mol). The formation of graphite in Equation 1 releases approximately 23.8 kcal/mol at 650° C. The formation of $C_{60}$ fullerene in Equation 1 releases approximately 13.6 kcal/mol at 650° C. The formation of carbon lamp black in Equation 1 is endothermic, consuming approximately 147.5 kcal/mol at 650° C. (i.e., $\Delta H$ is +147.5 kcal/mol). The Bosch reactions are reversible; in the reverse of Equation 1, solid carbon is oxidized by water to form carbon dioxide and hydrogen in an oxygen shift reaction.

The Bosch reactions are actually two-step reactions having an overall release of energy (i.e., the net reactions are exothermic). In the first step of the reaction shown in Equation 1, carbon dioxide reacts with hydrogen to create carbon monoxide and water in a reverse water-gas shift reaction:

$$CO_2 + H_2 \leftrightarrows CO + H_2O \quad \text{(Equation 2).}$$

Equation 2 is slightly endothermic at 650° C., requiring a heat input of about 8.47 kcal/mol (i.e., $\Delta H = +8.47$ kcal/mol). In the second step of the reaction shown in Equation 1, carbon monoxide reacts with hydrogen to form solid carbon and water:

$$CO + H_2 \leftrightarrows C_{(s)} + H_2O \quad \text{(Equation 3).}$$

Equation 3 may occur with stoichiometric amounts of reactants, or with excess. $CO_2$ or $H_2$. Equation 3 is exothermic at 650° C., releasing 33.4 kcal/mol ($1.16 \times 10^4$ joules/gram of $C_{(s)}$) when CNTs are formed (i.e., $\Delta H = -314$ kcal/mol). Values of $\Delta H$ for Equation 3 may be calculated for other carbon products by the difference between the $\Delta H$ value for Equation 1 for that particular carbon product and the $\Delta H$ value for Equation 2.

In embodiments, processes disclosed herein involve the creation of solid carbon, and in particular, CNTs of different shapes or morphologies, from carbon oxides. The carbon oxides may be a product of combustion of a primary hydrocarbon, from the atmosphere, or from some other source. The carbon oxides and a reducing agent may be injected into a reaction zone that has been preheated to a reaction temperature. The reaction typically occurs in the presence of a catalyst. The catalyst composition and grain size may affect the morphology of the resulting solid carbon products. The reaction conditions, including the temperature and pressure of the reactor, the residence time of the reaction gases, and the grain size of the catalyst, may be controlled to obtain solid carbon products having selected characteristics. Feed and product mixtures may pass through one or more condensers to remove excess water and to control the partial pressure of water vapor in the reaction gas mixture.

The partial pressure of water is one factor that appears to affect the type and character (e.g., morphology and allotropes) of solid carbon formed, as well as the kinetics of carbon formation. Thus, regulation of the water vapor pressure in one or more reactors for use in the methods disclosed herein, by various methods known in the art (e.g., condensation, heating, addition or water vapor to the reactor) may significantly contribute to the bi-modal composition formed. In certain embodiments, the partial pressure of water in the reaction is continuously regulated by various means, including recycling and condensation of water, to influence, e.g., the structure, distribution, or other aspects of the composition of carbon products produced.

In embodiments, the processes disclosed herein use two abundant feedstocks, carbon oxides (e.g., carbon dioxide, carbon monoxide) and a reducing agent. The reducing agent is preferably a hydrocarbon gas (e.g., methane), hydrogen gas ($H_2$), or a mixture thereof. A hydrocarbon gas may serve a dual function as both an additional carbon source and as the reducing agent for the carbon oxides. "Syngas" comprises primarily carbon monoxide and hydrogen, and thus has both a carbon oxide and a reducing gas in a mixture. Syngas may be used as all or a portion of the reaction gas mixture.

The reduction process of this method results in the formation of solid carbon products and water. The water may subsequently be condensed and the latent heat extracted for heating purposes, or as part of a low-pressure power extraction cycle. The water may be extracted as a useful co-product, and the associated latent heat of the water may be used for another process.

In some embodiments, the methods disclosed herein use carbon dioxide as an economically valuable feed stock. Carbon dioxide is present in many natural gas deposits at various concentrations, such as at concentrations of up to 5% by volume, up to 20% by volume, up to 60% by volume, or even higher. In many industrial processes, carbon dioxide is an undesirable waste product, and may have associated disposal costs. Use of carbon dioxide as a feed in solid carbon production may reduce or eliminate disposal costs, and may simultaneously convert carbon dioxide to a marketable product. Thus, the methods may be incorporated with fossil fuel combustion processes. Combining the processes disclosed herein with fossil fuel combustion processes may also be beneficial because formation of solid carbon products by such processes may be more economical than existing separation and sequestration methods.

Other compounds, such as $H_2S$, $SO_2$, and other sulfur compounds are often present in natural gas. Removal of sulfur-containing compounds is often done at a well site to form "sweet gas" (i.e., gas with little or no sulfur content). Removal of carbon dioxide before the natural gas is delivered to a consumer may be effectively accomplished via the techniques disclosed herein.

The reactions described herein typically occur in the presence of a catalyst. Suitable catalysts include metals selected from groups 2 through 15 of the periodic table (e.g., nickel, molybdenum, chromium, cobalt, tungsten, manganese, ruthenium, platinum, iridium, etc.), actinides, lanthanides, alloys thereof, and combinations thereof. For example, catalysts include iron, nickel, cobalt, molybdenum, tungsten, chromium, and alloys thereof. Note that the periodic table may have various group numbering systems. As used herein, group 2 is the group including Be, group 3 is the group including Sc, group 4 is the group including Ti, group 5 is the group including V, group 6 is the group including Cr, group 7 is the group including. Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N.

In certain embodiments, a broad range of inexpensive and readily-available catalysts, including steel-based catalysts, are used to facilitate the reactions disclosed herein, without the need for a preactivation step (e.g., heating, washing) to prepare the catalyst. In certain embodiments, a catalyst may be exposed to a reducing gas to ensure that a surface of the catalyst is in a reduced state before exposure of the catalyst to a carbon source.

A variety of common steel catalysts have been used and shown to produce the desired bi-modal distribution of CNT material. Iron alloys, including steel, may contain various allotropes of iron, including alpha-iron (austenite), gamma iron, and delta-iron. In certain embodiments, reactions disclosed herein advantageously utilize an iron-based catalyst, wherein the iron is not in an alpha phase. In some embodiments, various commercially available grades of metals are used as catalysts, such as series-300 stainless steels. In certain of these embodiments, the iron in a stainless steel catalyst is primarily in the austenitic phase. Examples include 304 SS, 316 SS, and carbon steel pipe, common steel wool, and common steel sand blasting grit. Apparently, under the described conditions the desired bi-modal distribution of CNT material will form on a wide variety of steels in a wide variety of formats (sheet, powder, grit, wool, pipe, etc.). The low cost, low environmental impact, and ready availability of steels recommend them for use as catalysts in the production of bi-modal CNT materials.

In some embodiments, commercially available metals are used without special preparation. The use of commercial forms of commonly available metals may reduce the cost, complexity, and difficulty of producing solid carbon. For example, CNT forests may grow on commercial grades of steel, with the CNT forests forming directly on the steel without additional layers or surfaces isolating the steel from the CNT forest. CNTs form on materials such as on mild steel, 304 stainless steel, 316L stainless steel, steel wool, and 304 stainless steel wire.

304 stainless steel appears to catalyze the formation of CNTs under a wide range of temperatures, pressures, and gas compositions. However, the rate of formation of CNTs on 304 stainless steel appears to be relatively low, such that 304 stainless steel may be used effectively as a construction material for process equipment, with minimal deposition on surfaces thereof in normal operations. 316L stainless steel, in contrast, appears to catalyze the formation of solid carbon at significantly higher rates than 304 stainless steel, but may also form various morphologies of carbon. Thus, 316L stainless steel may be used as a catalyst to achieve high reaction rates, but particular reaction conditions may be maintained to control product morphology. Catalysts may be selected to include Cr, such as in amounts of about 22% or less by weight. For example, 316L stainless steel contains from about 16% to about 18.5% Cr by weight. Catalysts may also be selected to include Ni, such as in amounts of about 8% or more by weight. For example, 316L stainless steel contains from about 10% to about 14% Ni by weight. Mild steel is a common form of steel, containing less than about 0.2% carbon. Catalysts of these types of steel have iron in an austenitic phase, in contrast to alpha-phase iron used as a catalyst in conventional processes. Given the good results observed with 316L stainless steel, the Ni and/or Cr may have a synergistic effect with Fe.

In various embodiments, catalysts may be in the form of nanoparticles or in the form of domains or grains and grain boundaries within a solid material. Catalysts may be selected to have a grain size related to a characteristic dimension of a desired diameter of the solid carbon product (e.g., a CNT diameter). Catalyst powder may be formed in or near the reaction zone by injecting an aerosol solution such that upon evaporation or a carrier solvent, a selected particle size distribution results. Alternatively, powdered catalyst may be entrained in a carrier gas and delivered to the reactor. By selecting the catalyst and the reaction conditions, the process may be tuned to produce selected morphologies of solid carbon product. In some embodiments, the catalyst may be formed over a substrate or support, such as an inert oxide that does not participate in the reactions. However, the substrate is not necessary; in other embodiments, the catalyst material is an unsupported material, such as a bulk metal or particles of metal not connected to another material (e.g., loose particles, shavings, or shot, such as may be used in a fluidized-bed reactor). Omitting a solid support (such as a ceramic or metallic support) may simplify the setup of the reactor and reduce costs.

It appears that the optimum reaction temperature is dependent on the desired type of solid carbon product. For example, the reaction between carbon dioxide and hydrogen at pressures near atmospheric occurs at temperatures in the range of approximately 450° C. to 950° C. for iron based catalysts, depending on the particle size and composition and the desired solid carbon product. That is, in general, graphite and amorphous solid carbon and some carbon nanotubes form at lower temperatures (typically below approximately 600° C.), and carbon nanotubes typically form at higher temperatures with high purity carbon nanotubes typically forming above approximately 650° C. As illustrated in the examples that follow, however, a bi-modal distribution of carbon nanotubes is seen over a broad range of temperature conditions.

In embodiments, reaction gases for use in the methods disclosed herein may be supplied in approximately stoichiometric amounts. In other embodiments, an excess of one or another reactant may be provided. Conducting the reaction with an excess of reducing agent beyond stoichiometric ratios apparently has two important effects. First, an excess of reducing agent decreases the tendency of iron catalysts to oxidize in the presence of the water formed in the reaction, thus increasing the conversion rates per pass. Second, a high percentage of reducing gas (e.g., above 90% hydrogen with less than 10% carbon oxides) results in a forest growth morphology typically with a bi-modal size distribution wherein the primary growth population occurs in the forest morphology and the secondary growth population is randomly entwined in and through the primary growth population.

A reactor may be coupled with heating and cooling mechanisms to control the temperature of the reactor. For example, a reactor may be configured such that products and excess reactant are recycled through a cooling mechanism to condense water vapor. The products and/or excess reactant may then be reheated and recycled through the reactor. By removing some of the water vapor in the recycled gases, the morphology of solid carbon formed may be controlled. Changing the partial pressure of water vapor changes the carbon activity of a mixture. The reactor may also be coupled to a carbon collector in which water and unreacted reactants are separated from the carbon products. The separated carbon products are collected and removed from the system.

Without being bound by any particular theory, carbon nanotubes appear to grow from a nucleating site that is the catalyzing particle. This catalyzing particle may be a domain in a piece of steel or steel wool, for example, or a discrete nanoparticle of iron in an aerosol or deposited on an inert substrate such as a quartz disk. The size of the carbon nanotube is generally proportional to the size of the nucleating site, with the ratio between the catalyst particle size and the CNT diameter observed to be about 1.3 to 1.6.

The morphology of the carbon nanotubes grown on steel is dependent on the chemistry of the steel and the way it was processed. In general, steels with smaller grain sizes tend to produce smaller diameter carbon nanotubes. The grain size is both a function of the chemistry of the steel and the heat treating methods under which the grains formed. Mild steels often produce a primary population of carbon nanotubes with diameters over 100 nm, while stainless steels (such as 304 or 316L) produce a primary population of carbon nanotubes with diameters in the range of 20 nm and under. This may be due to any of a number of factors not presently fully understood; however, it appears to be related to the grain size and boundary shapes within the metal, where the characteristic size of these features controls the characteristic diameter of the population of carbon nanotubes grown on the surface of such steel samples.

When using a solid catalyst, such as a wafer of steel, the carbon nanotubes appear to grow in a series of generations. While the mechanism is not fully understood, it appears that the reaction gases interact with the exposed surface particles and the carbon nanotubes begin to grow, lifting the nucleating catalyst particles off of the surface of the bulk catalyst (i.e., as tip growth). As the growth continues, it appears that additional nucleation particles form on the surface of the bulk catalyst and, in turn, catalyze additional carbon nanotube growth, lifting the prior generation of carbon nanotubes off of the surface of the bulk catalyst.

If a bulk catalyst sample is left in the reaction zone, these layers continue to form and lift off until the catalyst is consumed. The observation that each generation of CNTs detach from the underlying catalyst substrate means that a fluidized bed reactor where the CNTs are elutriated from the substrate, entrained in the gas flow, and subsequently harvested from the gas mixture may be an economical reactor design for growing carbon nanotube pillows. The layers of CNTs appear to have little or no binding to the bulk catalyst substrate or to each other.

Without being bound by any particular theory, oxidation and subsequent reduction of the catalyst surface appear to alter the grain structure and grain boundaries. Oxidation may first alter the surface of the metal catalyst in the oxidized areas. Subsequent reduction may result in further alteration of the catalyst surface. Thus, the grain size and grain boundary of the catalyst may be controlled by oxidizing and reducing the catalyst surface and by controlling the exposure time of the catalyst surface to the reducing gas and the oxidizing gas. The oxidation and/or reduction temperatures may be in the range from about 500° C. to about 1,200° C., from about 600° C. to about 1,000° C., or from about 700° C. to about 900° C. The resulting grain size may range from about 0.1 µm to about 500 µm, from about 0.2 µm to about 100 µm, from about 0.5 µm to about 10 µm, or from about 1.0 µm to about 2.0 µm. In some embodiments, the catalyst may be an oxidized metal (e.g., rusted steel) that is reduced before or during a reaction forming solid carbon. Without being bound to any particular theory, it is believed that removal of oxides leaves voids or irregularities in the surface of the catalyst material, and increases the overall surface area of the catalyst material.

Rust on steel has been observed to be a good catalyst for the formation of carbon nanotubes by the methods disclosed. Although the mechanism is not presently understood, it may be because the iron oxides comprising the rust are in effect a catalyst precursor. As the rusted samples are heated in the presence of a reducing agent such as hydrogen, the iron oxides decompose and the iron atoms coalesce to form small iron nanoparticles suitable for the catalysis of carbon nanotube growth. Initially heating the steel catalyst in the presence of hydrogen promotes reduction of the iron oxides in surface films and rust, and activates the steel catalysts. Oxidized metals do not appear to effectively catalyze the carbon oxide reduction reactions, and thus at present an initial reduction of such oxides is recommended as part of a startup procedure for reactors using steels as a catalyst.

In various embodiments, reaction conditions, including the temperature and pressure in the reaction zone, the residence time of the reaction gases, and the grain size, grain boundary, and chemical composition of the catalyst are controlled to obtain solid carbon products of the desired characteristics. The feed gas mixture and reaction product are typically recycled through the reaction zone and passed through a condenser with each cycle to remove excess water and to control the partial pressure of the water vapor in the reaction gas mixture. The partial pressure of water, as noted previously herein, is one factor that appears to affect the type and character (e.g., morphology) of solid carbon formed, as well as the kinetics of carbon formation.

Carbon activity ($A_c$) can be used as an indicator of whether solid carbon will form under particular reaction conditions (e.g., temperature, pressure, reactants, concentrations). Without being bound to any particular theory, it is believed that carbon activity is the key metric for determining which allotrope of solid carbon is formed. Higher carbon activity tends to result in the formation of CNTs, lower carbon activity tends to result in the formation of graphitic forms.

Carbon activity for a reaction forming solid carbon from gaseous reactants can be defined as the reaction equilibrium constant times the partial pressure of gaseous products, divided by the partial pressure of reactants. For example, in the reaction, $CO_{(g)} + H_{2(g)} \rightleftharpoons C_{(s)} + H_2O_{(g)}$, with a reaction equilibrium constant of K, the carbon activity $A_c$ is defined as $K \cdot (P_{CO} \cdot P_{H2}/P_{H2O})$. Thus, $A_c$ is directly proportional to the partial pressures of CO and $H_2$, and inversely proportional to the partial pressure of $H_2O$. Higher $P_{H2O}$ tends to inhibit CNT formation. The carbon activity of this reaction may also be expressed in terms of mole fractions and total pressure: $A_c = K \cdot P_T (Y_{CO} \cdot Y_{H2}/Y_{H2O})$, where $P_T$ is the total pressure and Y is the mole fraction of a species. Carbon activity generally varies with temperature because reaction equilibrium constants vary generally with temperature. Carbon activity also varies with total pressure for reactions in which a different number of moles of gas are produced than are consumed. Mixtures of solid carbon allotropes and morphologies thereof can be achieved by varying the catalyst and the carbon activity of the reaction gases in the reactor.

CNTs have been observed to grow in several distinct bulk morphologies including "pillows," "forest" and random. Pillow morphology is characterized by distinct clusters of highly entangled CNTs forming clumps of under approximately 1 mm average diameter. Under SEM imaging, CNT pillows resemble cockleburs or sea anemones. Forest morphology is characterized by a significant portion of the primary growth CNTs being oriented substantially perpendicular to the bulk catalyst surface and substantially parallel to each other. Random morphology is similar to the pillow, but without the presence of distinct well defined clusters. In both pillow and random morphologies the carbon nanotubes are highly intertwined and entangled. In such tangled morphologies it is typically not possible to estimate the aspect ratio of any particular carbon nanotube from the SEM images.

CNT pillows and random morphologies tend to occur when the reaction gases have approximately stoichiometric proportions of the carbon oxides and reducing agents. CNT forests tend to occur when the reaction gases have a significant surplus of reducing agent. For example, reaction gas mixtures with over 90% hydrogen reliably produce forest morphologies, whereas 70% hydrogen reliably produces pillow and random morphologies.

As depicted in FIGS. 12-18 (see Examples 3-5), the pillow morphology is characterized by the presence of carbon nanotubes that are highly entangled in clusters, typically with a dimension for the clusters of under 1 mm. Hence, the pillows appear as numerous bulbous or billowing conglomerations of nanotubes, similar to the appearance of the outer periphery of cumulus clouds. The pillows may be comprised of carbon nanotubes of many different diameters, lengths and types. The pillows may appear in the form of discrete units in forests, piles, and filaments grown on a substrate. Steels of many different compositions (e.g., mild steel, 304 stainless, 316L stainless) and in many of the various forms (e.g., plate, steel wool, and steel shot) tend to yield carbon nanotube pillows under a wide range of reaction gas mixes and reaction temperatures at reaction gas mixtures near stoichiometric ratios.

EXAMPLES

Examples of bi-modal compositions were formed using the Bosch reaction or variants thereof. In one embodiment using an apparatus suitable for preparing the disclosed carbon nanotube compositions, carbon dioxide is used and the reducing gas comprises methane, in a variation of the Bosch reaction, with the stoichiometry:

$$CO_2 + CH_4 \leftrightarrows 2C_{(solid)} + 2H_2O \quad \text{(Equation 4)}$$

in an exothermic reaction with the release of an undetermined amount of heat. Methane is generally inexpensive and readily available. Examples of the bi-modal compositions were prepared using reaction gases at approximately atmospheric pressure and processing temperatures between about 600° C. and 950° C. Additional examples were prepared using higher processing pressures of 4.14 MPa at approximately 650° C. to 950° C.

In some embodiments using an apparatus suitable for preparing the disclosed carbon nanotube compositions of matter, the reducing gas comprises hydrogen, in a Bosch reaction, with the stoichiometry:

$$CO_2 + 2H_2 \leftrightarrows 2C_{(s)} + 2H_2O \quad \text{(Equation 1)}.$$

This reaction occurs at temperatures between approximately 500° C. and 1,000° C. Examples include samples produced at approximately 113 kPa and at higher pressures of approximately 4.14 MPa. Typically, the optimum temperature increases as the pressure increases, regardless of the reducing agent used.

The following examples are included as illustrative of the methods disclosed herein. In the examples, the figures show the presence of both a primary population of relatively large carbon nanotubes or carbon nanofibers with a co-occurring interspersed population of significantly smaller carbon nanotubes. Although the examples described herein have been used to describe the present methods, it is understood that such detail is solely for this purpose, and variations to the disclosed methods may be made by those skilled in the art without departing from the spirit and scope of the invention. Each example is explained in additional detail in the following subsections, with reference to scanning electron microscope (SEM) and transmission electron microscope (TEM) images of the products of each of the examples.

Atmospheric Pressure Examples

The bi-modal carbon nanotubes grown and used as illustrations in the examples were grown using either a mild steel, a 304 stainless steel, or a 316L stainless steel reactor pipe 5.0 cm (2.0 inches) in diameter and 1.2 meters (4 feet) long, the pipe essentially acting as a catalyst for the reaction as well as a reaction chamber. The reactor pipes were each placed inside a tube furnace, which was used to control the temperature of the reactor pipes. The laboratory setup used for the examples is illustrated in FIG. 1A. The reaction gases were piped from a gas supply 6 to a mixing valve 7 where the gases were metered and passed through the reactor pipe to a tube furnace 1. The gases flowed through the reactor pipe in the furnace and from there to a refrigerated condenser 4 (dew point 3.3° C.), then through a compressor 3 and back into the head end of the reactor pipe in the tube furnace.

Start-up involved evacuating the system using the vacuum pump 5 and then purging the system with hydrogen for thirty seconds with the vacuum pump 5. After the purge was completed, the vacuum pump was isolated and turned off and the system was filled with hydrogen. The furnace 1 was then turned on and the system was brought to the desired experimental temperature. This heating in a hydrogen atmosphere is believed to be fully reduce pipe surfaces in the reaction zone. The compressor was then turned on and the system temperature stabilized.

The tube furnace 1 typically took approximately one hour to come up to temperature and four hours to cool so that the samples could be removed. When the furnace 1 had achieved the desired reaction temperature, hydrogen was evacuated from the system and the desired mixture of reaction gases were introduced into the system. The system was filled with the reaction gas mixture to approximately atmospheric pressure (101 kPa), at which point the flow rate of the reaction gases was reduced to stabilize the pressure. Reaction gases were constantly added thereafter to maintain the system pressure, as makeup gas for the gases consumed in the reaction. The temperature of the tube furnace 1 was measured by a type K thermocouple located at approximately the centerline of the furnace. The temperatures reported are the gauge temperature as shown for this thermocouple, and are generally indicative of the temperature in the reaction zone.

The reaction gas supply included standard industrial grades of carbon dioxide, hydrogen and methane procured in cylinders from an industrial supplier, PraxAir.

Make-up gases were metered into the system using either ball-type flow meters or mass flow controllers. The reaction gases were circulated through the furnace by the compressor 3. The gases exiting the furnace 1 were cooled and the water was condensed in a refrigerated condenser 4. The water was periodically removed from the condensers via a drain valve. All of the components illustrated in FIG. 1A together with associated piping, instrumentation and appurtenances are collectively referred to as the "experimental apparatus" in the following description of the experimental examples.

No attempt was made to measure or to control the recirculation flow rate; though various flow rates were used in various trials, the quality of the product and speed of reaction seemed to be independent of the circulation rate. This may have been because in all cases, the flow rate was above a critical threshold. Flow rates may be important in the design and operation of production facilities, but are not particularly important in the tests reported here because the volume of the experimental apparatus was much larger than the volume of the catalyst and resulting solid carbon product.

During the experiments, the pressure of the gases in the experimental apparatus would continuously drop if the flow of make-up gases was stopped. This is because the reaction gases were being converted into solid carbon and water. The rate of pressure drop was therefore indicative of the reaction rate. The rate at which the pressure dropped varied with the catalyst and gas mixture, but not particularly with the temperature, indicating that the reaction is likely to be diffusion limited rather than Arrhenius temperature limited. The pressure was maintained by adding additional reaction gases to the experimental apparatus.

In the examples, the furnace was operated for a fixed time (typically four hours), at which time the furnace was turned off, purged and allowed to cool. After the furnace was turned off, the vacuum pump 5 was turned on, the reaction gases evacuated and the experimental apparatus purged with carbon dioxide for approximately 5 minutes, then the vacuum pump 5 was turned off and the experimental apparatus was brought up to atmospheric pressure with an inert purge gas and allowed to cool. All tests were run in a batch mode.

Example 1—Sample 85

| Example | Carbon Oxide | Reducing Agent | Catalyst | Conditions |
|---|---|---|---|---|
| Example 1 Forest Growth bi-modal CNTs | $CO_2$ | $H_2$ | mild steel pipe | P = 113 kPa Temp = 700° C. Time = 4 hour |

For Example 1, the reactor pipe was a mild steel pipe (schedule 40) 5 cm (2 inches) in diameter and 1.2 m (4 feet) long inserted into the tube furnace 1. The vacuum pump 5 was started and hydrogen was used to purge the experimental apparatus for 30 seconds. After 30 seconds, the vacuum pump was turned off, the compressor 3 was turned on, the refrigerated condenser 4 was turned on and the hydrogen gas continued to flow until the pressure was about 113 kPa (850 torr), at which point the hydrogen gas flow was shut off. The tube furnace 1 was then turned on.

When the tube furnace 1 temperature reached the set point temperature of 700° C., the vacuum pump 5 was turned on, and reaction gases in a stoichiometric mixture of carbon dioxide and hydrogen, from gas supply 6 controlled by mixing valve 7, were used to purge the experimental apparatus for 30 seconds. After five minutes, the vacuum pump was turned off. When the experimental apparatus reached a pressure of 113 kPa, the reaction gas flow rate was reduced to maintain the system pressure at approximately 113 kPa. The test ran for four hours, after which the furnace 1 was shut off, the vacuum pump 5 was started and the experimental apparatus was purged with carbon dioxide from gas supply 6 controlled by mixing valve 7, for 30 seconds. The vacuum pump was then shut off and the carbon dioxide purge gas continued to flow until the pressure in the experimental apparatus was 107 kPa (800 Torr). The furnace was then left to cool.

Figure 2:
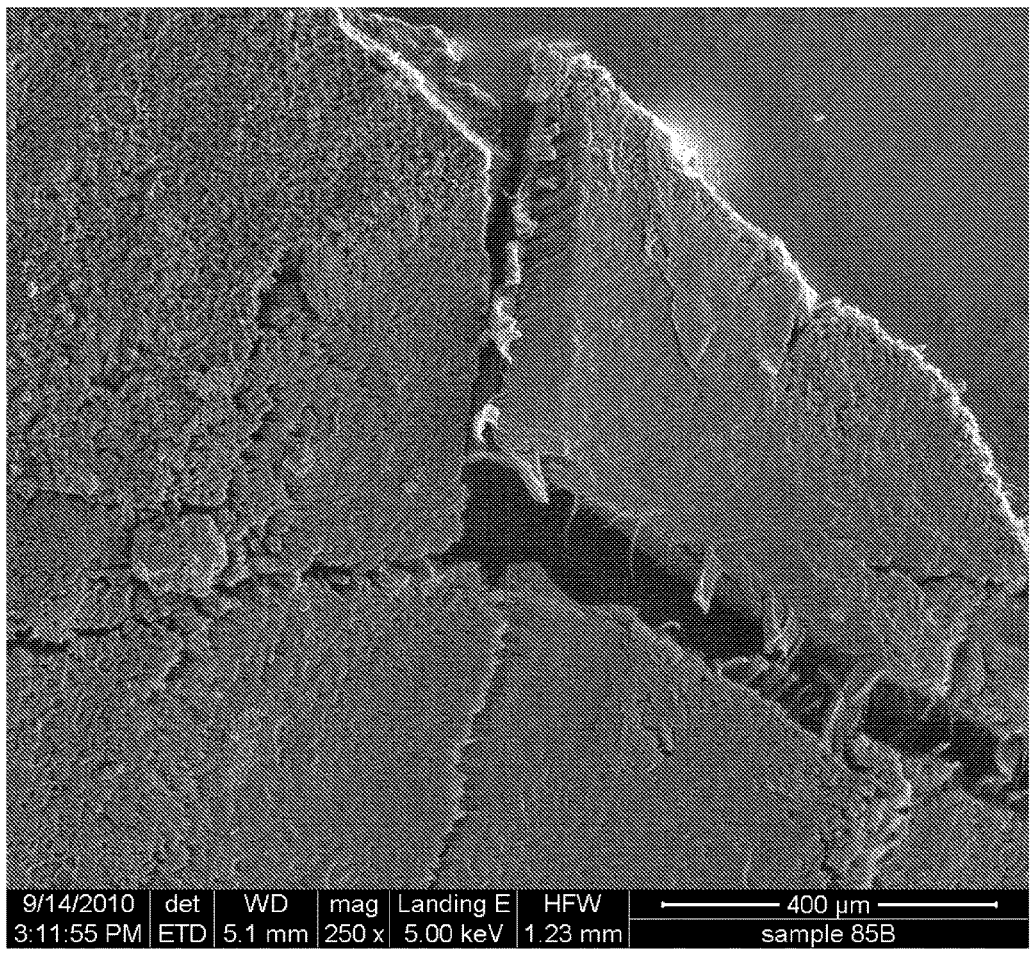
FIG. 2 depicts a SEM image of forest growth bi-modal carbon nanotubes from a sample 85B at 250× magnification.

The reactor pipe was removed from the furnace 1 after the furnace had cooled. The solid carbon product was scraped form the reactor walls and a small sample was taken for scanning electron microscopy (SEM) and transmitting electron microscopy (TEM) analysis. FIG. 2 shows a SEM image at 250× magnification of the resulting material (sample 85). At this magnification, only the forest growth morphology of the primary material can be observed.

Figure 3:
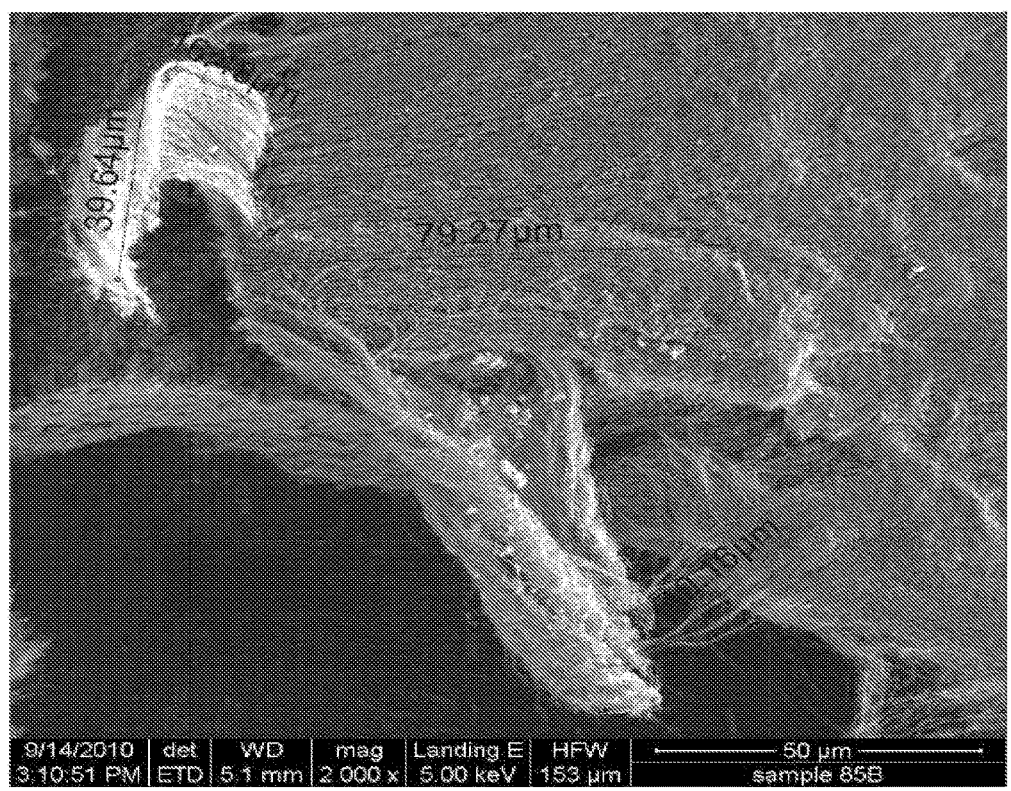
FIG. 3 depicts a SEM image of forest growth bi-modal carbon nanotubes from sample 858 at 2000× magnification.
Figure 4:
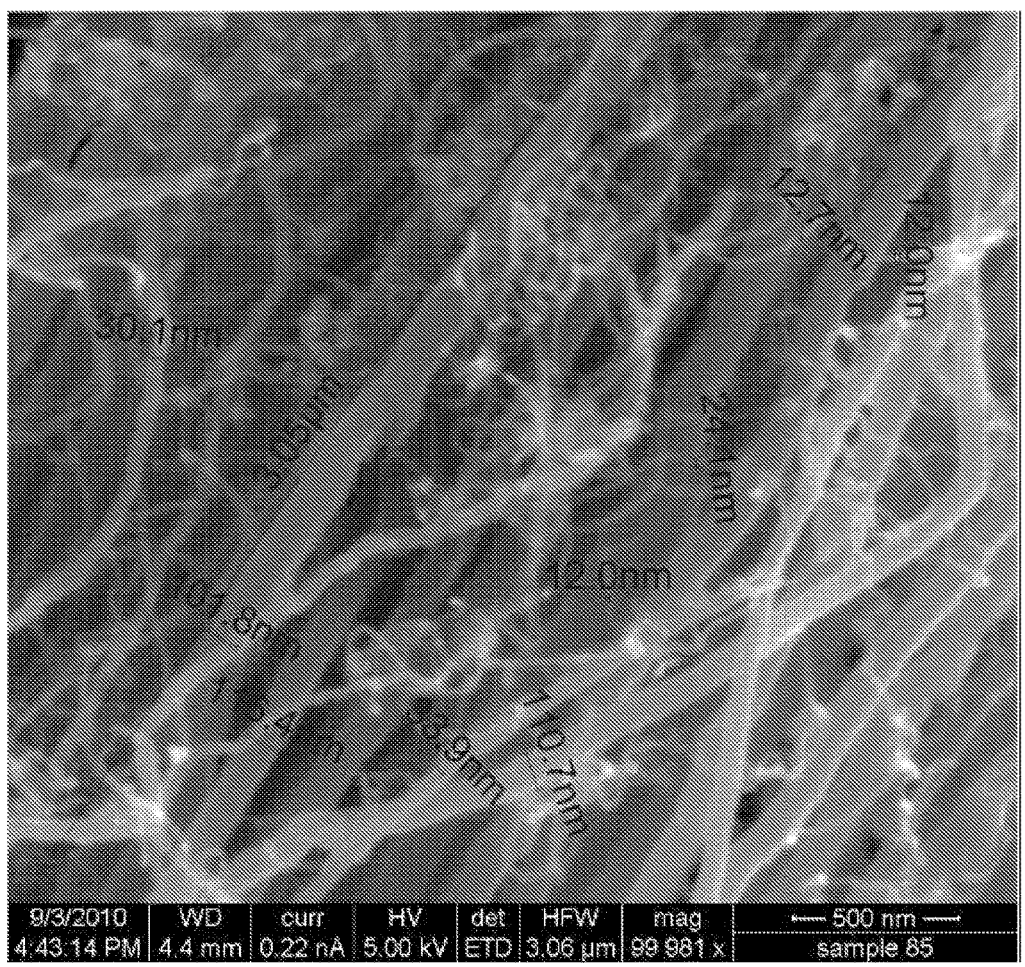
FIG. 4 depicts a SEM image of forest growth bi-modal carbon nanotubes from sample 85 at 99,981× magnification.

FIG. 3 shows a SEM image of the same sample at 2,000× magnification. Note that at this magnification the secondary growth begins to come into focus. FIG. 4 shows the same sample at 99,981× magnification and shows the details of the secondary growth. The size of the primary growth CNTs (tens to hundreds of nanometers in diameter) indicates that they are most probably multi-wall CNTs, while the much smaller size of the secondary growth CNTs indicates that they are much smaller multi-wall (fewer walls), and perhaps comprise single-, double- and triple-wall CNTs.

Figure 5:
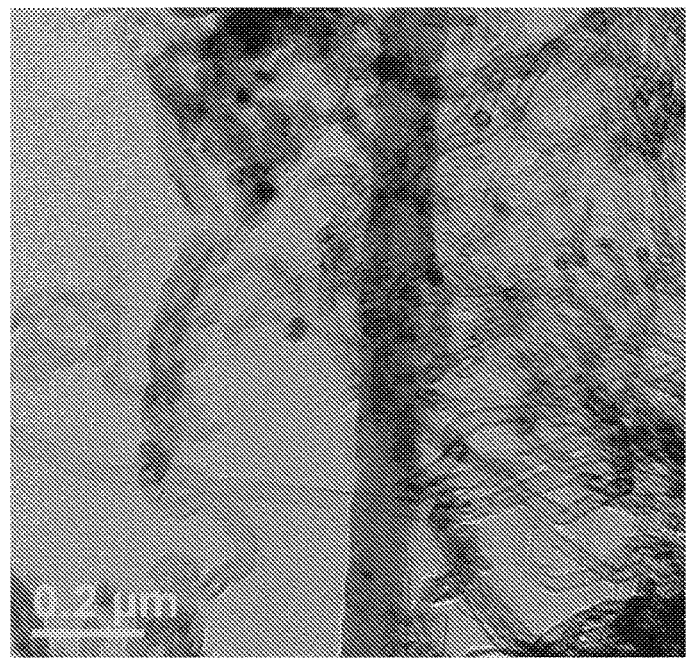
FIG. 5 depicts a TEM image of forest growth bi-modal carbon nanotubes from sample 85 at 99,981× magnification.
Figure 6:
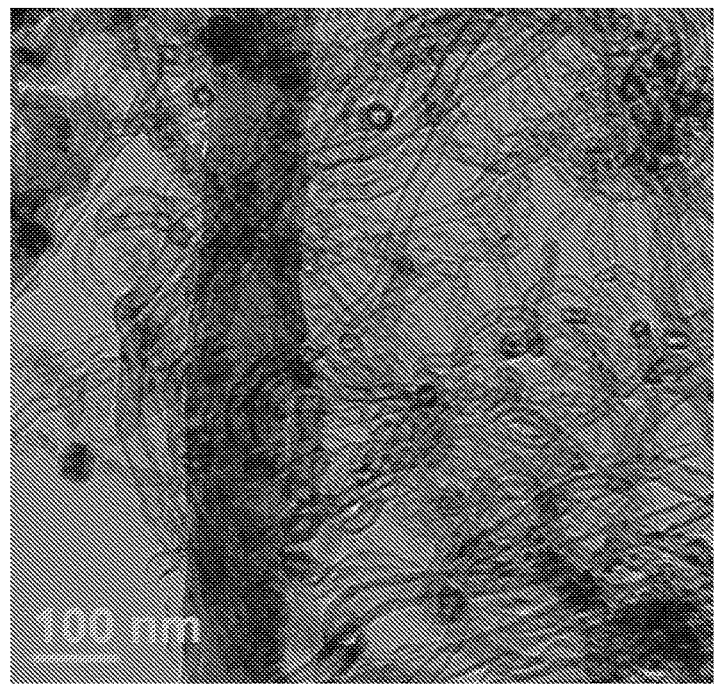
FIG. 6 depicts another TEM image of forest growth bi-modal carbon nanotubes from sample 85.
Figure 7:
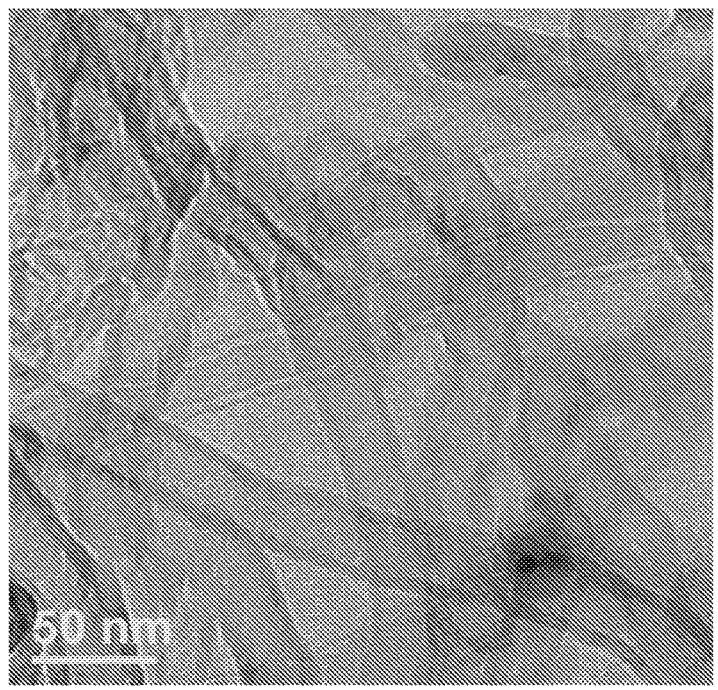
FIG. 7 depicts another TEM image of forest growth bi-modal carbon nanotubes from sample 85.

FIGS. 5, 6 and 7 are TEM images; FIGS. 5 and 6 show a single CNT of the primary growth passing vertically through the image and smaller secondary growth CNTs surrounding it. This series of TEM images is of the same sample 85 at increasing magnifications. In these images, it appears that the secondary growth CNTs could be single- and double-wall CNTs. Note that the pore size of the secondary growth material appears to be somewhat larger than is commonly reported in the literature for SWCNTs. Because TEM images are necessarily extremely small samples, it is unknown how representative this characteristic may be.

Example 2—Sample 112

| Example | Carbon Oxide | Reducing Agent | Catalyst | Conditions |
|---|---|---|---|---|
| Example 2 Multi Wall Carbon Nanotubes | $CO_2$ | $H_2$ | 304 stainless steel and quartz disk | P = 101 kPa Temp = ~600° C. Time = 1 hour |

For Example 2, a sample quartz disk was placed flat on a 304 stainless steel wafer, which was used as the catalyst. The 304 stainless steel catalyst wafer was placed in the tube furnace 1 at approximately the center line. The vacuum pump 5 was started and helium was used to purge the experimental apparatus for five minutes. After five minutes the vacuum pump was turned off, the compressor 3 was turned on, the refrigerated condenser 4 was turned on and the helium gas continued to flow until the pressure was 91.0 kPa (680 Torr), at which point the gas flow was shut off. The furnace was then turned on.

When the furnace 1 temperature reached the set point temperature of 680° C., the vacuum pump 5 was turned on and reaction gases in a stoichiometric mixture of carbon dioxide and hydrogen, from gas supply 6 controlled by mixing valve 7 were used to purge the experimental apparatus for five minutes. After five minutes the vacuum pump was turned off. When the experimental apparatus reached a gauge pressure of 101 kPa (760 Torr) the reaction gases were shut off. Additional reaction gases were added periodically to keep the experimental apparatus pressure between 84.3 kPa and 101 kPa.

The test ran for 1 hour after which the furnace 1 was shut off, the vacuum pump 5 was started and the experimental apparatus was purged with helium from the gas supply 6, controlled by the mixing valve 7, for five minutes. The vacuum pump was then shut off and the helium purge gas continued to flow until the pressure in the experimental apparatus was 98.7 kPa (740 Torr). The furnace was then left to cool.

The steel sample was removed from the furnace 1 after the furnace cooled.

Figure 8:
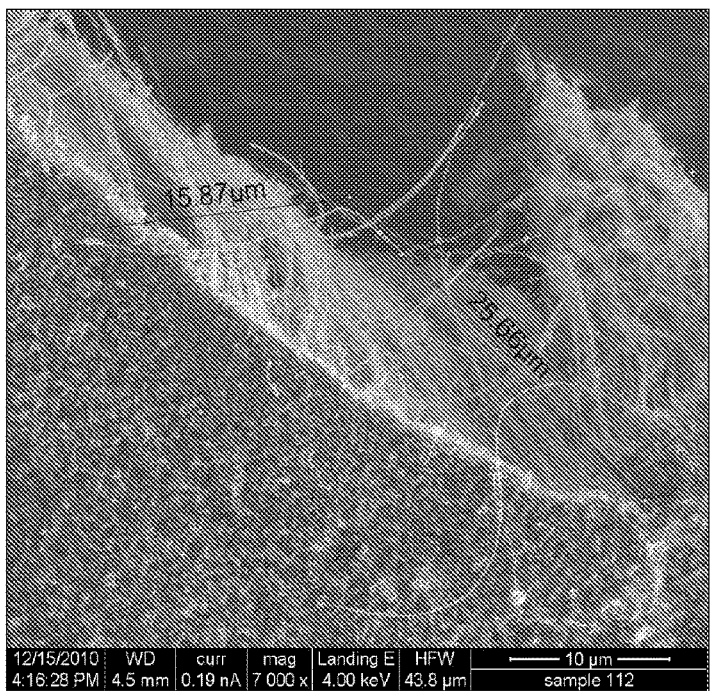
FIG. 8 depicts a SEM image of forest growth bi-modal carbon nanotubes from sample 112 at 7000× magnification.
Figure 9:
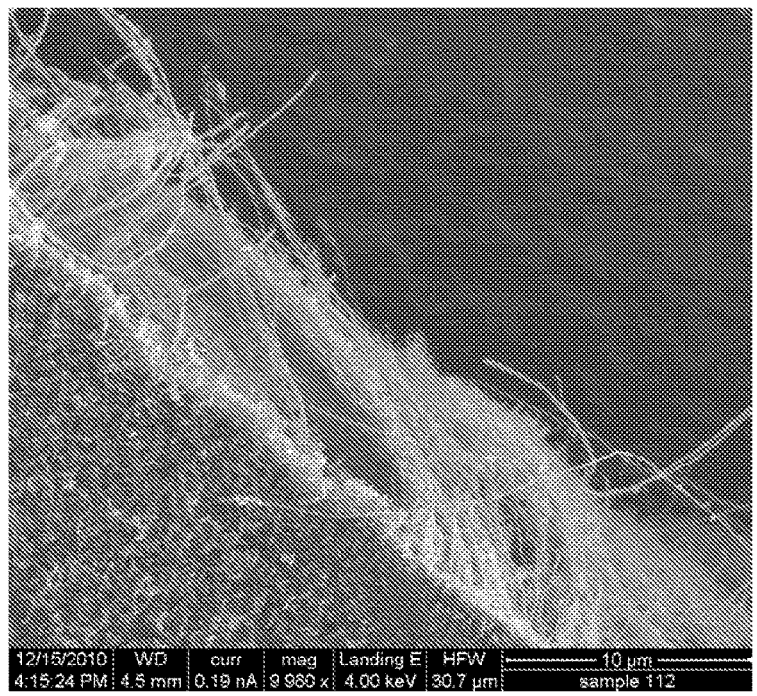
FIG. 9 depicts a SEM image of forest growth bi-modal carbon nanotubes from sample 112 at 9980× magnification.
Figure 10:
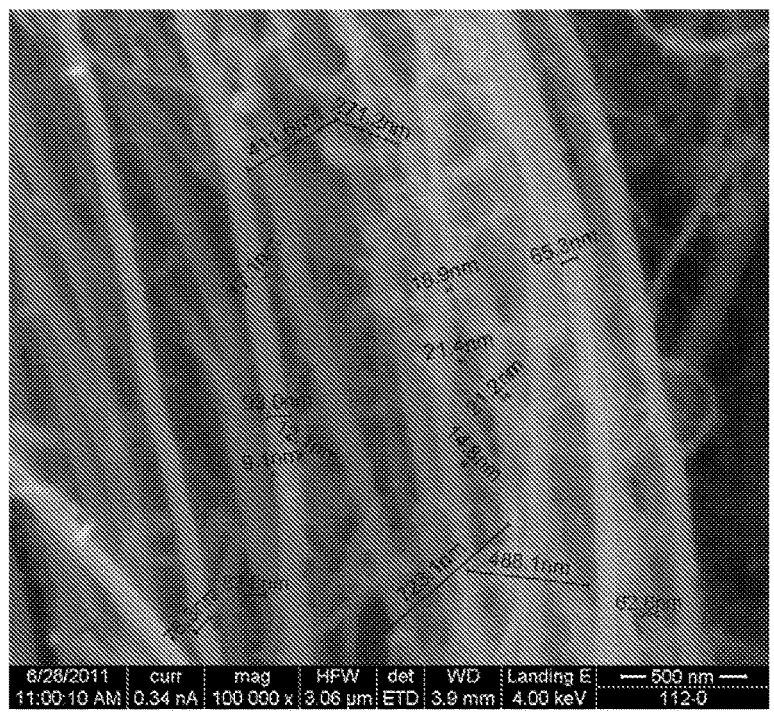
FIG. 10 depicts a SEM image of forest growth bi-modal carbon nanotubes from sample 112 at 100,000× magnification.
Figure 11:
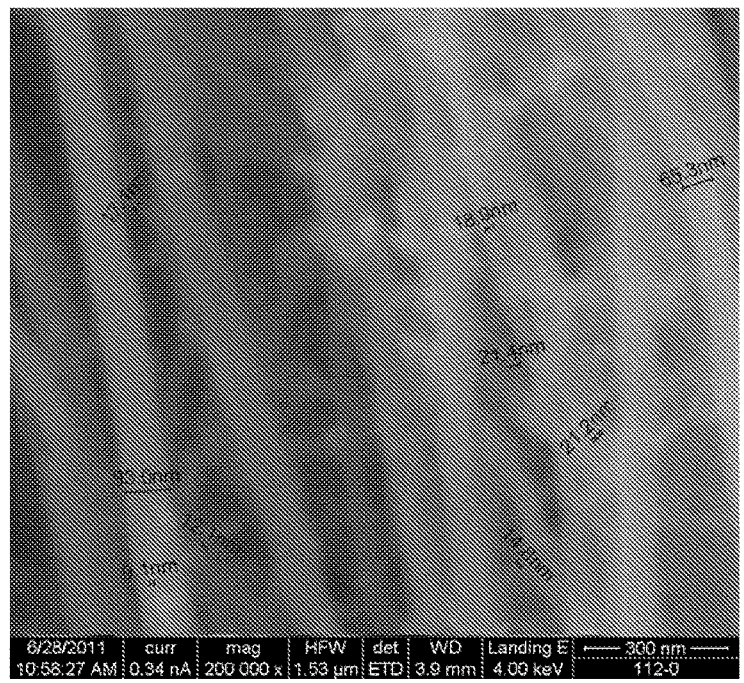
FIG. 11 depicts a SEM image of forest growth bi-modal carbon nanotubes from sample 112 at 200,000× magnification.

A mat of CNTs grew between the quartz and the wafer. Portions of the CNT mat adhered to both the quartz and the steel catalyst wafer surfaces. FIG. 8 shows the sample under 7,000× magnification, and FIG. 9 shows the sample under 9,980× magnification. FIG. 10 shows Sample 112 at 100,000× magnification, and FIG. 11 is an image taken from Sample 112 at 200,000× magnification. The size of the CNTs (tens to hundreds of nanometers in diameter) indicates that they are probably multi-wall CNTs. Note that the larger diameter CNTs are of the "forest" morphology, with masses of smaller diameter CNTs intertwined around and through the forest growth.

Example 3—Sample 35

| Example | Carbon Oxide | Reducing Agent | Catalyst | Conditions |
|---------|--------------|----------------|----------|------------|
| Example 3 Multi Wall Carbon Nanotubes | $CO_2$ | $H_2$ | 316 L stainless steel wafer | P = 101 kPa Temp = ~650° C. Time = 1 hour |

For Example 3, a 316L stainless steel wafer was used as the catalyst. The 316L stainless steel wafer was placed in the furnace 1 at approximately the center line. The compressor 3 was turned on, the refrigerated condenser 4 was turned on, the vacuum pump 5 was turned on and a purge gas comprising helium from the gas supply 6 controlled by the mixing valve 7, was introduced into the experimental apparatus. After five minutes of purging, the vacuum pump was shut off and the helium purge gas continued to flow until the pressure of the experimental apparatus was 91 kPa, at which point the purge gas flow was shut off. The furnace was then turned on.

When the furnace 1 temperature reached about 640° C., the vacuum pump 5 was started and reaction gases in a stoichiometric mixture of carbon dioxide and hydrogen, from gas supply 6 controlled by mixing valve 7, passed into the experimental apparatus. After five minutes, the vacuum pump was shut off and the reaction gases continued to flow until the pressure of the experimental apparatus was 88 kPa, at which point the reaction gas flow rate was reduced to a lower flow rate sufficient to keep the pressure between about 75 kPa and 92 kPa. The experimental apparatus ran for one hour after which the furnace was shut off, the vacuum pump was started and the experimental apparatus was purged with helium from the gas supply, controlled by the mixing valve, for five minutes. The vacuum pump was then shut off and the apparatus purged with helium purge gas. The furnace was then left to cool.

Figure 12:
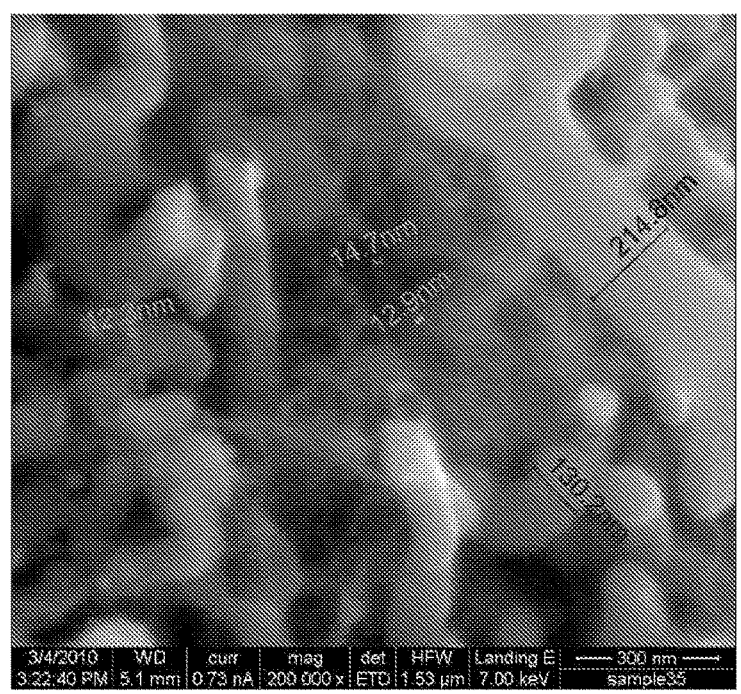
FIG. 12 depicts a SEM image of pillow growth bi-modal carbon nanotubes from sample 35 at 200,000× magnification.
Figure 13:
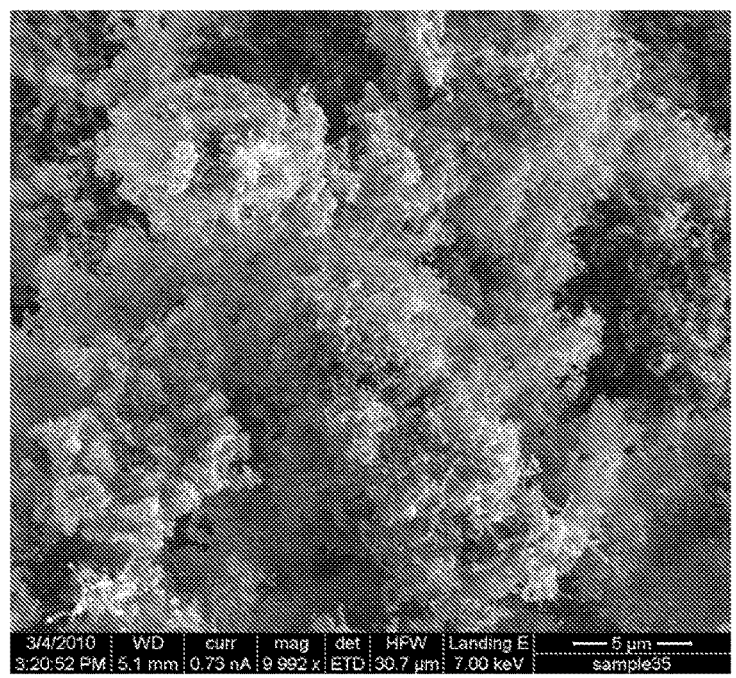
FIG. 13 depicts another SEM image of pillow growth bi-modal carbon nanotubes from sample 35 at 300,000× magnification.
Figure 14:
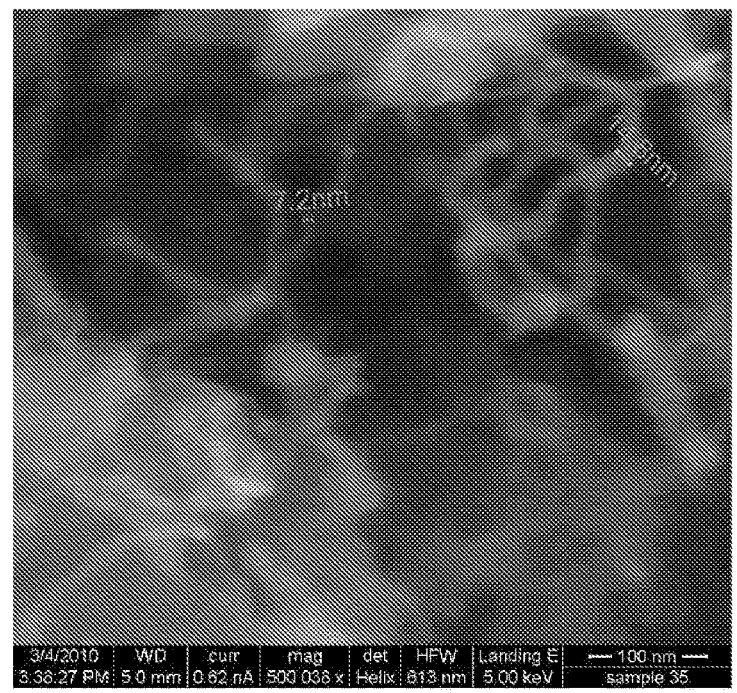
FIG. 14 depicts another SEM image of pillow growth bi-modal carbon nanotubes from sample 35 at 500,038× magnification.

The resulting product is depicted in FIG. 12 at 200,000× magnification. The larger diameter nanotubes are most likely multi-walled. The smaller carbon nanotubes are likely to be single, double or triple walled. FIG. 13 depicts sample 35 at 300,000× magnification, again showing the generally bi-modal size distribution of the resulting nanotubes. FIG. 14 depicts Sample 35 at 500,038× magnification.

Example 4—Sample 37

| Example | Carbon Oxide | Reducing Agent | Catalyst | Conditions |
|---------|--------------|----------------|----------|------------|
| Example 4- Sample 37 Carbon Nanotubes | $CO_2$ | $H_2$ | 0000 fine steel wool | P = 68.3-92.9 kPa Temp = 641-651 C. Time = ~1 hour |

For Example 4, sample 37, a 0000 fine steel wool was used as the catalyst. Fine steel wool has an average fiber diameter of less than about 0.02 mm, more particularly a fiber diameter less than about 0.012 mm. The steel wool was placed in the furnace 1. The same process of purging the furnace, introducing the reaction gases at the experimental pressure and temperature, stopping the reaction, and purging and cooling the furnace were performed, as discussed above with regard to other experiments. The reaction conditions are given in the chart.

Figure 15:
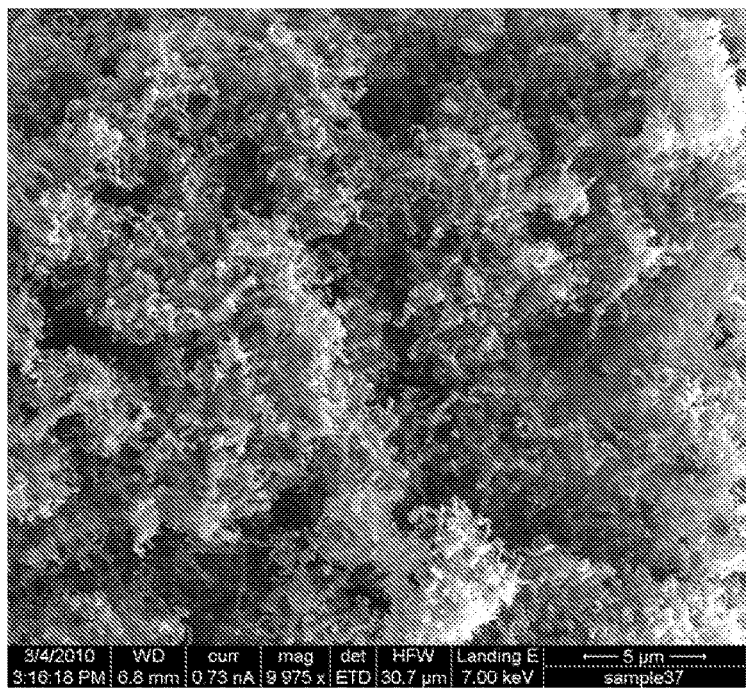
FIG. 15 depicts a SEM image of pillow growth bi-modal carbon nanotubes from sample 37 at 10,000× magnification.
Figure 16:
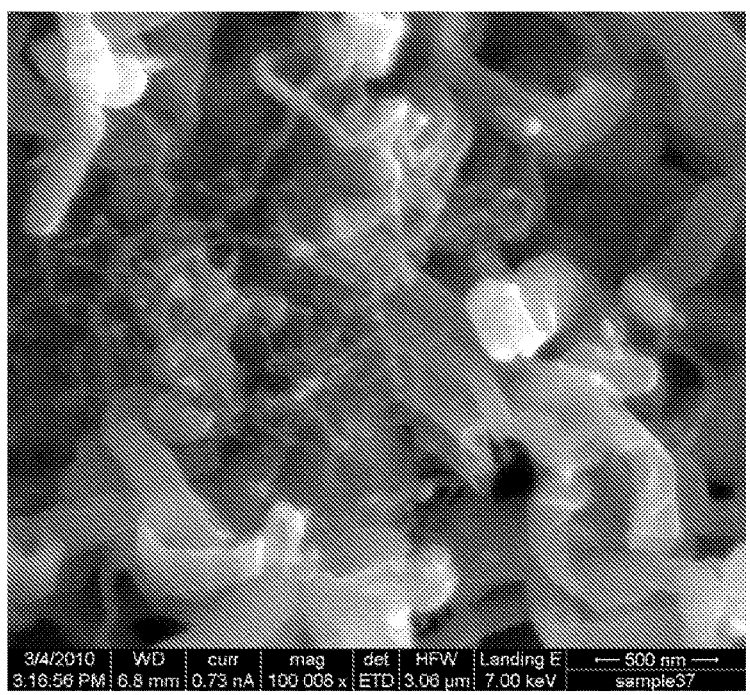
FIG. 16 depicts another SEM image of pillow growth bi-modal carbon nanotubes from sample 37 at 100,008× magnification.
Figure 17:
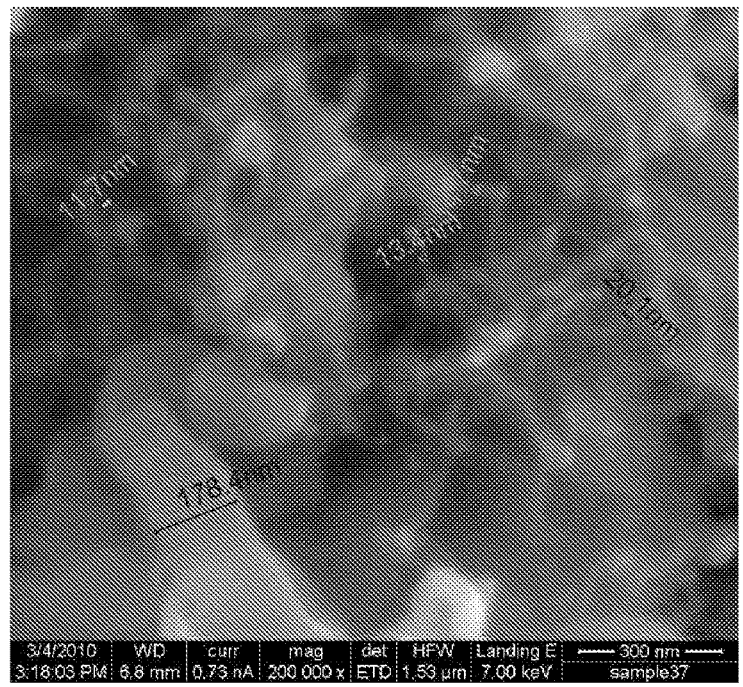
FIG. 17 depicts another SEM image of pillow growth bi-modal carbon nanotubes from sample 37 at 200,000× magnification.

The resulting product is depicted in FIGS. 15, 16 and 17 at 9,975×, 100,008× and 200,000× magnification, respectively. At 9,975× magnification, the bi-modal size distribution is not apparent. However, as indicated by FIGS. 16 and 17, at 100,008× and 200,000× magnification, the bi-modal nature is more apparent.

Example 5—Sample 55

| Example | Carbon Oxide | Reducing Agent | Catalyst | Conditions |
|---------|--------------|----------------|----------|------------|
| Example 5- Sample 55 Carbon Nanotubes | $CO_2$ | $H_2$ | 0000 fine steel wool | P = ~111 kPa Temp = ~700° C. Time = 1 hour |

For Example 5, sample 55, a 0000 fine 316L steel wool was used as the catalyst. The steel wool was placed in the furnace 1. The steps of purging the furnace, introducing reaction gases at the experimental pressure and temperature, stopping the reaction, and purging and cooling the furnace were performed, as outlined in Example 1 above. The reaction conditions are given in the chart.

Figure 18:
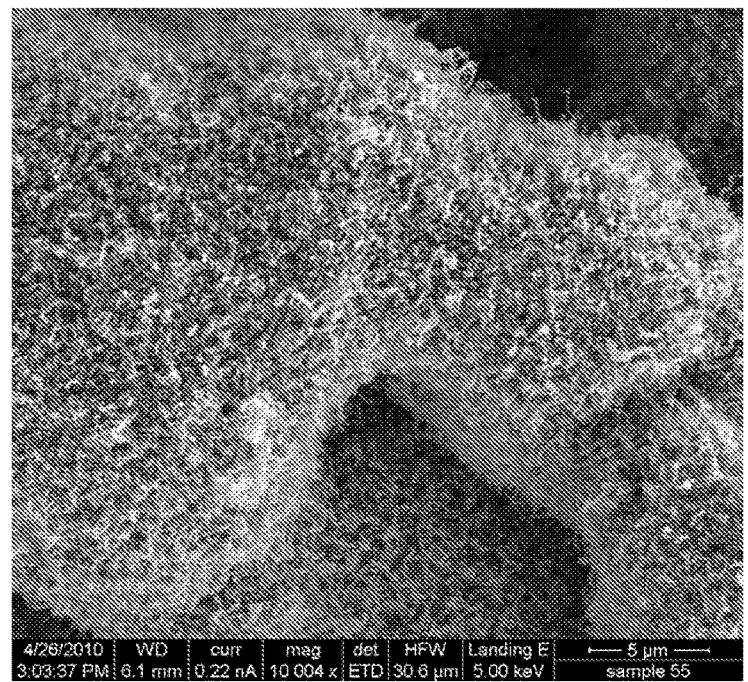
FIG. 18 depicts a SEM image of pillow growth bi-modal carbon nanotubes from sample 55 at 10,004× magnification.
Figure 19:
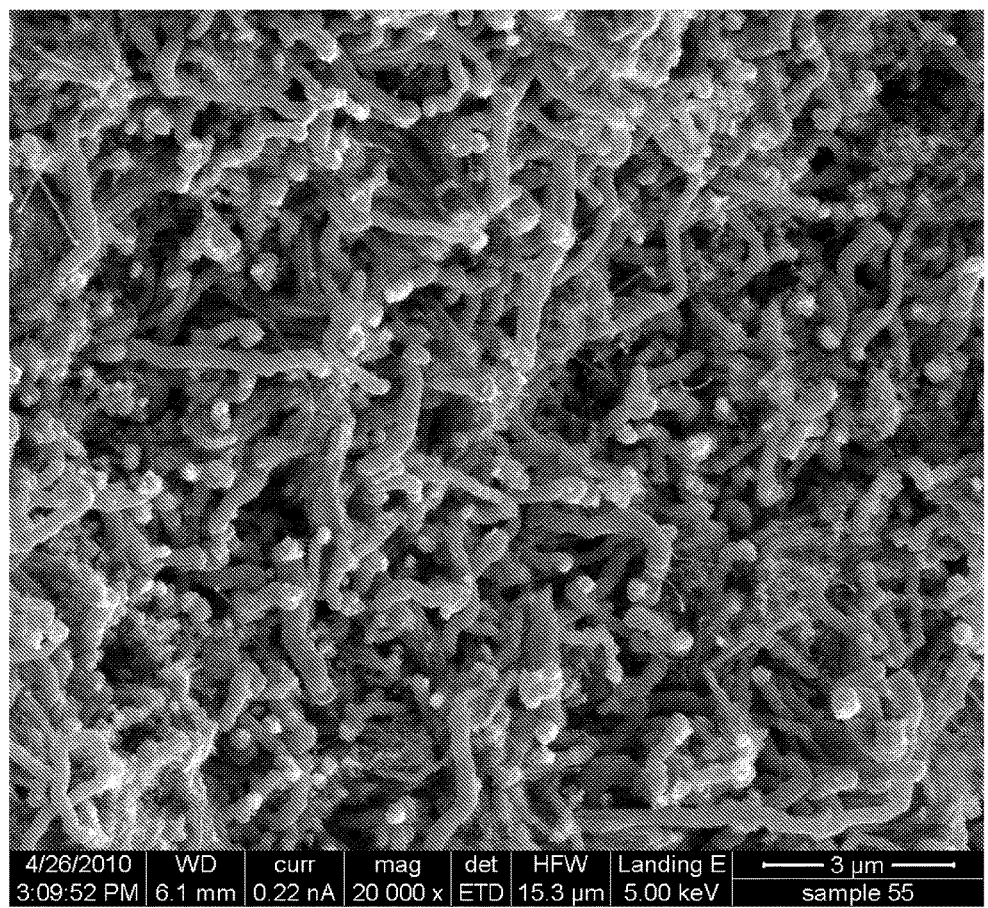
FIG. 19 depicts another SEM image of bi-modal carbon nanotubes from sample 55 at 20,000× magnification.
Figure 20:
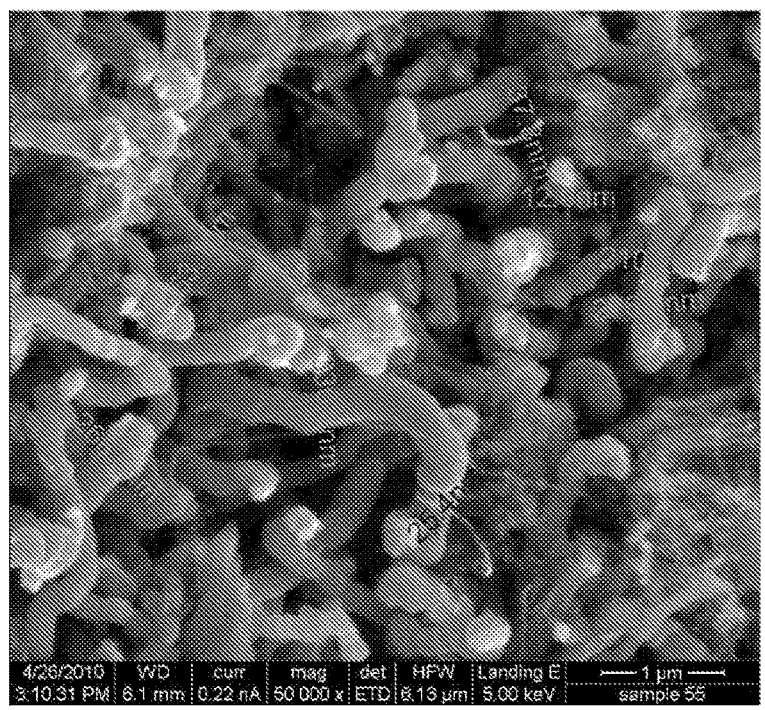
FIG. 20 depicts another SEM image of bi-modal carbon nanotubes from sample 55 at 50,000× magnification.

The resulting product is depicted in FIGS. 18, 19 and 20 at 10,004λ, 20,000× and 50,000× magnification, respectively. At 10,004× magnification, the bi-modal size distribution is not apparent. However, as indicated by FIGS. 19 and 20, at 20,000× magnification, and even more so at 50,000× magnification, the secondary growth is visible, and thus the bi-modal nature is more apparent.

Example 6—Sample 62

| Example | Carbon Oxide | Reducing Agent | Catalyst | Conditions |
|---|---|---|---|---|
| Example 6- Sample 62 | $CO_2$ | $H_2$ | Stainless steel pipe | P = 101 kPa Temp = 700° C. Time = ~1 hour |

For Example 6, sample 62, a 316L stainless steel pipe (schedule 40) was used as the catalyst. The stainless steel pipe catalyst was placed in the furnace 2. The steps of purging the furnace, introducing reaction gases at the experimental pressure and temperature, stopping the reaction, and purging and cooling the furnace were performed, as outlined in Example 1 above. The reaction conditions are given in the chart.

Figure 21:
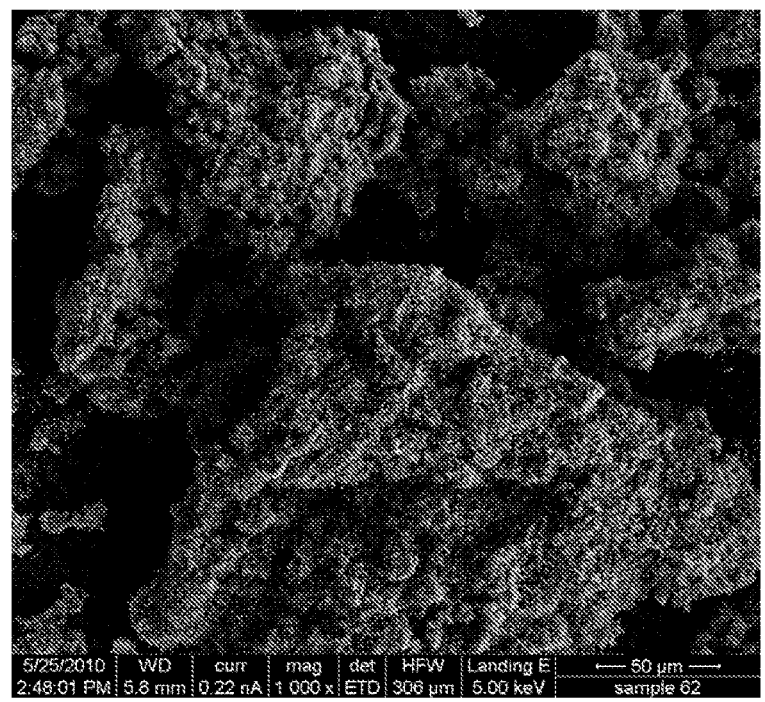
FIG. 21 depicts a SEM image of bi-modal carbon nanotubes from sample 62 at 1,000× magnification.
Figure 22:
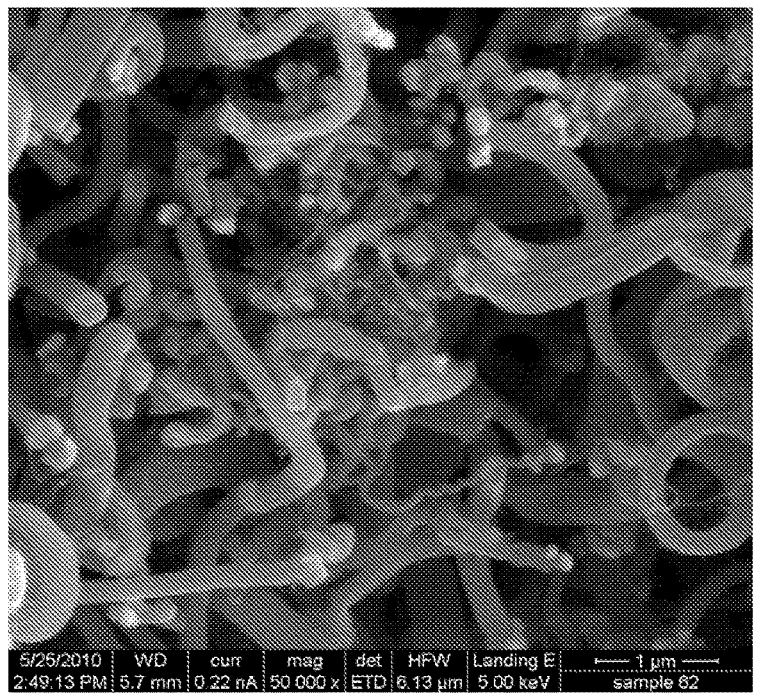
FIG. 22 depicts another SEM image of bi-modal carbon nanotubes from sample 62 at 50,000× magnification.
Figure 23:
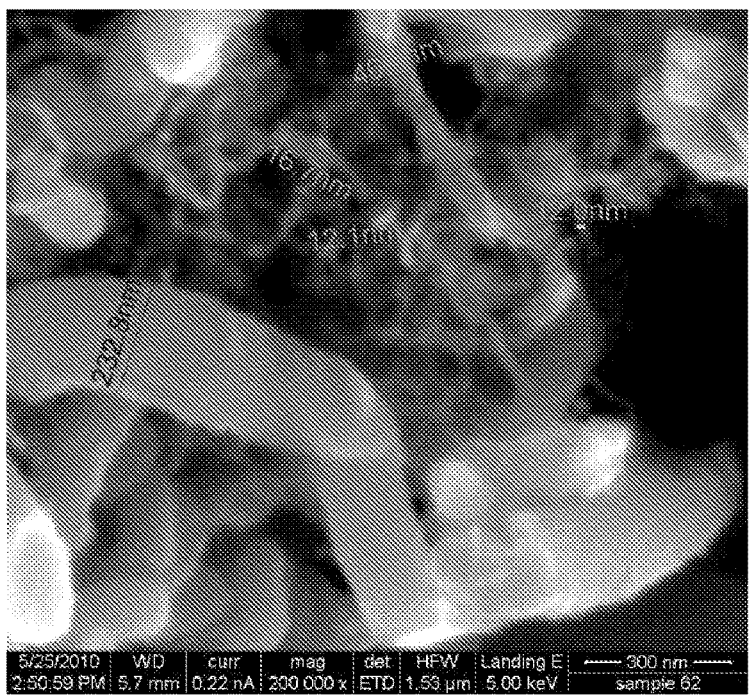
FIG. 23 depicts another SEM image of bi-modal carbon nanotubes from sample 62 at 200,000× magnification.

The resulting product, which was scraped off the wall of the tube, is depicted in FIGS. 21, 22 and 23 at 1,000λ, 50,000× and 200,000× magnification, respectively. At 1,000× magnification, the bi-modal size distribution is not apparent. However, as indicated by FIGS. 22 and 23, at 50,000× magnification, and even more so at 200,000× magnification, the secondary growth is visible, and thus the bi-modal nature is more apparent.

Example 7—Sample 80

| Example | Carbon Oxide | Reducing Agent | Catalyst | Conditions |
|---|---|---|---|---|
| Example 7- Sample 80 | $CO_2$ | $H_2$ | Mild steel pipe | P = 101 kPa Temp = ~700° C. Time = ~1 hour |

For Example 7, sample 80, a mild steel pipe (schedule 40) was used as the catalyst. The mild steel pipe catalyst was placed in the furnace 2. The steps of purging the furnace, introducing reaction gases at the experimental pressure and temperature, stopping the reaction, and purging and cooling the furnace were performed, as outlined in Example 1 above. The reaction conditions are given in the chart.

Figure 24:
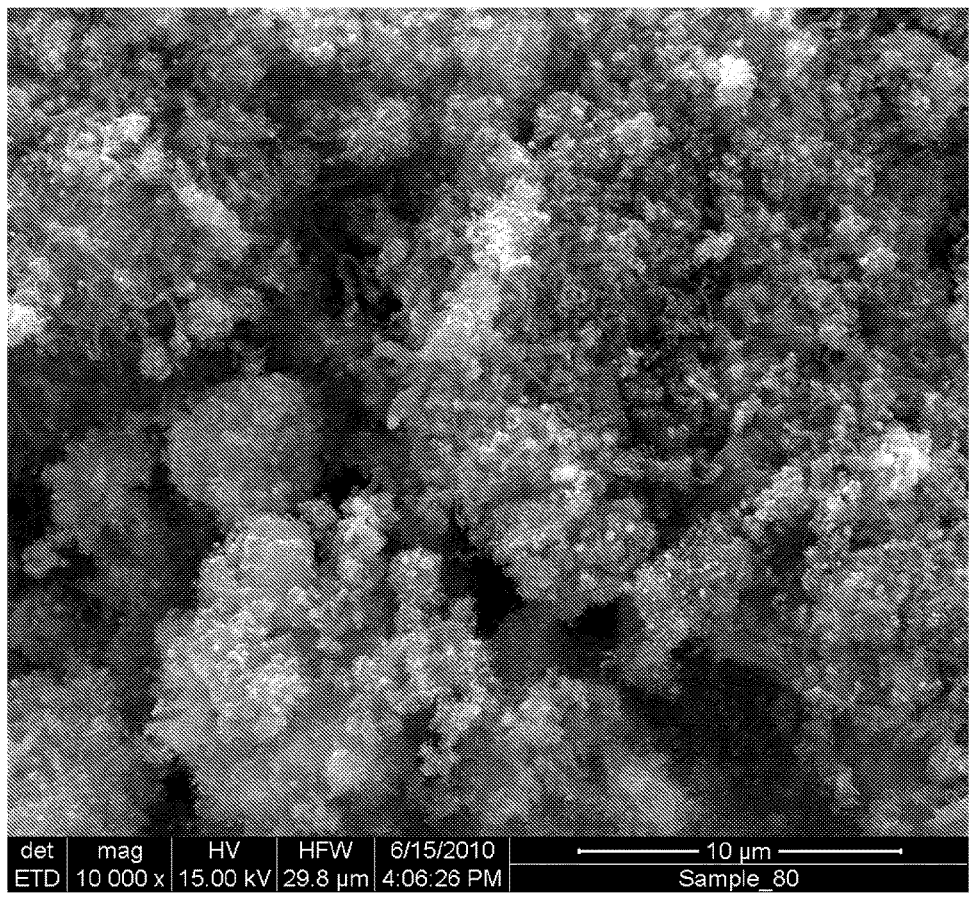
FIG. 24 depicts a SEM image of carbon nanotubes from sample 80 at 10,000× magnification.
Figure 25:
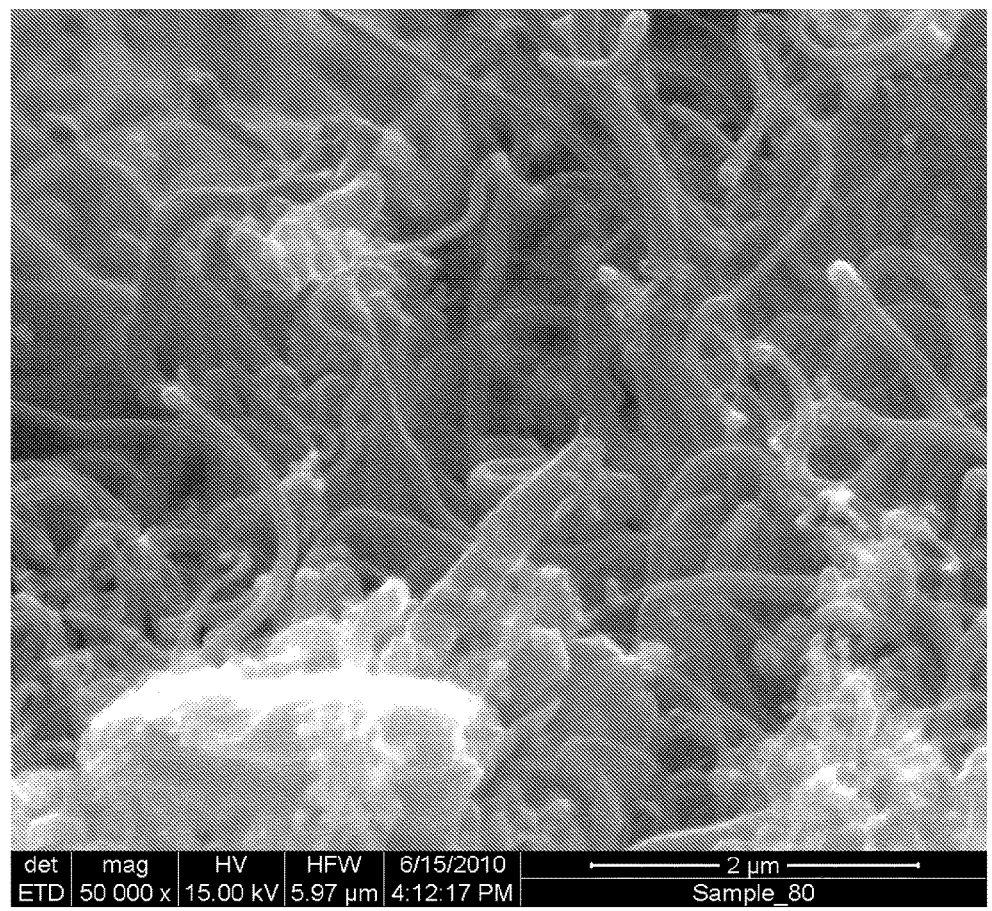
FIG. 25 depicts another SEM image of carbon nanotubes from sample 80 at 50,000× magnification.
Figure 26:
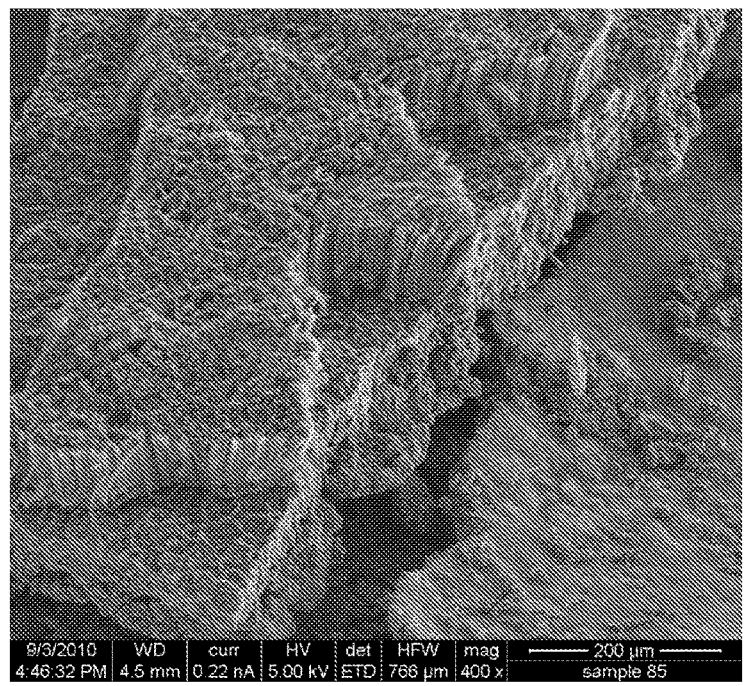
FIG. 26 depicts a SEM image of carbon nanotubes from sample 85 at 400× magnification.
Figure 27:
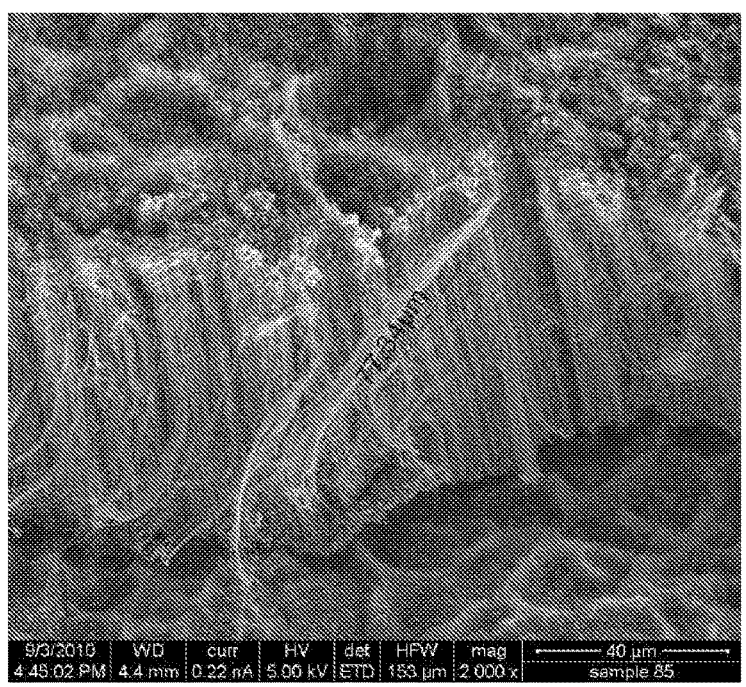
FIG. 27 depicts another SEM image of carbon nanotubes from sample 85 at 2,000× magnification.
Figure 28:
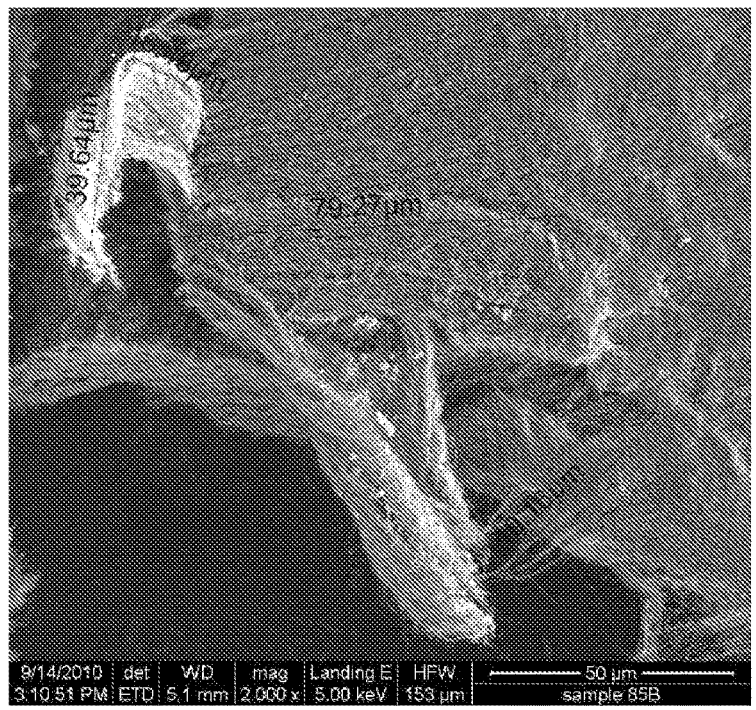
FIG. 28 depicts a SEM image of carbon nanotubes from sample 85B at 2,000× magnification.

The resulting product is depicted in FIGS. 24 and 25 at 10,000× and 50,000× magnification, respectively. At 10,000× magnification, the bi-modal size distribution is not apparent. However, as indicated by FIG. 25, at 50,000× magnification the secondary growth is visible, and thus the bi-modal nature is more apparent.

Example 8—Sample 85

| Example | Carbon Oxide | Reducing Agent | Catalyst | Conditions |
|---|---|---|---|---|
| Example 8- Sample 85 | $CO_2$ | $H_2$ | Stainless steel pipe | P = ~101 kPa Temp = ~700° C. |

For Example 8, sample 85, a stainless steel pipe (schedule 40) was used as the catalyst. The steel pipe catalyst (schedule 40) was placed in the furnace 2. The steps of purging the furnace, introducing reaction gases at the experimental pressure and temperature, stopping the reaction, and purging and cooling the furnace were performed, as outlined in Example 1 above. The reaction conditions are given in the chart.

Figure 29:
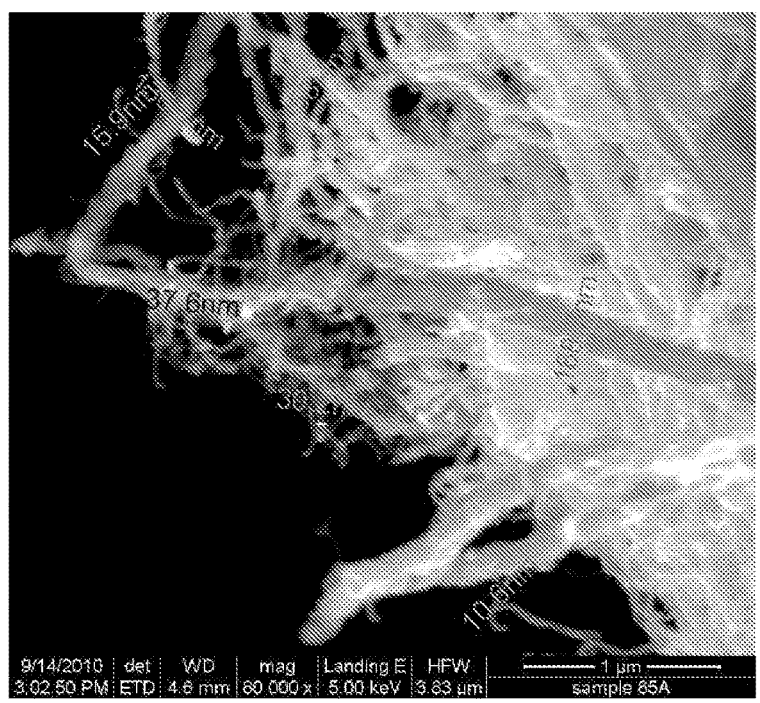
FIG. 29 depicts a SEM image of carbon nanotubes from sample 85A at 80,000× magnification.
Figure 30:
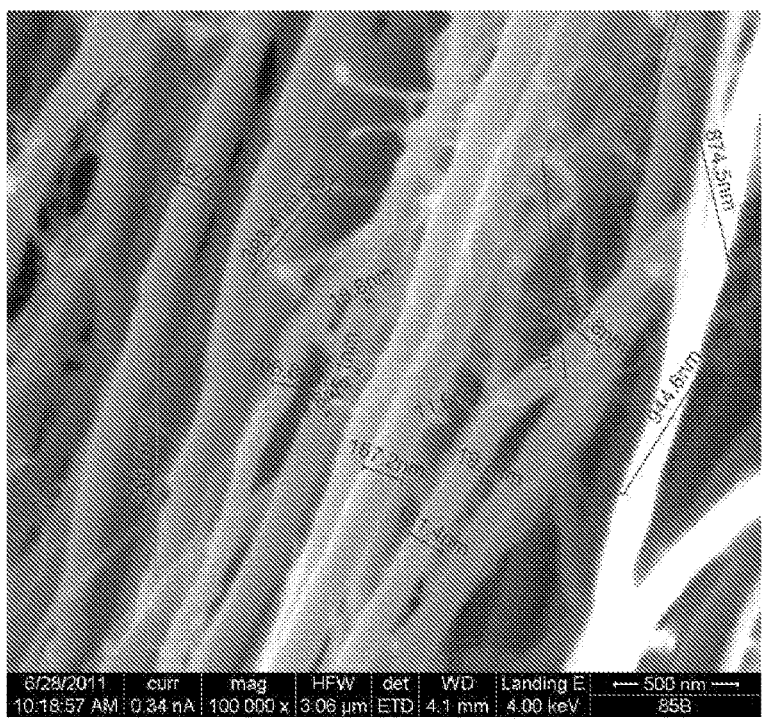
FIG. 30 depicts a SEM image of carbon nanotubes from sample 85B at 100,000× magnification.
Figure 31:
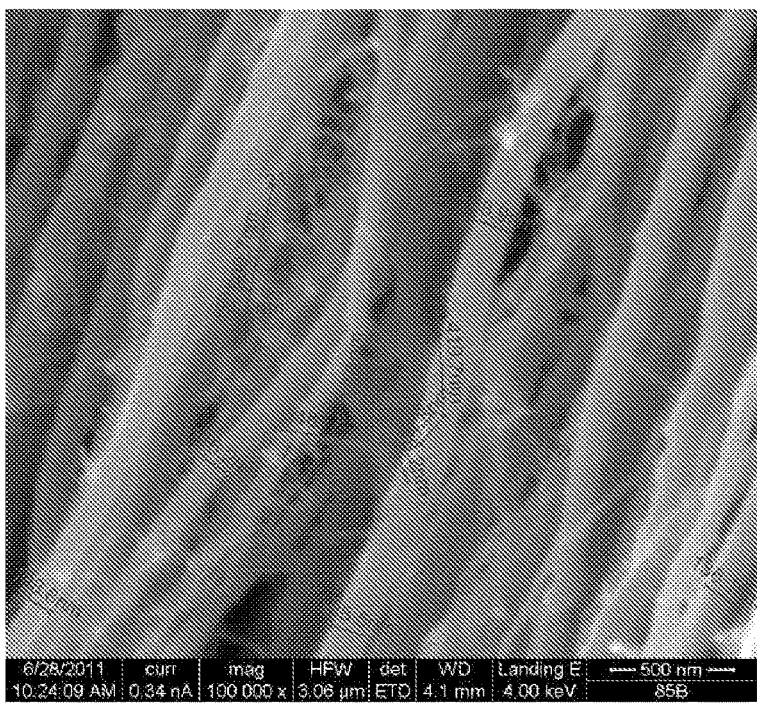
FIG. 31 depicts another SEM image of carbon nanotubes from sample 85B at 100,000× magnification.

The resulting product, which was scraped off the wall of the tube, is depicted in FIGS. 26, 27, 28, 29, 30 and 31, at 400×, 2000×, 2000×, 80,000×, 100,000× and 100,000× magnification, respectively. At 400× magnification, the bi-modal size distribution is not apparent. At 2000× magnification, some "fuzz" may be visible, but that may be a function of lack of resolution; however, the parallel "forest" nature of the nanotubes is readily apparent. As indicated by FIGS. 29-31, at 80,000× magnification, and even more so at 100,000× magnification, the secondary growth is visible, and thus the bi-modal nature is more apparent.

Example 9—Sample 105

| Example | Carbon Oxide | Reducing Agent | Catalyst | Conditions |
|---|---|---|---|---|
| Example 9- Sample 105 | $CO_2$ | $H_2$ | Stainless steel | P = ~101 kPa Temp = ~650° C. Time = ~1 hour |

For Example 9, sample 105, stainless steel was used as the catalyst. The steel catalyst was placed in the furnace 1. The steps of purging the furnace, introducing reaction gases at the experimental pressure and temperature, stopping the reaction, and purging and cooling the furnace were performed, as outlined in Example 1 above. The reaction conditions are given in the chart.

Figure 32:
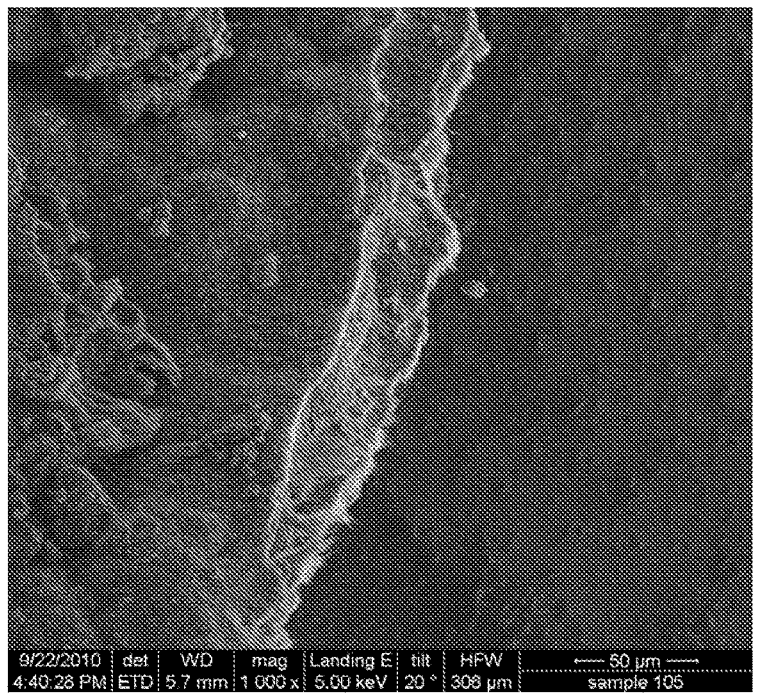
FIG. 32 depicts a SEM image of carbon nanotubes from sample 105 at 1,000× magnification.
Figure 33:
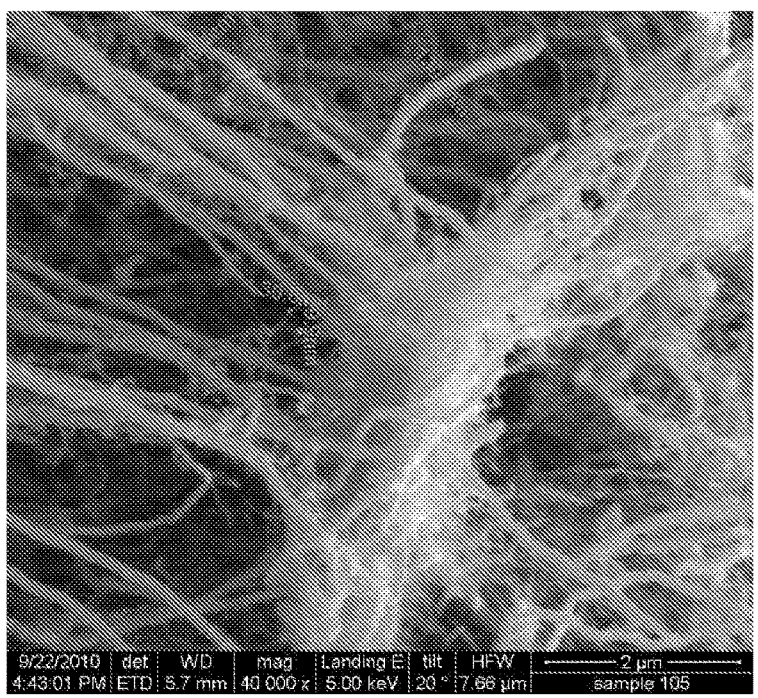
FIG. 33 depicts another SEM image of carbon nanotubes from sample 85B at 40,000× magnification.
Figure 34:
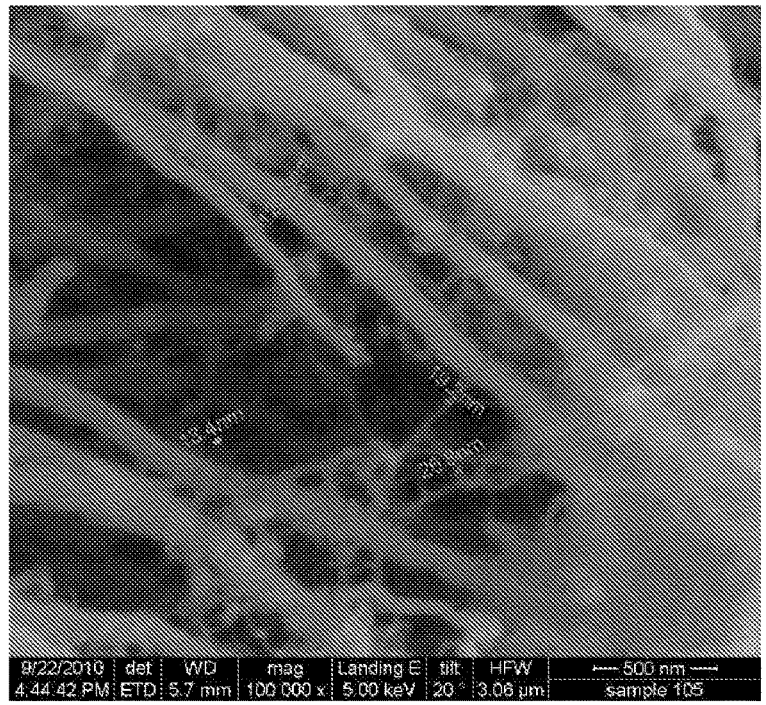
FIG. 34 depicts another SEM image of carbon nanotubes from sample 105 at 100,000× magnification.

The resulting product formed in what was observationally determined to be light growth (which formed in at 22-30.5 cm, and 46-61 cm along the length pipe) and large flakes (which formed 30.5-46 cm along the length of the pipe). Images of the large flakes are depicted in FIGS. 32, 33 and 34 at 1,000×, 40,000× and 100,000× magnification, respectively. At 1,000× magnification, the bi-modal size distribution is not apparent; however, the parallel "forest" nature of the nanotubes is readily apparent. However, as indicated by FIGS. 33 and 34, at 40,000× magnification, and even more so at 100,000× magnification, the secondary growth is visible, and thus the bi-modal nature is more apparent.

Example 10—Sample 108

| Example | Carbon Oxide | Reducing Agent | Catalyst | Conditions |
|---|---|---|---|---|
| Example 10- Sample 108 | $CO_2$ | $H_2$ | Mild steel pipe | P = ~101 kPa Temp = ~650° C. Time = ~1 hour |

For Example 10, sample 108, a mild steel pipe (schedule 40) was used as the catalyst. The steps of purging the furnace, introducing reaction gases at the experimental pressure and temperature, stopping the reaction, and purging and cooling the furnace were performed, as outlined in Example 1 above. The reaction conditions are given in the chart.

Figure 35:
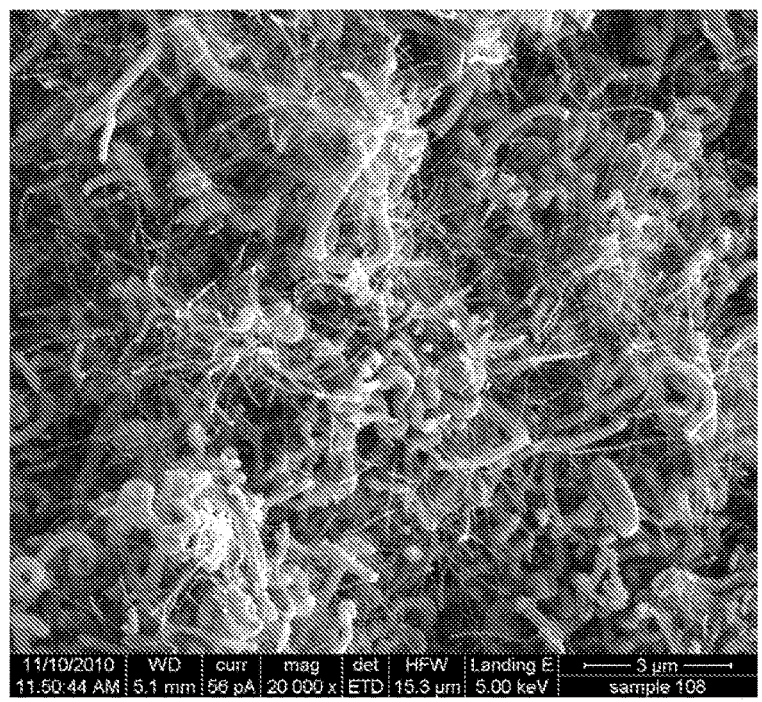
FIG. 35 depicts a SEM image of carbon nanotubes from sample 108 at 20,000× magnification.
Figure 36:
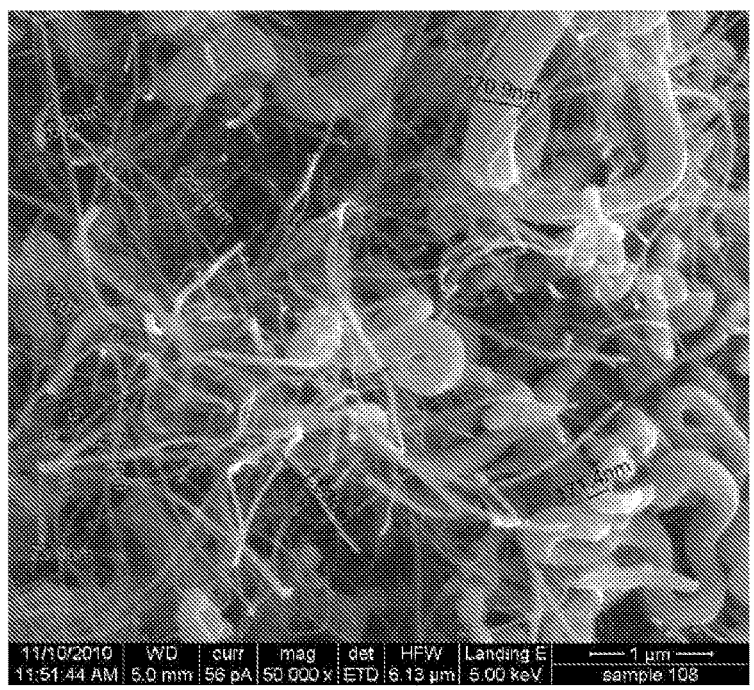
FIG. 36 depicts another SEM image of carbon nanotubes from sample 108 at 50,000× magnification.
Figure 37:
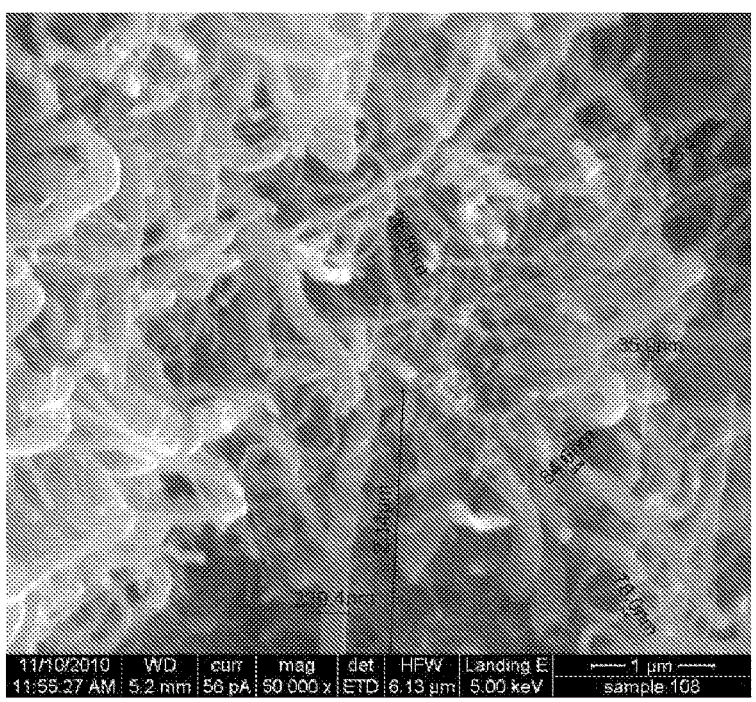
FIG. 37 depicts another SEM image of carbon nanotubes from sample 108 at 50,000× magnification.
Figure 38:
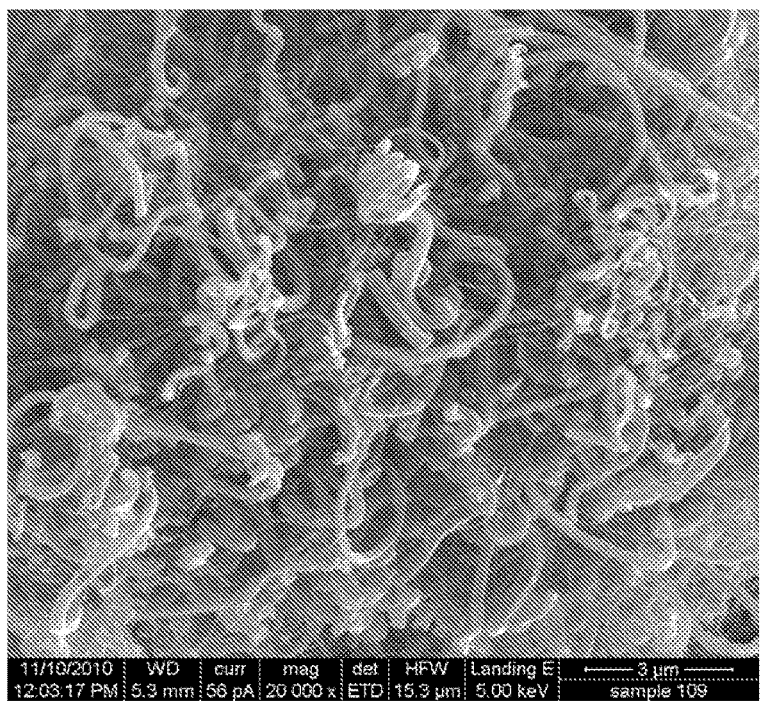
FIG. 38 depicts a SEM image of carbon nanotubes from sample 109 at 20,000× magnification.
Figure 39:
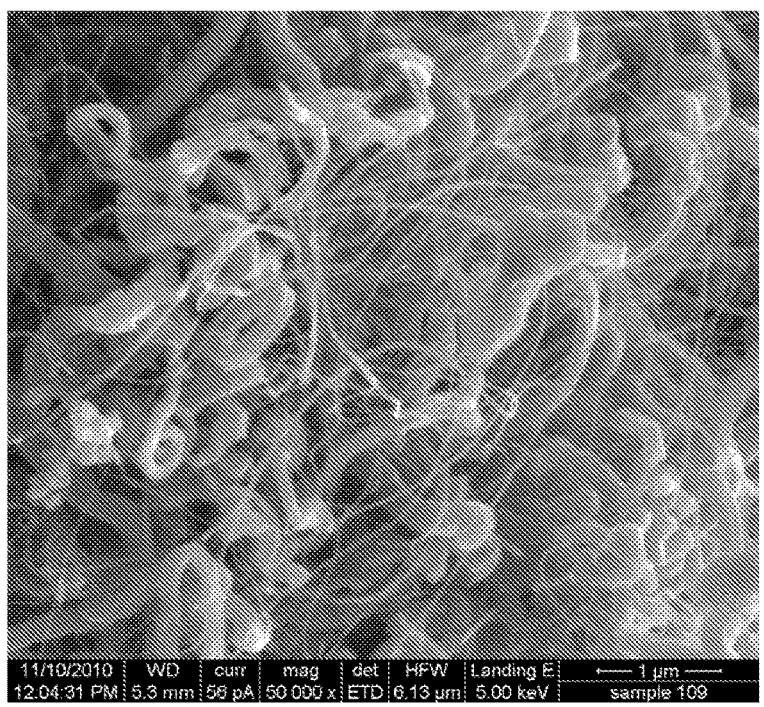
FIG. 39 depicts another SEM image of carbon nanotubes from sample 109 at 50,000× magnification.
Figure 40:
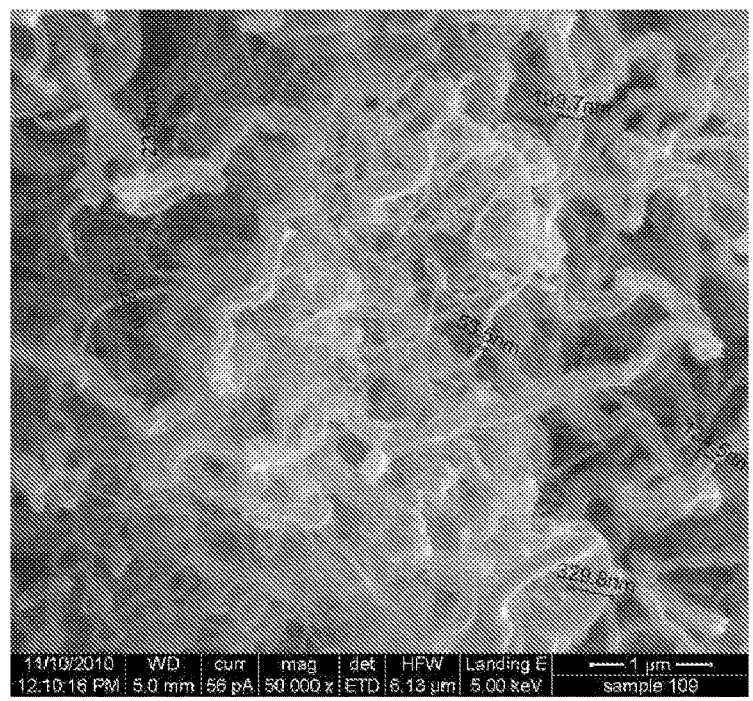
FIG. 40 depicts another SEM image of carbon nanotubes from sample 109 at 50,000× magnification.
Figure 41:
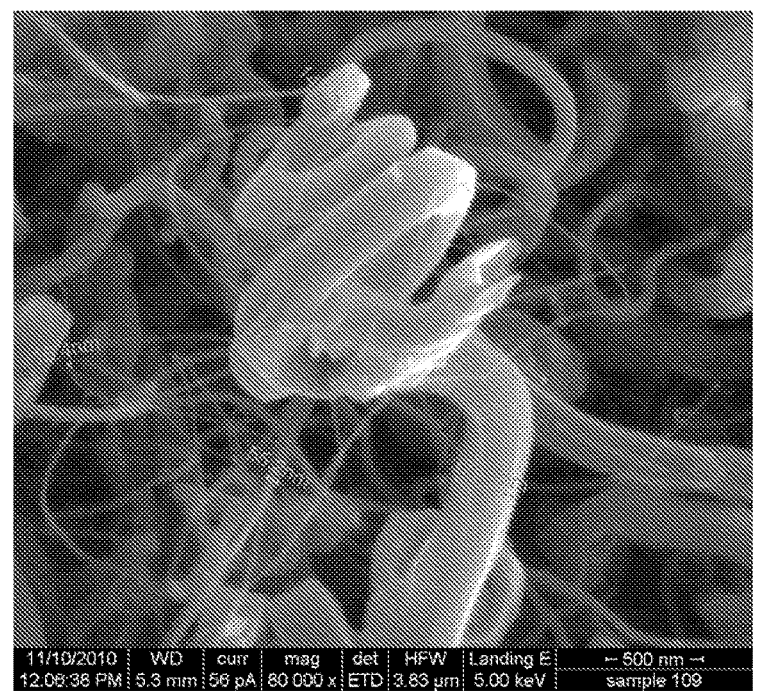
FIG. 41 depicts another SEM image of carbon nanotubes from sample 109 at 80,000× magnification.
Figure 42:
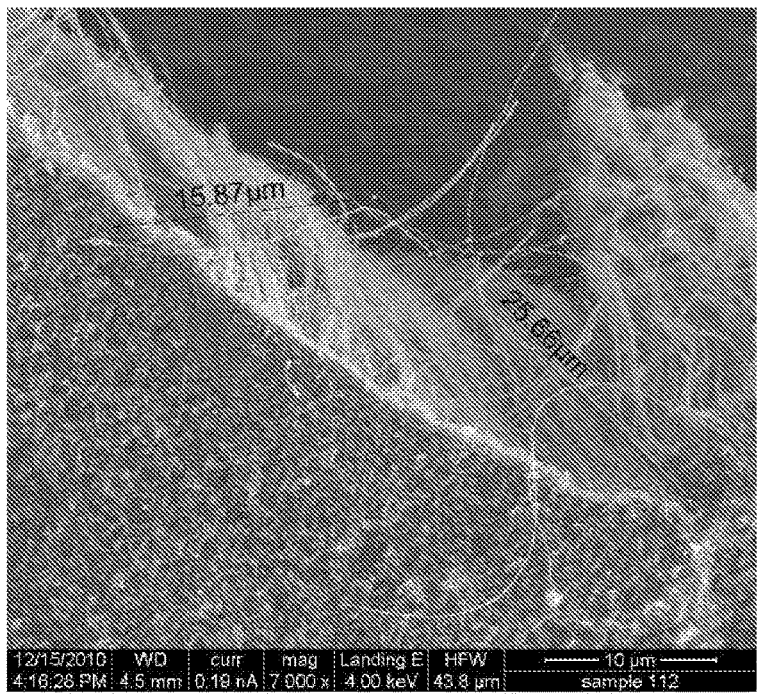
FIG. 42 depicts a SEM image of carbon nanotubes from sample 112 at 7000× magnification.

The resulting product is depicted in FIGS. 35, 36 and 37 at 20,000×, 50,000×, and 50,000× magnification, respectively. In this sample, even at 20,000× magnification, the bi-modal size distribution is apparent.

Example 11—Sample 109

| Example | Carbon Oxide | Reducing Agent | Catalyst | Conditions |
|---|---|---|---|---|
| Example 11-Sample 109 | $CO_2$ | $H_2$ | Mild steel pipe | P = ~101 kPa<br>Temp = ~650° C.<br>Time = ~4 hours |

For Example 11, sample 109, a mild steel pipe (schedule 40) was used as the catalyst. The steps of purging the furnace, introducing reaction gases at the experimental pressure and temperature, stopping the reaction, and purging and cooling the furnace were performed, as outlined in Example 1 above. The reaction conditions are given in the chart.

The resulting product is depicted in FIGS. 38, 39, 40 and 41 at 20,000×, 50,000×, 50,000×, and 80,000× magnification, respectively. In this sample, even at 20,000× magnification, the bi-modal size distribution is apparent. Careful review of FIG. 41 indicates that the sample has a number of very fine small tubes (note one measured 15.4 nm in diameter) interlaced with very large tubes (note one measured 323.2 nm in diameter), and also that there are tubes of one or more intermediate diameters (note those measured at 55.2 nm and 142.9 nm in diameter), but again tubes with diameters in between the fine, intermediate, and large diameters appear absent from the images.

Example 12—Sample 112

| Example | Carbon Oxide | Reducing Agent | Catalyst | Conditions |
|---|---|---|---|---|
| Example 12-Sample 112 | $CO_2$ | $H_2$ | Stainless steel pipe | P = ~111-116 kPa<br>Temp = ~600° C. |

For Example 12, sample 112, stainless steel pipe was used as the catalyst. The steps of purging the furnace, introducing reaction gases at the experimental pressure and temperature, stopping the reaction, and purging and cooling the furnace were performed, as outlined in Example 1 above. The reaction conditions are given in the chart.

Figure 43:
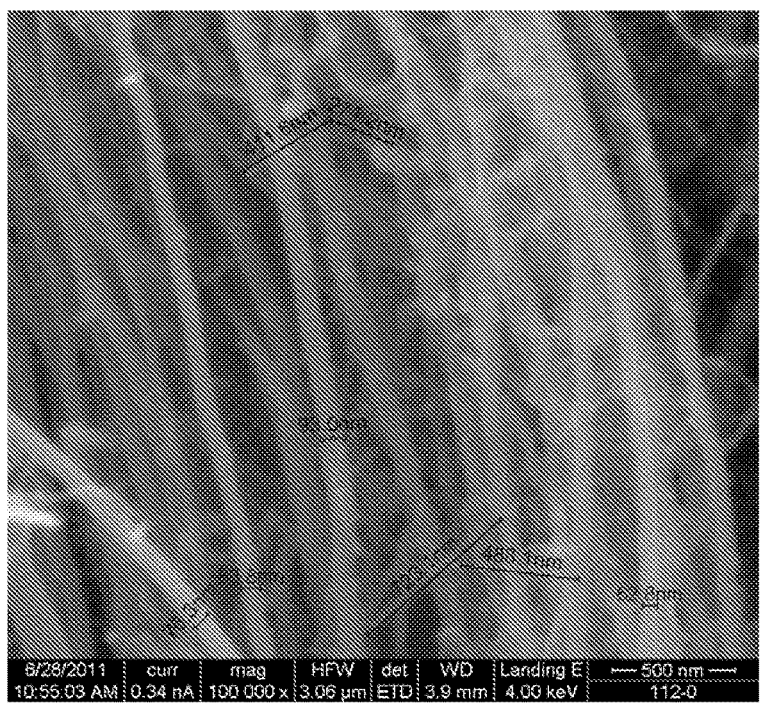
FIG. 43 depicts another SEM image of carbon nanotubes from sample 112 at 100,000× magnification.
Figure 44:
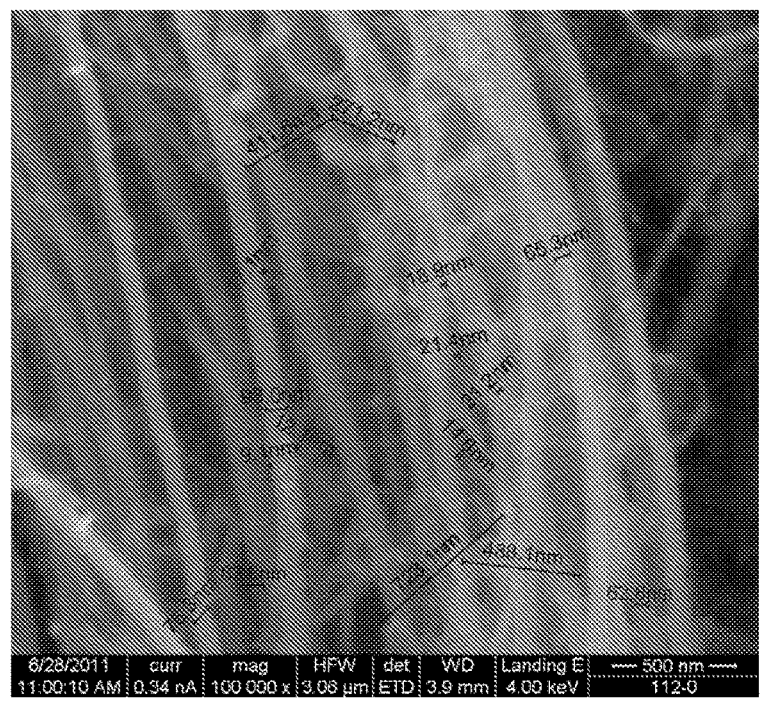
FIG. 44 depicts another SEM image of carbon nanotubes from sample 112 at 100,000× magnification.
Figure 45:
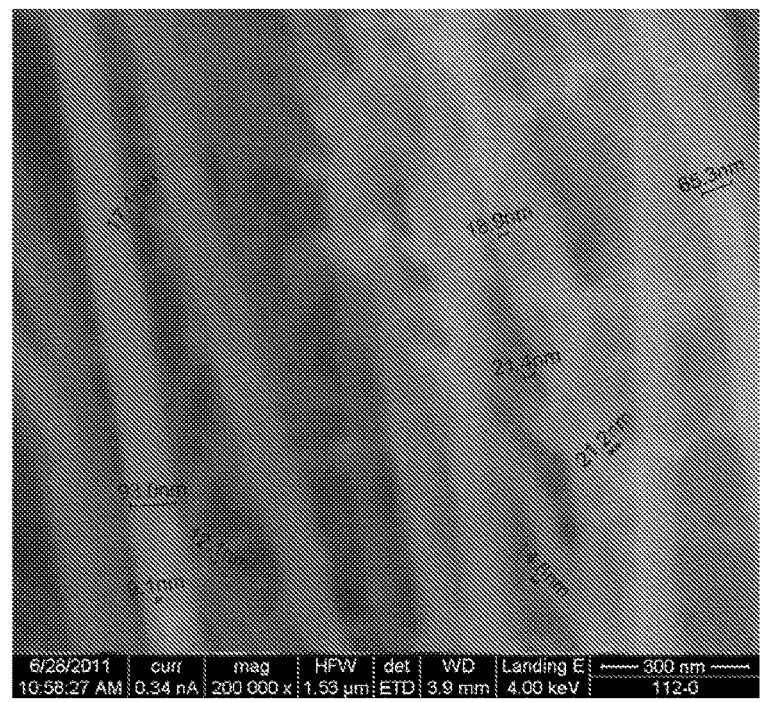
FIG. 45 depicts another SEM image of carbon nanotubes from sample 112 at 200,000× magnification.

The resulting product is depicted in FIGS. 42, 43, 44 and 45 at 7000×, 100,000×, 100,000×, and 200,000× magnification, respectively. At 7,000× magnification, the parallel "forest" nature of the nanotubes is readily apparent, some "fuzz" is also apparent where secondary growth is present, but the resolution is too low to resolve the fuzz as carbon nanotubes. As indicated by FIGS. 43-45, at 100,000× magnification, and even more so at 200,000× magnification, the secondary growth is visible, and thus the bi-modal nature is more apparent.

Example 13—Sample 115

| Example | Carbon Oxide | Reducing Agent | Catalyst | Conditions |
|---|---|---|---|---|
| Example 13-Sample 115 | $CO_2$ | $H_2$ | Mild steel pipe | P = ~112-117 kPa<br>Temp = ~650° C.<br>Time = ~4 hours |

For Example 13, sample 115, a mild steel pipe [need embodiment going to this catalyst] (schedule 40) was used as the catalyst. The steps of purging the furnace, introducing reaction gases at the experimental pressure and temperature, stopping the reaction, and purging and cooling the furnace were performed, as outlined in Example 1 above. The reaction conditions are given in the chart.

Figure 46:
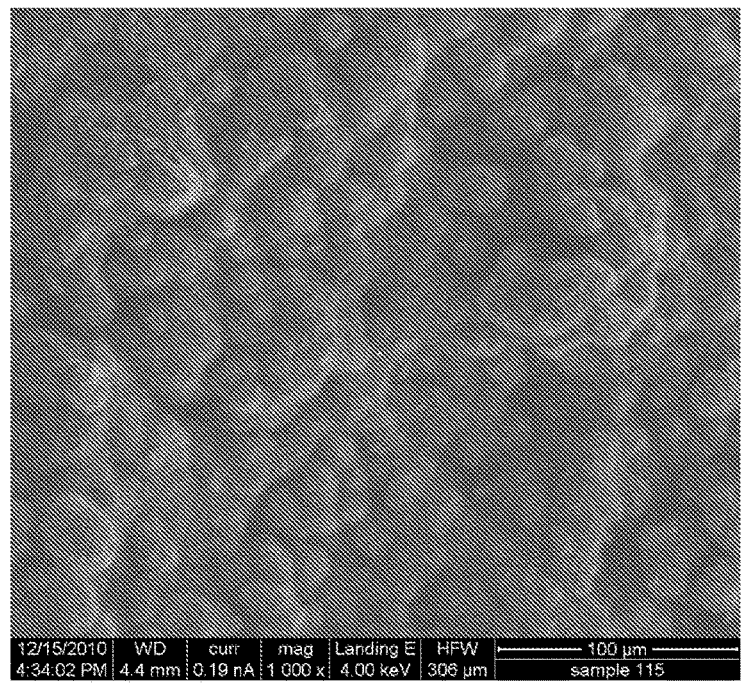
FIG. 46 depicts a SEM image of carbon nanotubes from sample 115 at 1,000× magnification.
Figure 47:
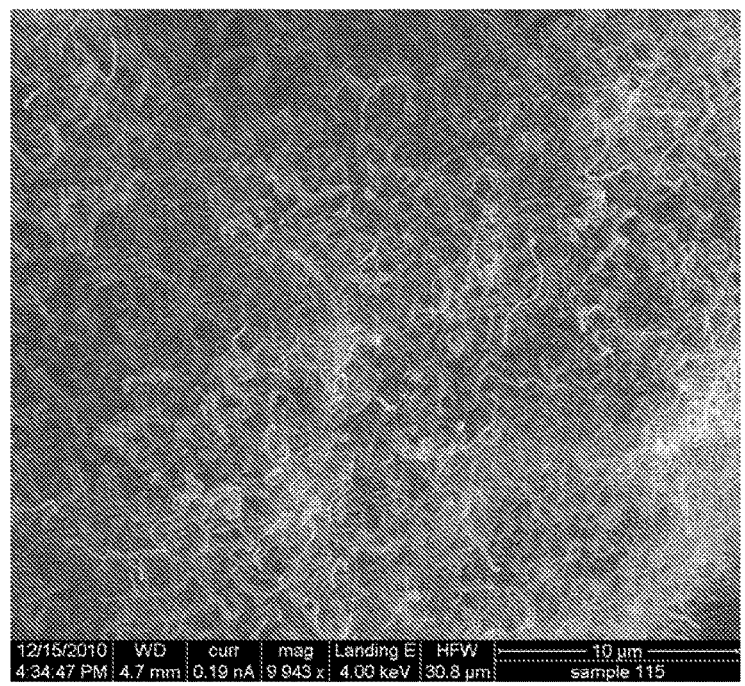
FIG. 47 depicts another SEM image of carbon nanotubes from sample 115 at 9943× magnification.
Figure 48:
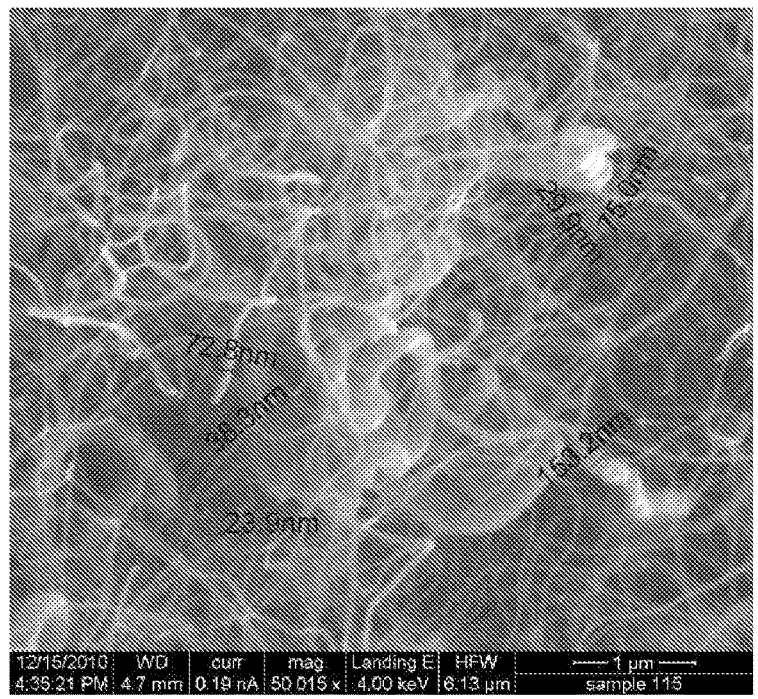
FIG. 48 depicts another SEM image of carbon nanotubes from sample 115 at 50,015× magnification.

The resulting product formed as large flakes in the middle 30.5 cm (12 inches) of the steel pipe. Images of the large flakes are depicted in FIGS. 46, 47, and 48 at 1,000×, 9,943× and 50,004× magnification, respectively. At 1,000× magnification, the bi-modal size distribution is not apparent. At 9,943× magnification, tubes of different sizes seem to appear. At 50,000× magnification, secondary growth is visible, and thus the bi-modal nature is more apparent.

Example 14—Sample 118

| Example | Carbon Oxide | Reducing Agent | Catalyst | Conditions |
|---|---|---|---|---|
| Example 14-Sample 118 | $CO_2$ | $H_2$ | Mild steel pipe | P = ~109-117 kPa<br>Temp = ~700° C.<br>Time = ~4 hours |

For Example 14, sample 118, a mild steel pipe (schedule 40) was used as the catalyst. The steps of purging the furnace, introducing reaction gases at the experimental pressure and temperature, stopping the reaction, and purging and cooling the furnace were performed, as outlined in Example 1 above. The reaction conditions are given in the chart.

Figure 49:
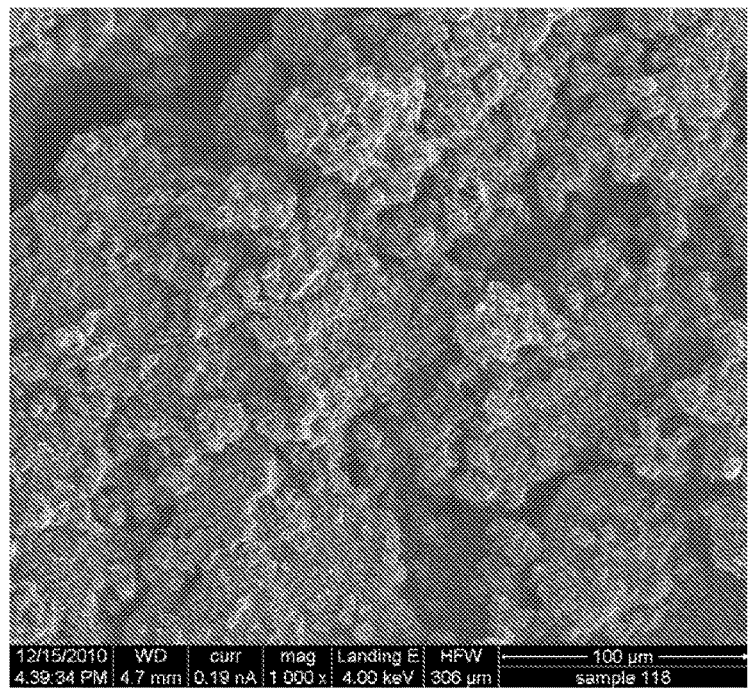
FIG. 49 depicts a SEM image of carbon nanotubes from sample 118 at 1,000× magnification.
Figure 50:
FIG. 50 depicts another SEM image of carbon nanotubes from sample 118 at 50,000× magnification.
Figure 51:
FIG. 51 depicts another SEM image of carbon nanotubes from sample 118 at 100,000× magnification.
Figure 52:
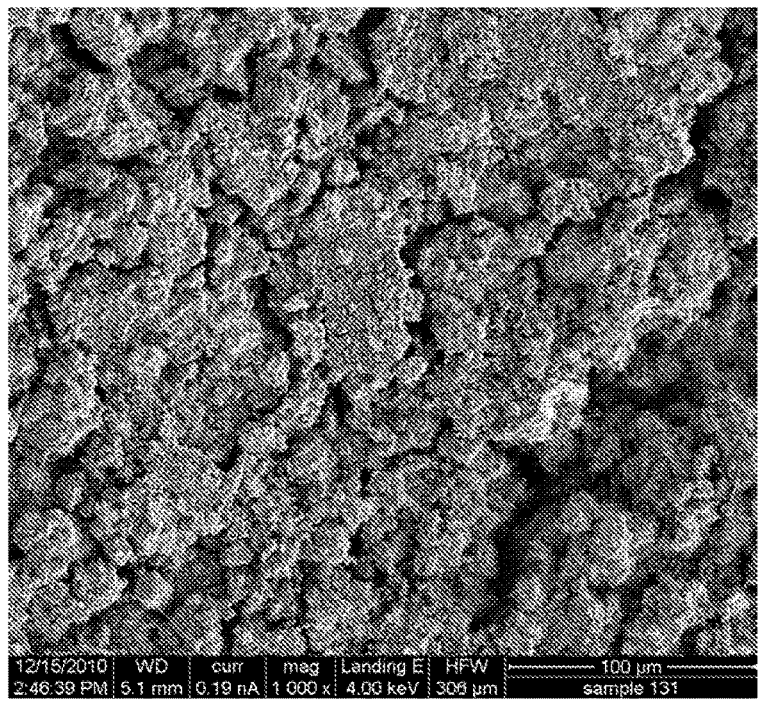
FIG. 52 depicts a SEM image of carbon nanotubes from sample 131 at 1,000× magnification.
Figure 53:
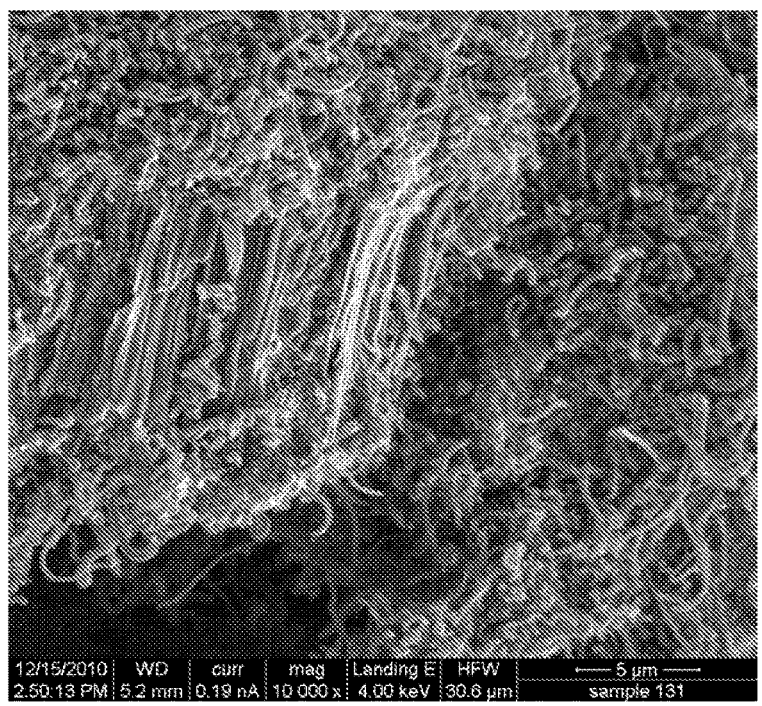
FIG. 53 depicts another SEM image of carbon nanotubes from sample 131 at 10,000× magnification.
Figure 54:
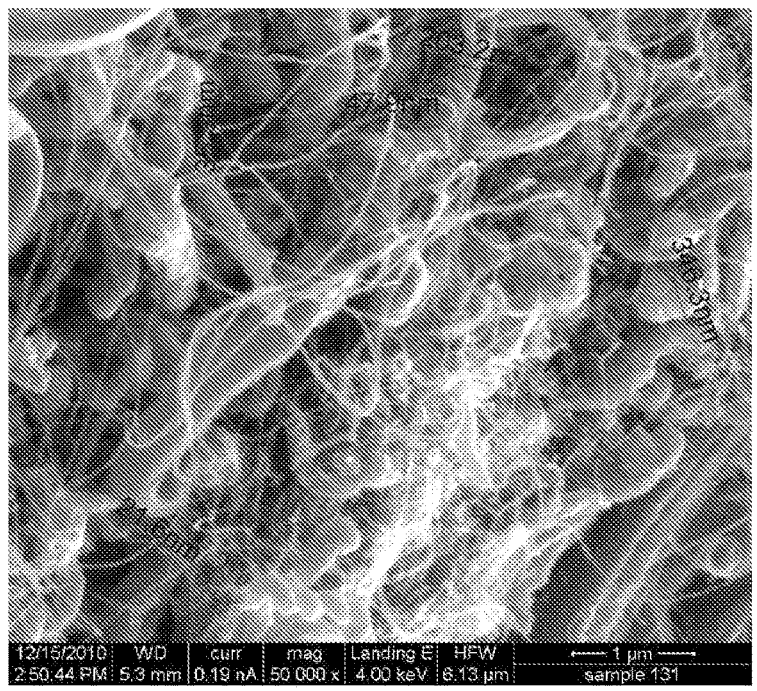
FIG. 54 depicts another SEM image of carbon nanotubes from sample 131 at 50,000× magnification.
Figure 55:
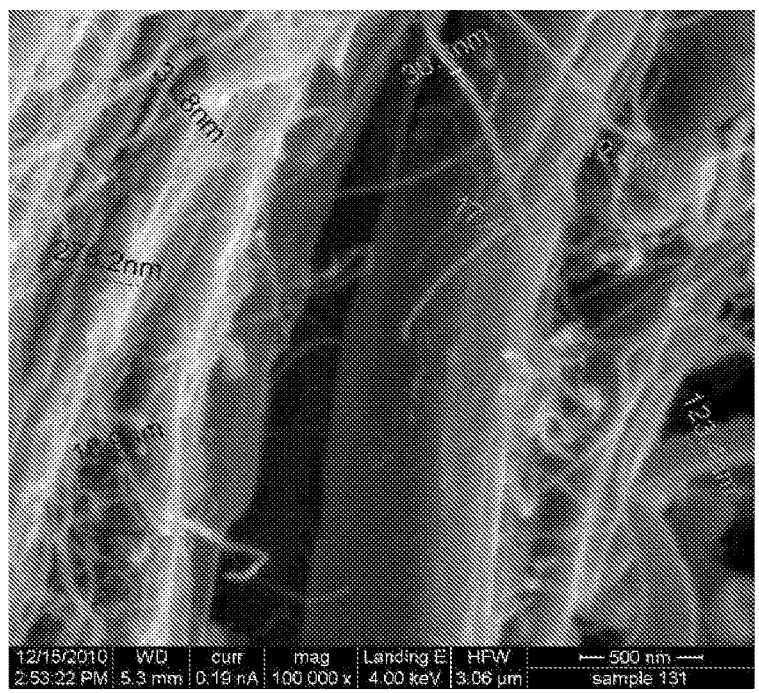
FIG. 55 depicts another SEM image of carbon nanotubes from sample 131 at 100,000× magnification.

The resulting product is depicted in FIGS. 49, 50, and 51 at 1,000×, 50,000×, and 100,000× magnification, respectively. At 1,000× magnification, the bi-modal size distribution is not apparent. At 50,000× and 100,000× magnification, secondary growth is visible, and some tubes with an intermediate diameter are also apparent.

Example 15—Sample 131

| Example | Carbon Oxide | Reducing Agent | Catalyst | Conditions |
|---|---|---|---|---|
| Example 15-Sample 131 | $CO_2$ | $H_2$ | Mild steel pipe | P = ~109-117 kPa<br>Temp = ~650° C. |

For Example 15, sample 131, a mild steel pipe (schedule 40) was used as the catalyst. The steps of purging the furnace, introducing reaction gases at the experimental pressure and temperature, stopping the reaction, and purging and cooling the furnace were performed, as outlined in Example 1 above. The reaction conditions are given in the chart.

Figure 56:
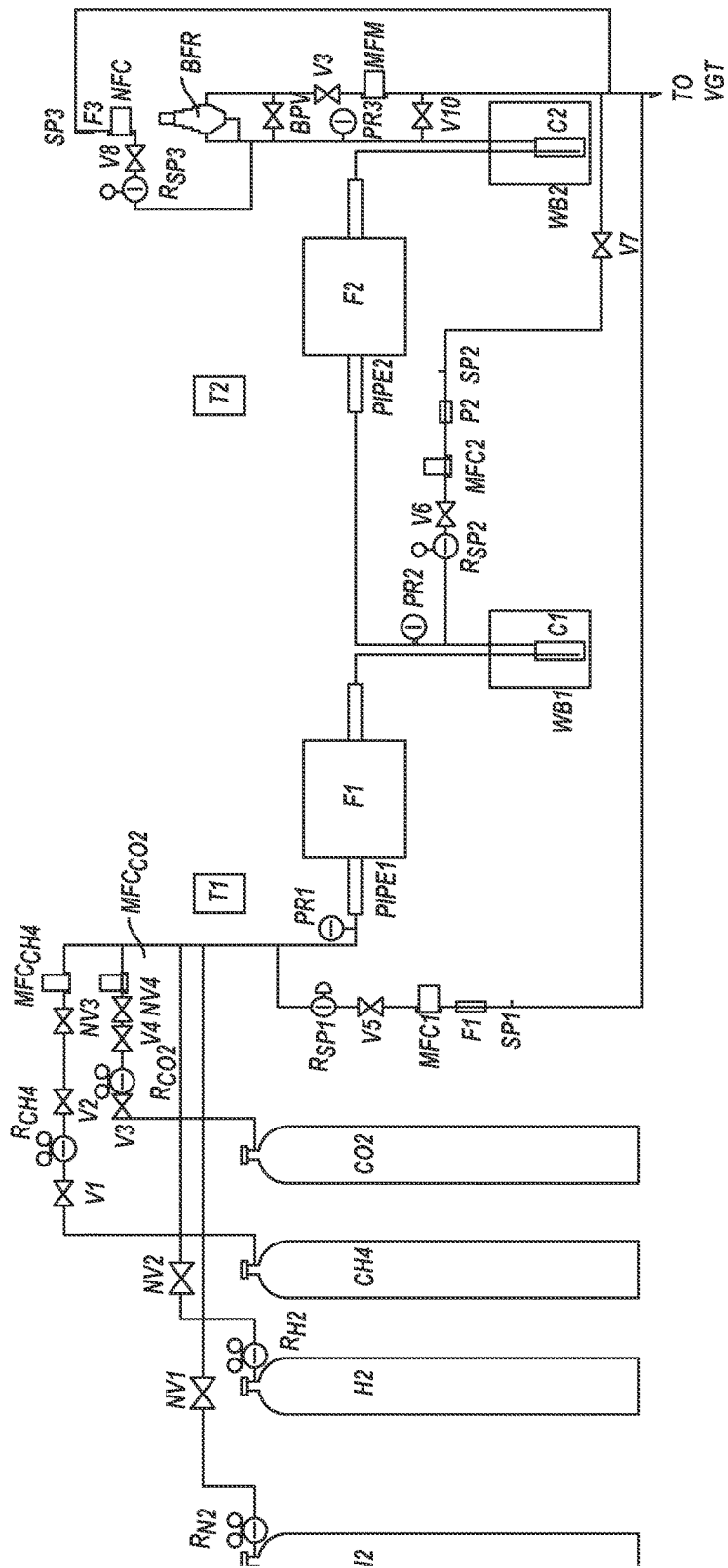
FIG. 56 depicts a schematic view of the high pressure experimental setup used for preparing samples of the compositions of matter disclosed in this application.

The resulting product is depicted in FIGS. 52, 53, 54 and 55 at 1,000×, 10,000×, 50,000×, and 100,000× magnifica- High Pressure Examples A schematic diagram of the experimental apparatus for a variety of high pressure experiments is depicted in FIG. 56. This high pressure apparatus does not recycle the reaction gases after water removal; rather, the reaction gases are vented after passing through the reactor. The experimental apparatus included a series of tanks for the purge and reaction gases. The tank regulators for the reactant gases, $CO_2$ and $CH_4$, had mass flow controllers with check valves. The gases used for purging did not have mass flow controllers.

After the gas mixing point was a sampling point where the gas pressure was reduced and the gas allowed to flow into a mass spectrometer. The flow then passed into a 2.5 cm diameter, 1.2 m long 304 stainless steel pipe (schedule 40) that was placed in a tube furnace F1 (model number 890295, available from High Temperature Furnaces by CM, Inc., of Bloomfield, Ill., with dimensions 63 cm×38 cm), where the reactions took place. After the first tube furnace F1, the gas proceeded to a condenser C1, where water was condensed to 0° C. by an ice/water bath. After the condenser C1, there was another gas sampling point. The main gas flow continued into another 2.5 cm diameter, 1.2 m long 304 stainless steel pipe (schedule 40) placed in another tube furnace F2 [model number 870771, available from High Temperature Furnaces by CM, Inc., of Bloomfield, Ill., with dimensions 49 cm×25 cm), where a second reaction took place.

The gas leaving the second reactor F2 had a condenser C2 followed by a gas sampling point. Finally, the gas left the system through a vent and a mass flow meter. The gas sampling points all had a two-stage gas pressure regulator to regulate the gas pressure to 0.20 MPa (15 psig).

The sample gas then flowed at 20 sccm through a mass flow meter to a 0.5 micron sintered metal filter. The majority of the gas flow was then vented, while a minority of the sampling gas flow entered a 1.83 m capillary that reduced the pressure before entering the mass spectrometer (series number 91065 Universal Gas Analyzer, manufactured by Stanford Research System, of Stanford, Ga.).

A sample of catalyst, steel sand blasting grit (25 grit), was placed in a 8.5 cm×1.5 cm quartz boat at the center of the second furnace F2. A K-type thermocouple inserted into each furnace from the end cap at 61 cm (24 inches) measured the furnace centerline temperature. The center line temperatures for each experiment are shown below. The gas flow was regulated to 4.24 MPa (600 psig).

In operation, initially the system was purged with nitrogen for about 10 minutes. Nitrogen at 4.24 MPa (600 psig) was used to detect leaks and to fill the system with inert gas. At this point, hydrogen was allowed to purge the system to check for leaks, and continued to flow until the gas sampling system detected greater than 90% hydrogen. The hydrogen purge at high temperature reduces metal oxides including iron oxide on the catalyst surface.

Both high temperature furnaces F1 and F2 were allowed to heat to operational temperature of 850° C. The time to heat up the furnaces was approximately 1 hr. After reduction of the catalysts at the operational temperatures of the furnaces, the selected mixture of methane and carbon dioxide were metered into the system to provide the selected flow rate and the selected ratio of methane to carbon dioxide. Both gas pressure regulators were set at 4.58 MPa (650 psig) to meter the reactants into the system. During the run, the gas flow and furnace temperatures were monitored and controlled.

When each test was done, methane and carbon dioxide gas tanks were shut off and the system was purged with hydrogen for about 30 minutes and then with nitrogen for about another 30 minutes. At this point the furnaces were allowed to cool down overnight. The sample of catalyst was pulled out in the morning of the next day when the furnace was cool.

Figure 57:
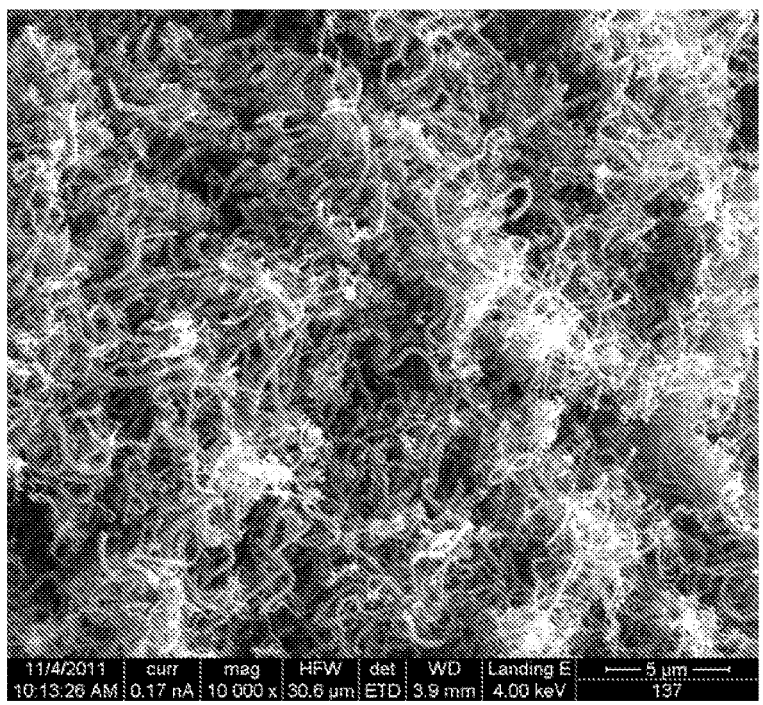
FIG. 57 depicts a SEM image of carbon nanotubes from sample 137 at 10,000× magnification.
Figure 58:
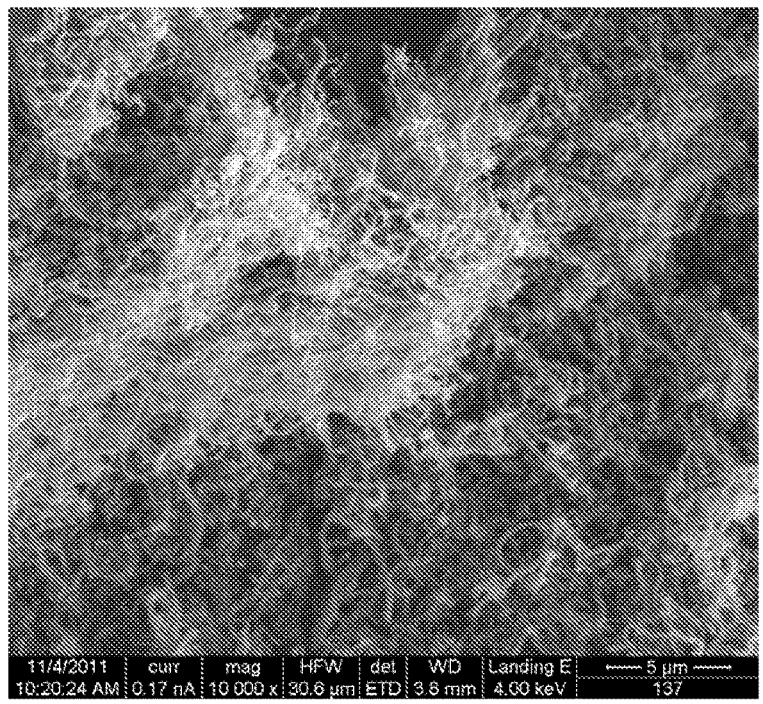
FIG. 58 depicts another SEM image of carbon nanotubes from sample 137 at 10,000× magnification.
Figure 59:
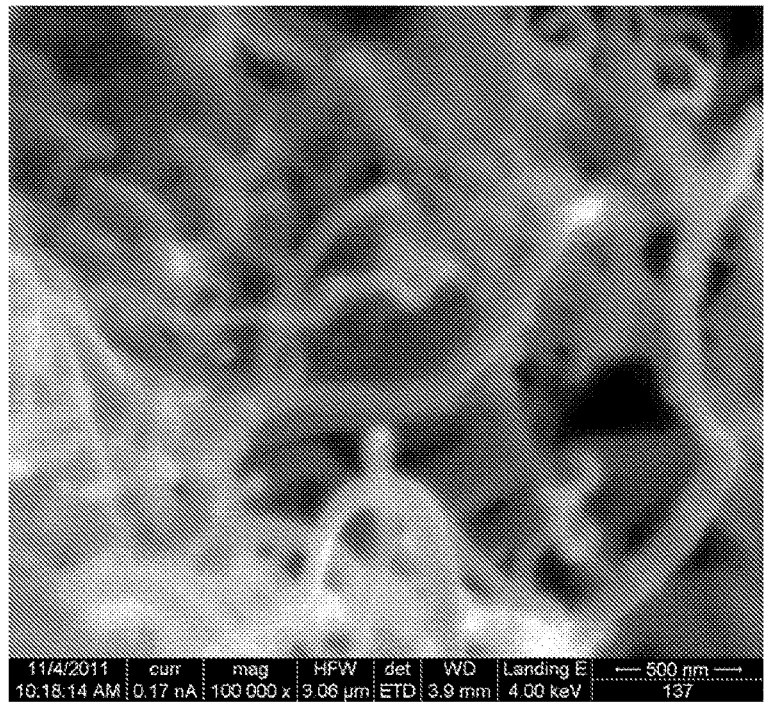
FIG. 59 depicts another SEM image of carbon nanotubes from sample 137 at 100,000× magnification.

FIGS. 57-74 are SEM images of various sample product results. All of these samples were formed using $CO_2$, with $CH_4$ as the reducing agent. All of the experiments were conducted at approximately 4.24 MPa (600 psig). The other specific reaction conditions for each of the samples are set forth in Examples 16-29:

Example 16—Sample 137 (FIGS. 57-59)

Dual reactors in series.
Catalyst: steel sand blasting grit, 0.7 mm (25 grit), the grit was placed in a quartz boat at the center of the furnace.
Reaction gases: 50% $CH_4$ and 50% $CO_2$.
Operating conditions: 850° C. for both furnace 1 and furnace 2; 4.14 MPa (600 psi).
Run time: 3 hours.
The resulting product is depicted in FIGS. 57, 58 and 59 at 10,000×, 10,000×, and 100,000× magnification, respectively. Note the apparently entangled nanotubes of the "pillow" morphology. At 10,000× magnification, the bi-modal size distribution is not apparent. However, as indicated by FIG. 59, at 100,000× magnification, the bi-modal nature is more apparent.

Figure 60:
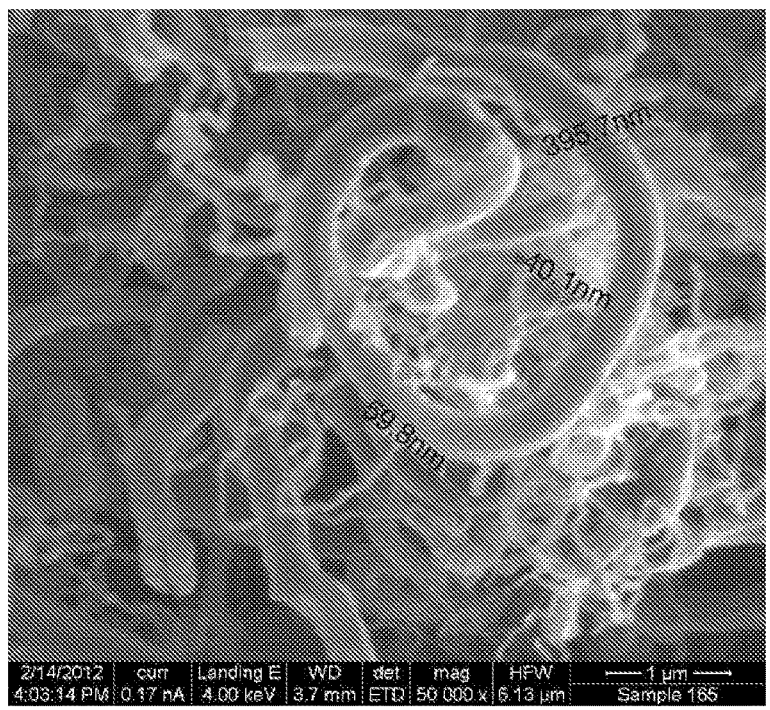
FIG. 60 depicts a SEM image of carbon nanotubes from sample 165 at 50,000× magnification.

Example 17—Sample 165 (FIG. 60)

Dual reactors: two reactors in series. A quartz tube was inserted inside the stainless steel pipe (schedule 40) for reactor 2.
Catalyst: a steel wool.
Reaction gases: 45% $CO_2$, 42.75% $CH_4$, 2.25% Ar and 10% $H_2$.
Operating conditions: 900° C. for furnace 1; 850° C. for furnace 2; 4.14 MPa (600 psi).
Run time: 6 hours.
Note: The sample shown in FIG. 60 was taken from the quartz tube in the second reactor.
The resulting product is depicted in FIG. 60 at 50,000× magnification.

Figure 61:
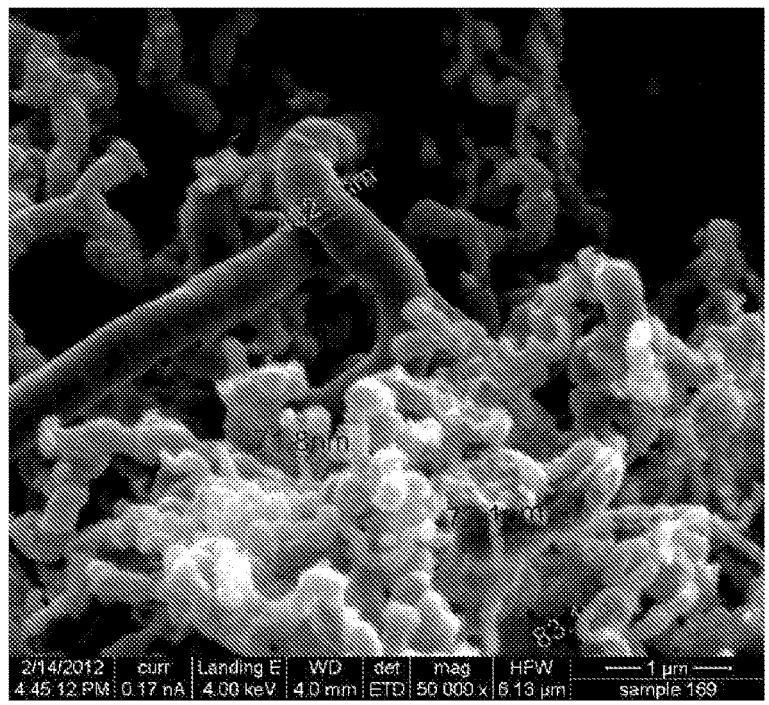
FIG. 61 depicts another SEM image of carbon nanotubes from sample 165 at 50,000× magnification.

Example 18—Sample 169 (FIG. 61)

Single reactor.
Catalyst: 304 stainless steel pipe (schedule 40).
Reaction gases: 33.3% $CO_2$, 63.4% $CH_4$, 3.3% Ar.
Operating conditions: 900° C.; 4.14 MPa (600 psi).
Run time: 3 hours.
Note: The sample was taken approximately 30.5 cm (12 inches) downstream of the reactor. The resulting product is depicted in FIG. 61 at 50,000× magnification.

Figure 62:
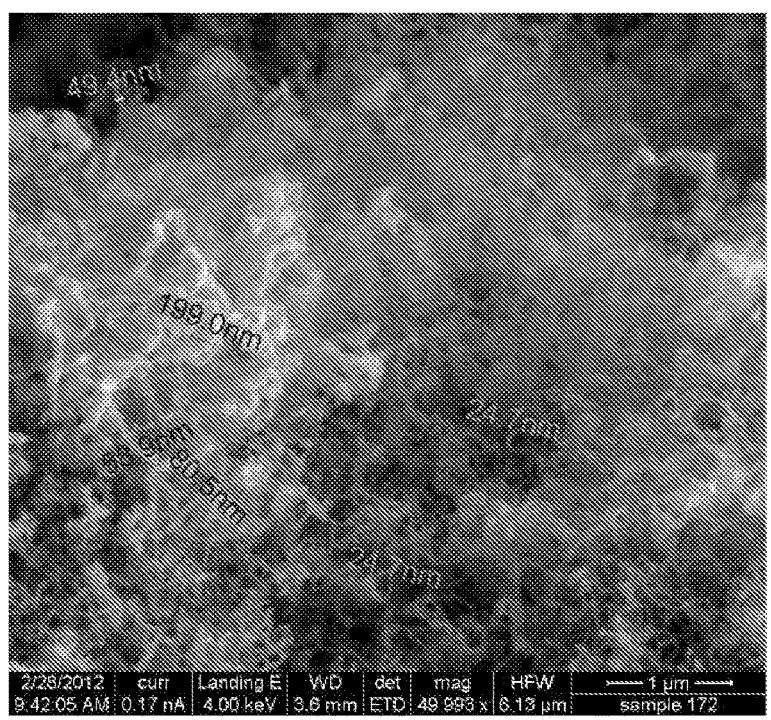
FIG. 62 depicts a SEM image of carbon nanotubes from sample 172 at 49,993× magnification.

Example 19—Sample 172 (FIG. 62

Single reactor.
Catalyst: 304 stainless steel pipe (schedule 40).
Reaction gases: 33.3% $CO_2$, 63.4% $CH_4$, 3.3% Ar.

Operating conditions: 850° C.; 4.14 MPa (600 psi).
Run time: 6 hours.
Note: The sample was taken approximately 41 cm (16 inches) upstream of the reactor. The resulting product is depicted in FIG. 62 at 49,993× magnification.

Figure 63:
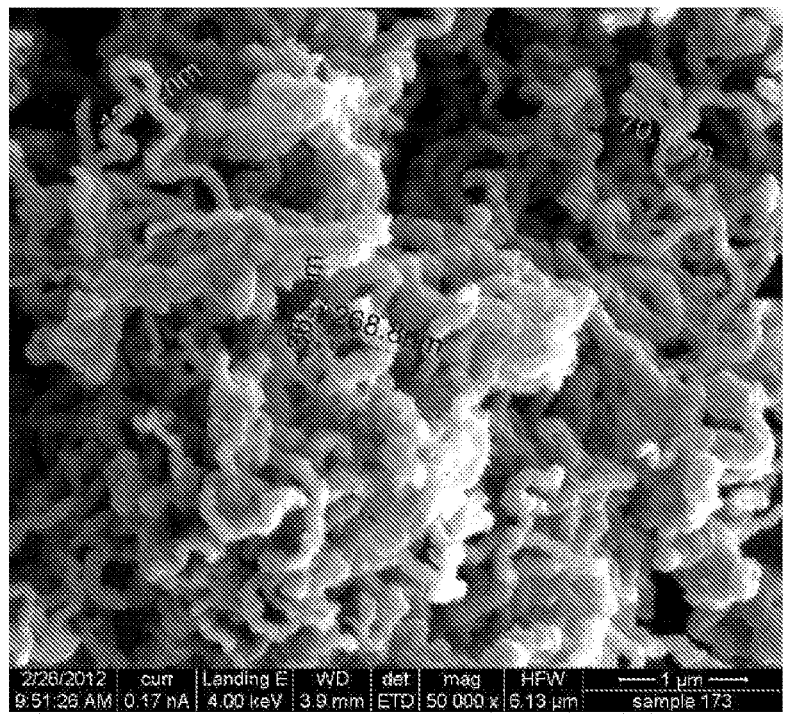
FIG. 63 depicts a SEM image of carbon nanotubes from sample 173 at 50,000× magnification.

Example 20—Sample 173 (FIG. 63

Single reactor.
Catalyst: 304 stainless steel pipe (schedule 40).
Reaction gases: 33.3% $CO_2$, 63.4% $CH_4$, 3.3% Ar.
Operating conditions: 850° C.; 4.14 MPa (600 psi).
Run time: 6 hours.
Note: The sample was taken approximately 48 cm (19 inches) upstream of the reactor.
The resulting product is depicted in FIG. 63 at 50,000× magnification.

Figure 64:
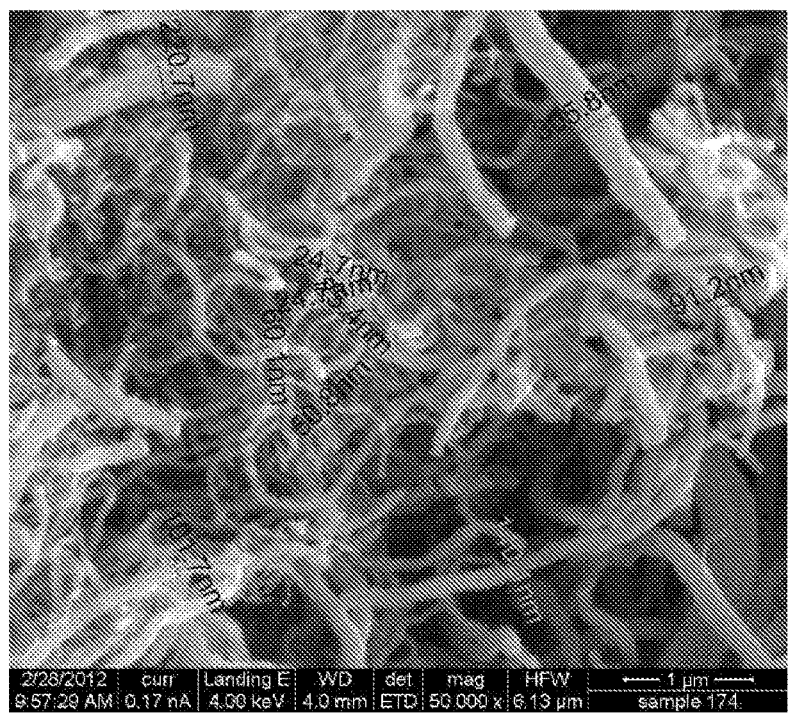
FIG. 64 depicts a SEM image of carbon nanotubes from sample 174 at 50,000× magnification.

Example 21—Sample 174 (FIG. 64

Dual reactors, in series. A quartz tube was inserted inside the stainless steel pipe (schedule 40) of the second reactor.
Catalyst: steel wool.
Reaction gases: 45% $CO_2$, 42.75% $CH_4$, 2.25% Ar and 10% $H_2$.
Operating conditions: 900° C. for furnace 1; 850° C. for furnace 2; 4.14 MPa (600 psi).
Run time: 6 hours.
Note: The sample was taken from the quartz tube in the second reactor. The resulting product is depicted in FIG. 64 at 50,000× magnification.

Figure 65:
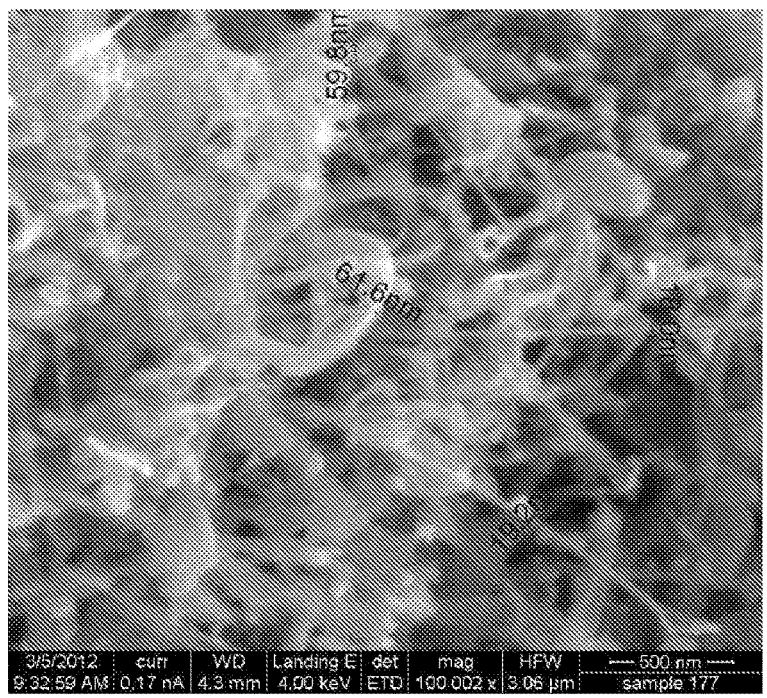
FIG. 65 depicts a SEM image of carbon nanotubes from sample 177 at 100,002× magnification.

Example 22—Sample 177 (FIG. 65)

Dual reactors in series. A quartz tube was inserted inside the stainless steel pipe (schedule 40) of the second reactor.
Catalyst: steel wool that had been previously washed with hydrochloric acid.
Reaction gases: 45% $CO_2$, 42.75% $CH_4$, 2.25% Ar and 10% $H_2$.
Operating conditions: 900° C. for furnace 1; 850° C. for furnace 2; 4.14 MPa (600 psi).
Run time: 4 hours.
Note: The sample was taken from the end of unconsumed steel wool in the second reactor. The resulting product is depicted in FIG. 65 at 100,002× magnification.

Figure 66:
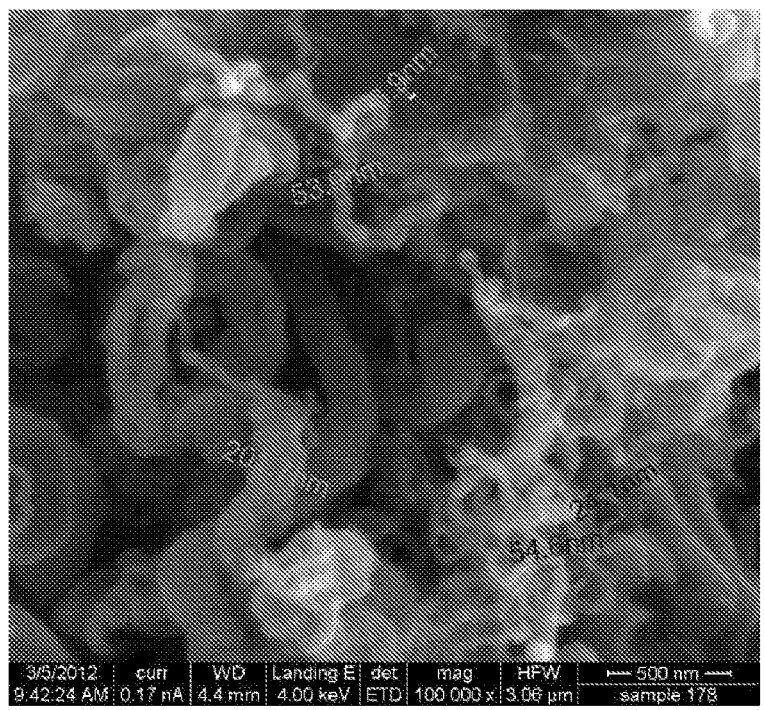
FIG. 66 depicts a SEM image of carbon nanotubes from sample 178 at 100,000× magnification.

Example 23—Sample 178 (FIG. 66)

Dual reactors in series. A quartz tube was inserted inside the stainless steel pipe (schedule 40) of the second reactor.
Catalyst: steel wool that had been previously washed with hydrochloric acid.
Reaction gases: 45% $CO_2$, 42.75% $CH_4$, 2.25% Ar and 10% $H_2$.
Operating conditions: 900° C. for furnace 1; 850° C. for furnace 2; 4.14 MPa (600 psi).
Run time: 4 hours.
Note: The sample was taken from the first furnace. The resulting product is depicted in FIG. 66 at 100,000× magnification.

Figure 67:
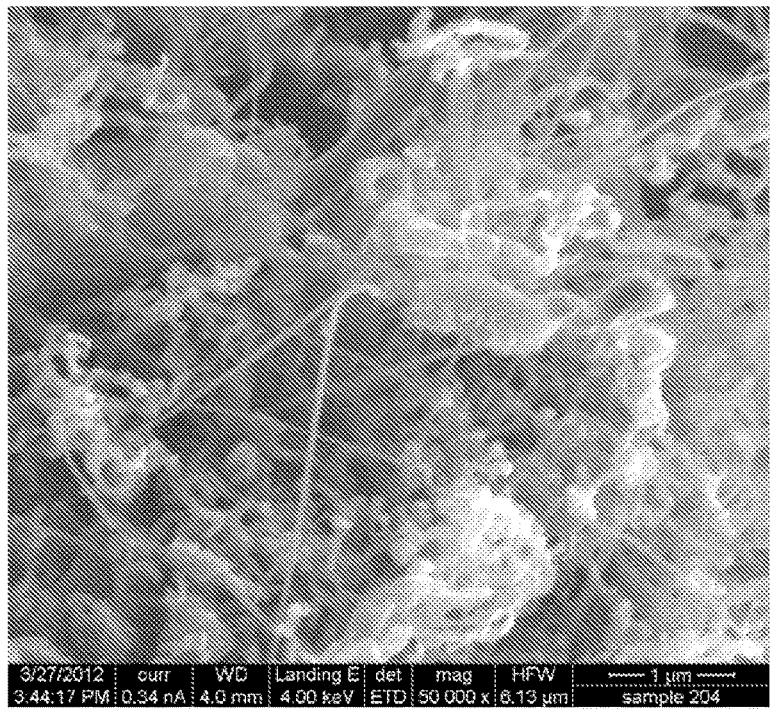
FIG. 67 depicts a SEM image of carbon nanotubes from sample 204 at 50,000× magnification.
Figure 68:
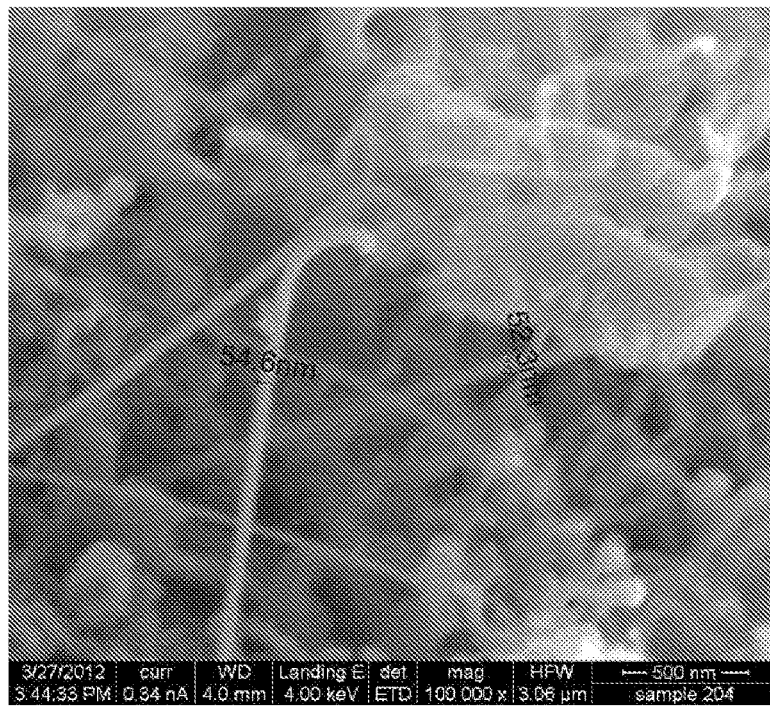
FIG. 68 depicts another SEM image of carbon nanotubes from sample 204 at 100,000× magnification.

Example 24—Sample 204 (FIGS. 67-68)

Dual reactors in series. A quartz tube was inserted inside the stainless steel pipe (schedule 40) of the second reactor.
Catalyst: steel wool that had been previously washed with hydrochloric acid.
Reaction gases: 10% $CO_2$, 76% $CH_4$, 4% Ar and 10% $H_2$.
Operating conditions: 900° C. for furnace 1, 850° C. for furnace 2; 4.14 MPa (600 psi).
Run time: 4 hours.
Note: The sample was taken at the downstream side of the quartz tube in the second reactor. The resulting product is depicted in FIGS. 67 and 68, at 50,000× and 100,000× magnification, respectively.

Figure 69:
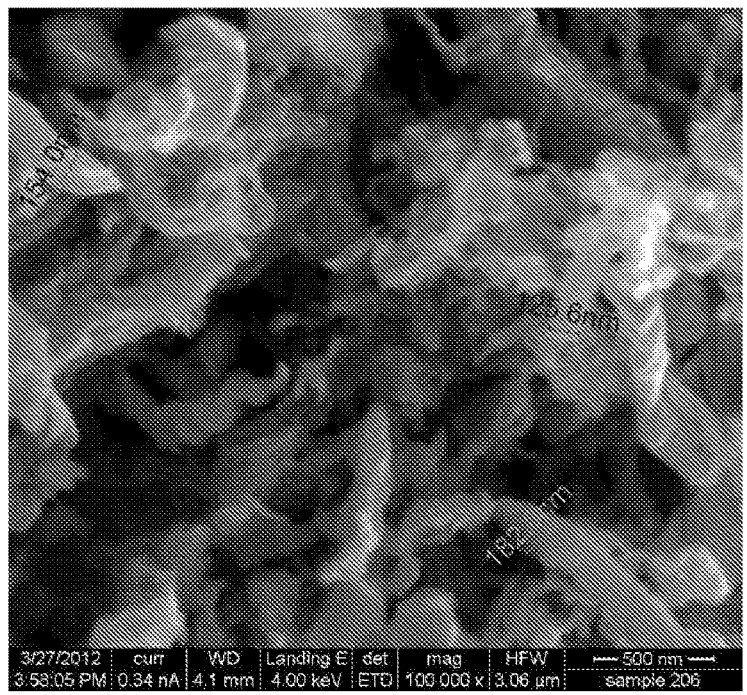
FIG. 69 depicts a SEM image of carbon nanotubes from sample 206 at 100,000× magnification.

Example 25—Sample 206 (FIG. 69)

Dual reactors in series. A quartz tube was inserted inside the stainless steel pipe (schedule 40) of the second reactor.
Catalyst: steel wool that had been previously washed with hydrochloric acid.
Reaction gases: 10% $CO_2$, 76% $CH_4$, 4% Ar and 10% $H_2$.
Operating conditions: 900° C. for furnace 1; 850° C. for furnace 2; 4.14 MPa (600 psi).
Run time: 4 hours.
Note: The sample was taken approximately 48 cm (19 inches) upstream of the quartz tube in the second reactor; the reaction temperature at this location was approximately 860° C.
The resulting product is depicted in FIG. 69 at 100,000× magnification.

Figure 70:
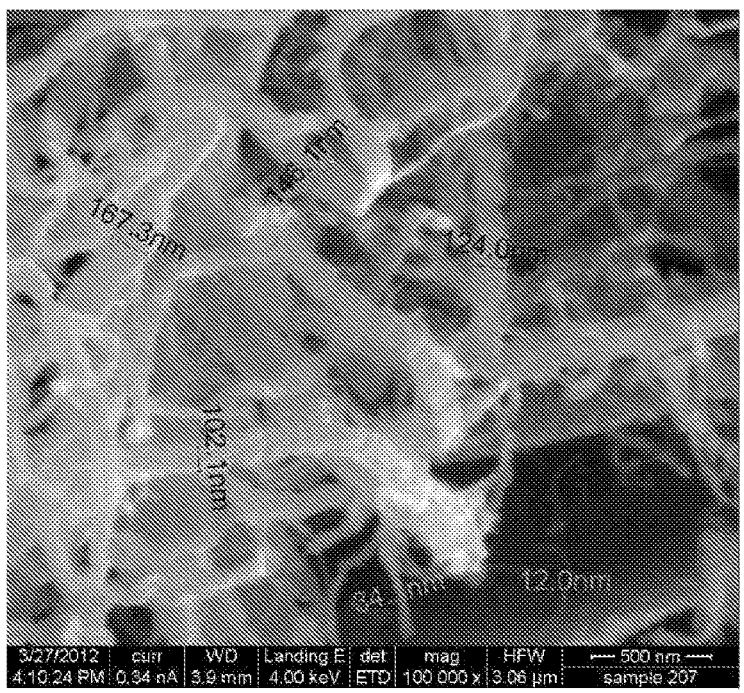
FIG. 70 depicts a SEM image of carbon nanotubes from sample 207 at 100,000× magnification.

Example 26—Sample 207 (FIG. 70)

Dual reactors in series. A quartz tube was inserted inside the stainless steel pipe (schedule 40) of the second reactor.
Catalyst: steel wool that had been previously been washed with hydrochloric acid.
Reaction gases: 10% $CO_2$, 76% $CH_4$, 4% Ar and 10% $H_2$.
Operating conditions: 900° C. for furnace 1; 850° C. for furnace 2; 4.14 MPa (600 psi).
Run time: 4 hours.
Note: The sample was taken approximately 43 cm (17 inches) upstream of the quartz tube in the second reactor. The reaction temperature at this location was approximately 867° C.
The resulting product is depicted in FIG. 70 at 100,000× magnification.

Figure 71:
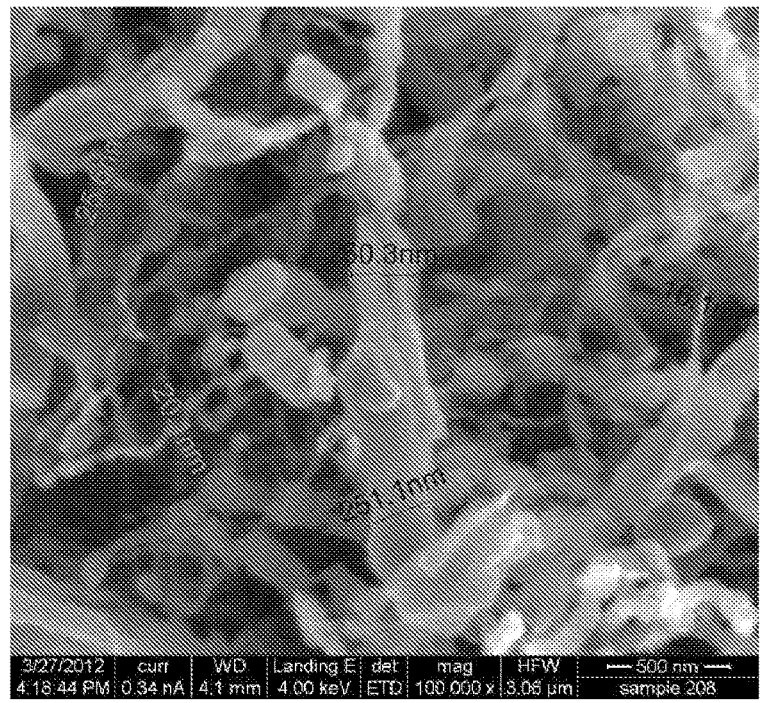
FIG. 71 depicts a SEM image of carbon nanotubes from sample 208 at 100,000× magnification.

Example 27—Sample 208 (FIG. 71)

Dual reactors in series. A quartz tube was inserted inside the stainless steel pipe (schedule 40) of the second reactor.
Catalyst: steel wool that had been previously washed with hydrochloric acid.
Reaction gases: 10% $CO_2$, 76% $CH_4$, 4% Ar and 10% $H_2$.
Operating conditions: 900° C. for furnace 1, 850° C. for furnace 2; 4.14 MPa (600 psi).
Run time: 4 hours.
Note: The sample was taken approximately 33 cm (13 inches) upstream of the quartz tube in the second reactor; the temperature at this location was approximately 844° C.
The resulting product is depicted in FIG. 71 at 100,000× magnification.

Figure 72:
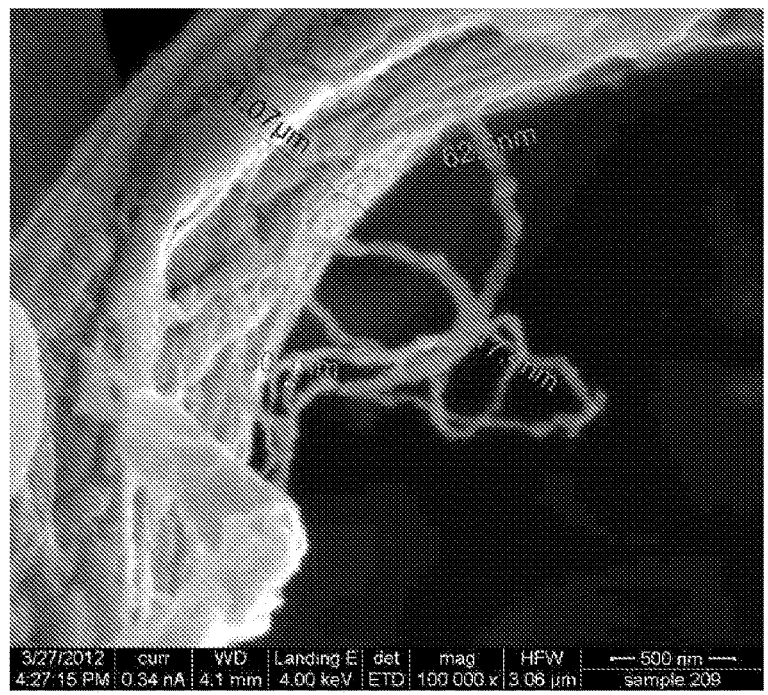
FIG. 72 depicts a SEM image of carbon nanotubes from sample 209 at 100,000× magnification.

Example 28—Sample 209 (FIG. 72)

Dual reactors in series. A quartz tube was inserted inside the stainless steel pipe (schedule 40) of the second reactor.
Catalyst: steel wool that had been previously washed with hydrochloric acid.

Reaction gases: 10% $CO_2$, 76% $CH_4$, 4% Ar and 10% $H_2$.
Operating conditions: 900° C. for furnace 1, 850° C. for furnace 2; 4.14 MPa (600 psi).
Run time: 4 hours.
Note: The sample was taken approximately 28 cm (11 inches) upstream of the quartz tube in the second reactor; the temperature at this location was approximately 805° C.
The resulting product is depicted in FIG. 72 at 100,000× magnification.

Figure 73:
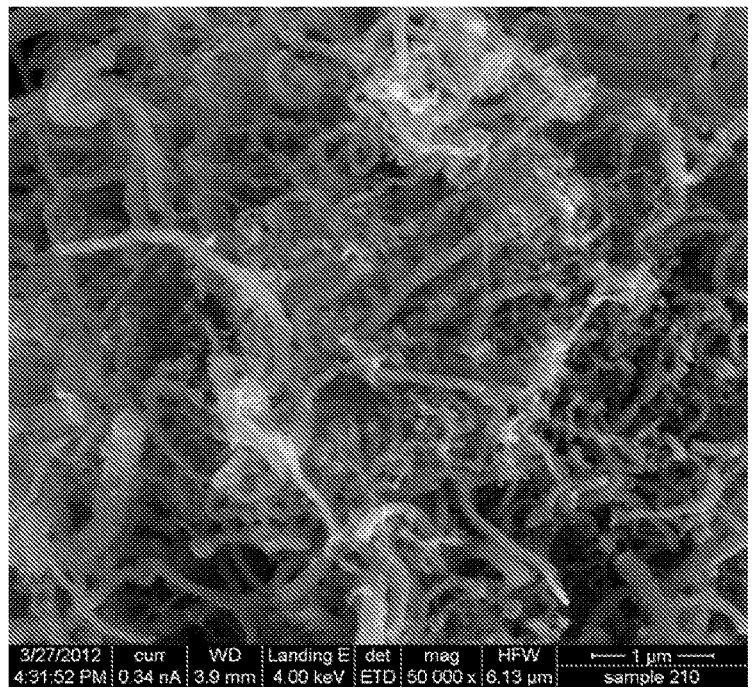
FIG. 73 depicts a SEM image of carbon nanotubes from sample 210 at 50,000× magnification.
Figure 74:
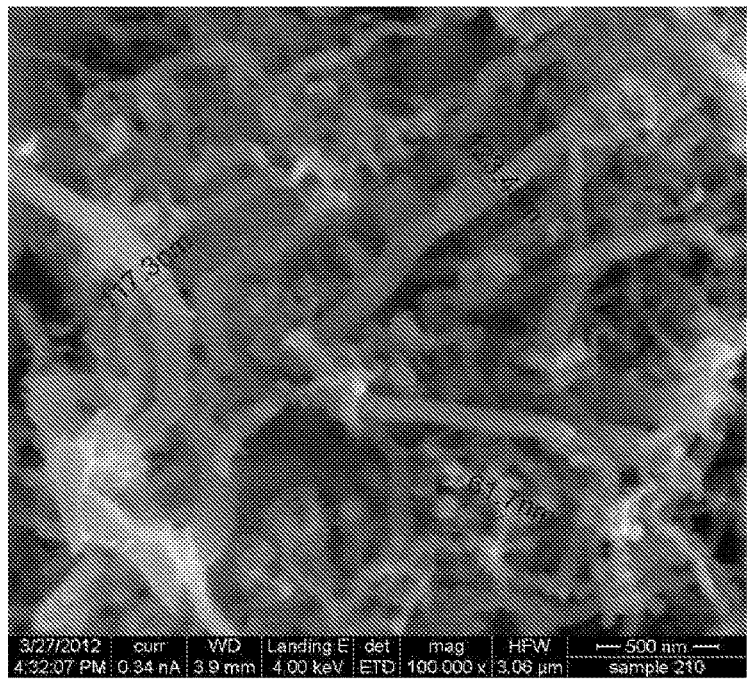
FIG. 74 depicts a SEM image of carbon nanotubes from sample 210 at 100,000× magnification.
Figure 75:
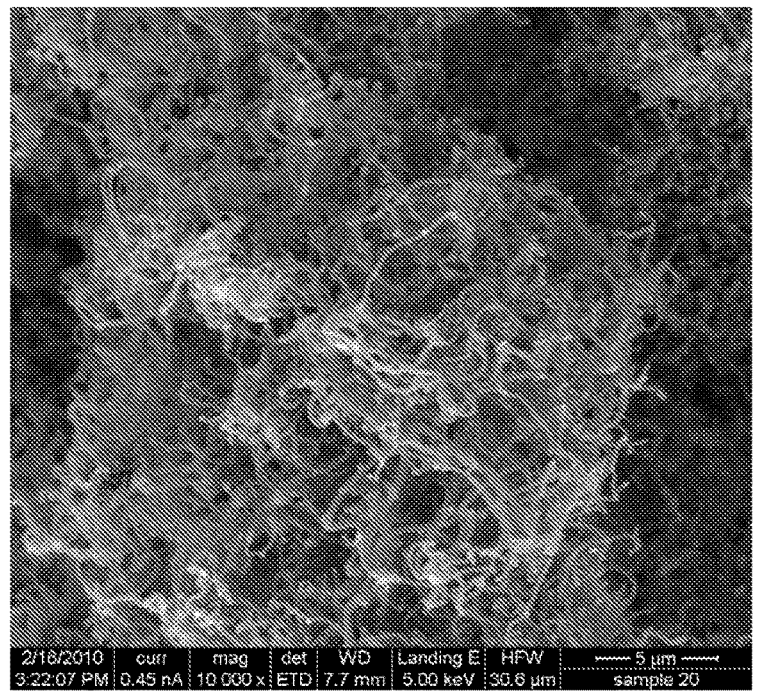
FIG. 75 depicts a SEM image of carbon nanotubes from sample 20 at 10,000× magnification.
Figure 76:
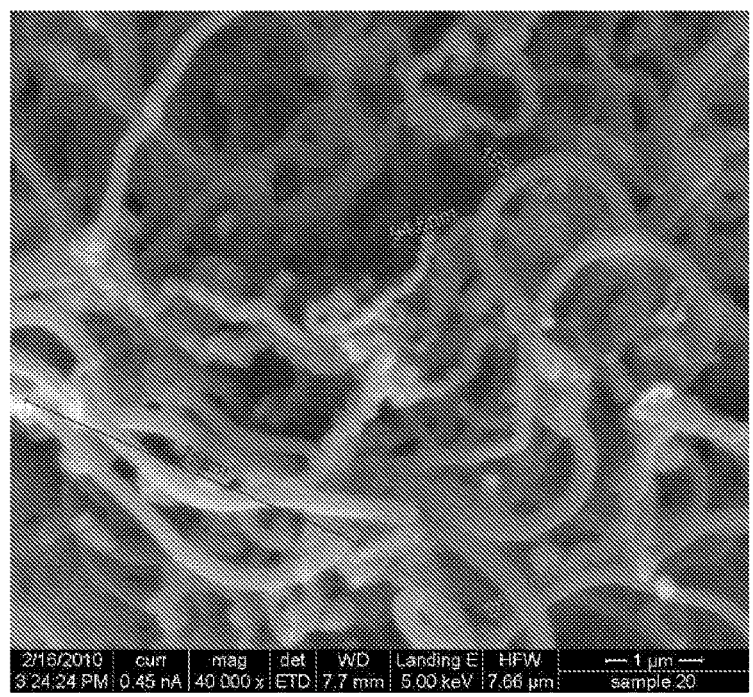
FIG. 76 depicts a SEM image of carbon nanotubes from sample 20 at 40,000× magnification.
Figure 77:
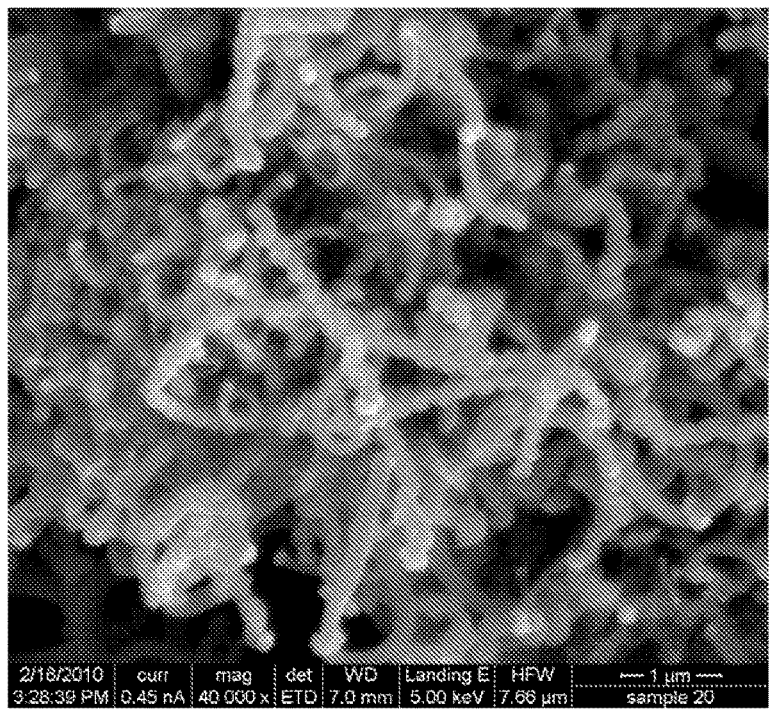
FIG. 77 depicts another SEM image of carbon nanotubes from sample 20 at 40,000× magnification.
Figure 78:
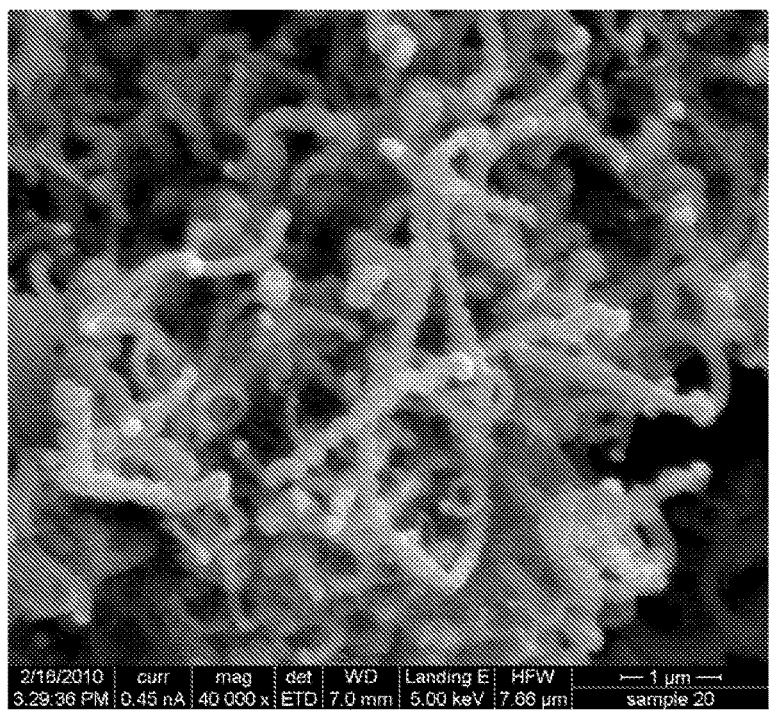
FIG. 78 depicts another SEM image of carbon nanotubes from sample 20 at 40,000× magnification.
Figure 79:
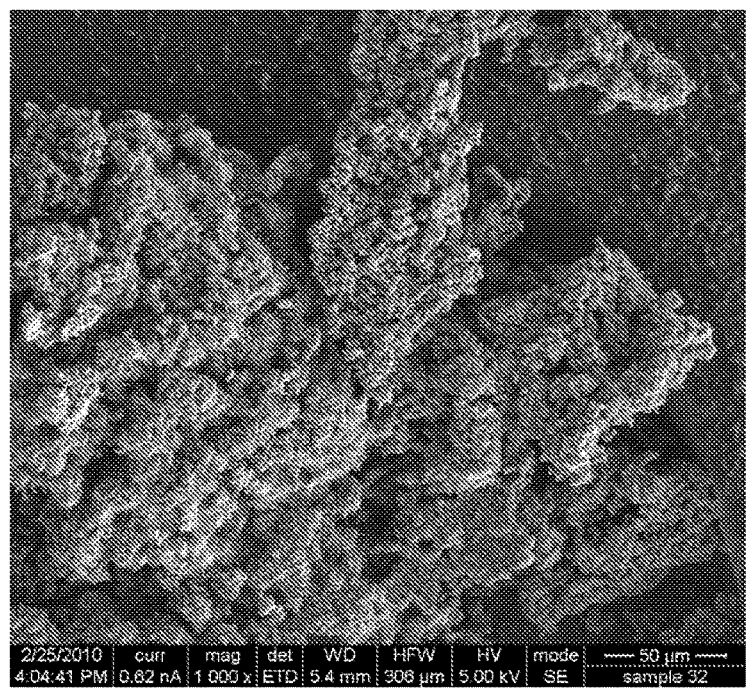
FIG. 79 depicts a SEM image of carbon nanotubes from sample 32 at 1,000× magnification.
Figure 80:
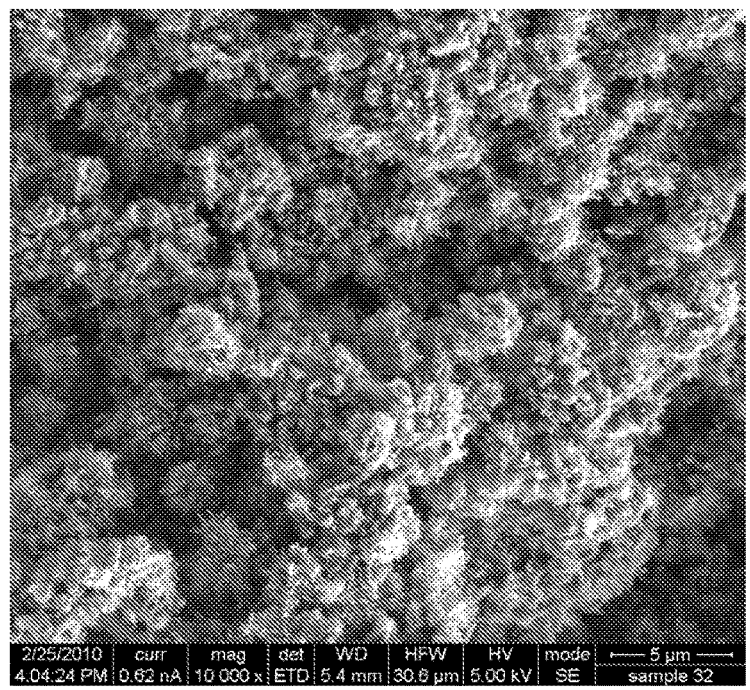
FIG. 80 depicts a SEM image of carbon nanotubes from sample 32 at 10,000× magnification.
Figure 81:
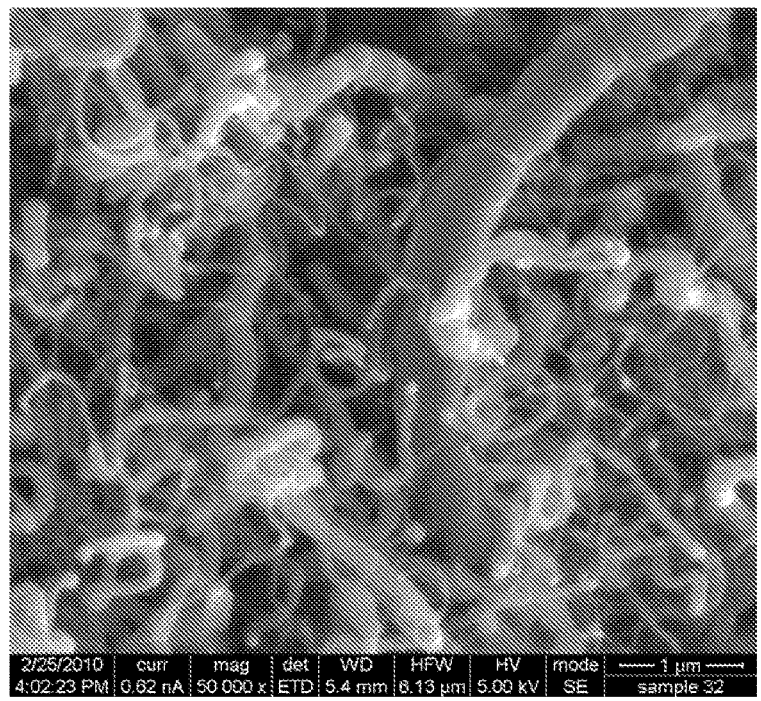
FIG. 81 depicts a SEM image of carbon nanotubes from sample 32 at 50,000× magnification.
Figure 82:
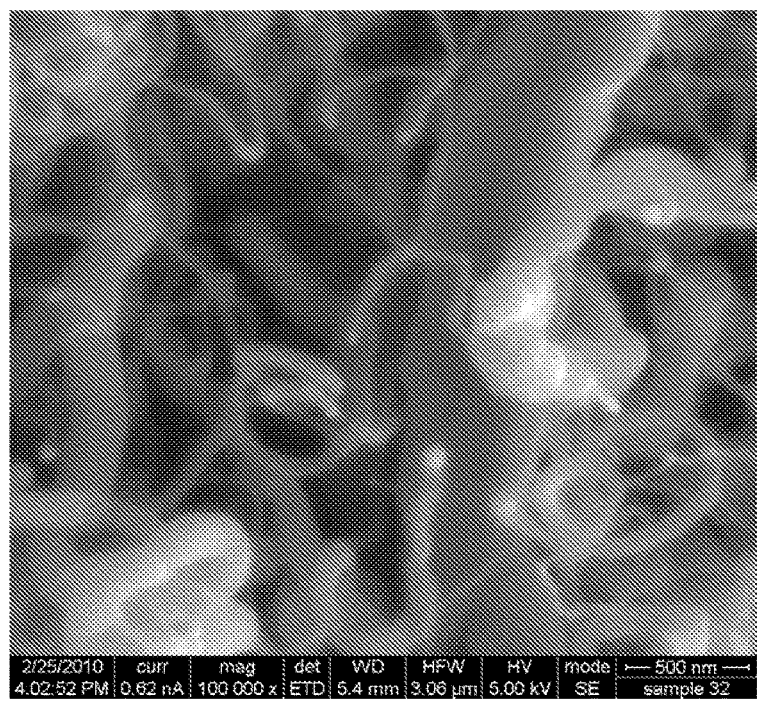
FIG. 82 depicts a SEM image of carbon nanotubes from sample 32 at 100,000× magnification.

Example 29—Sample 210 (FIGS. 73-74)

Dual reactors in series. A quartz tube was inserted inside the stainless steel pipe (schedule 40) of the second reactor.
Catalyst: steel wool that had been previously washed with hydrochloric acid.
Reaction gases: 10% $CO_2$, 76% $CH_4$, 4% Ar and 10% $H_2$.
Operating conditions: 900° C. for furnace 1, 850° C. for furnace 2; 4.14 MPa (600 psi).
Run time: 4 hours.
Note: The sample was taken approximately 23 cm (9 inches) upstream of the quartz tube in the second reactor; the temperature at this location was approximately 742° C.
The resulting product is depicted in FIGS. 73 and 74, at 50,000× and 100,000× magnification, respectively.

Other Morphology Examples

Other samples were taken from experiments conducted generally at atmospheric pressure, and using generally the same process as described with regard to the samples described with reference to Examples 1-15.

Example 30—Sample 20

| Example | Carbon Oxide | Reducing Agent | Catalyst | Conditions |
|---|---|---|---|---|
| Example 30-Sample 20 | $CO_2$ | $H_2$ | Steel wool | P = ~109-117 kPa Temp = ~650° C. |

For Example 30, sample 20, 0000 steel wool was used as the catalyst. The steps of purging the furnace, introducing reaction gases at the experimental pressure and temperature, stopping the reaction, and purging and cooling the furnace were performed, as outlined in Example 1 above. The reaction conditions are given in the chart.

The resulting product is depicted in FIGS. 75, 76, 77 and 78 at 10,000×, 10,000×, 50,000×, and 100,000× magnification, respectively. As these images indicate, there does not appear to be a bi-modal size distribution of the nanotubes, at the magnification used. However, the sample 20 images do show a curious nanotube shape, what appears as a corkscrew tube intermixed with otherwise generally straight or gradually curved tubes.

Example 31—Sample 32

| Example | Carbon Oxide | Reducing Agent | Catalyst | Conditions |
|---|---|---|---|---|
| Example 31-Sample 32 | $CO_2$ | $H_2$ | Steel wool | P = ~101 kPa Temp = ~650° C. |

For Example 31, sample 32, 0000 steel wool was used as the catalyst. The steps of purging the furnace, introducing reaction gases at the experimental pressure and temperature, stopping the reaction, and purging and cooling the furnace were performed, as outlined in Example 1 above. The reaction conditions are given in the chart.

The resulting product is depicted in FIGS. 79, 80, 81, and 82 at 1,000×, 10,000×, 50,000× and 100,000× magnification, respectively. As these images indicate, this sample appears to demonstrate a collection of carbon nanotubes having a variety of diameters, but each diameter appears to be isolated. That is, the images appear to show a number of nanotubes having an extra large, large, medium, small, or extra small diameter, but no nanotubes with diameters between those sizes. There is a wide variety of different diameters present in the carbon nanotubes, with no clear preponderance of any particular diameter as the "primary" growth.

Production Facility Examples

Figure 1B:
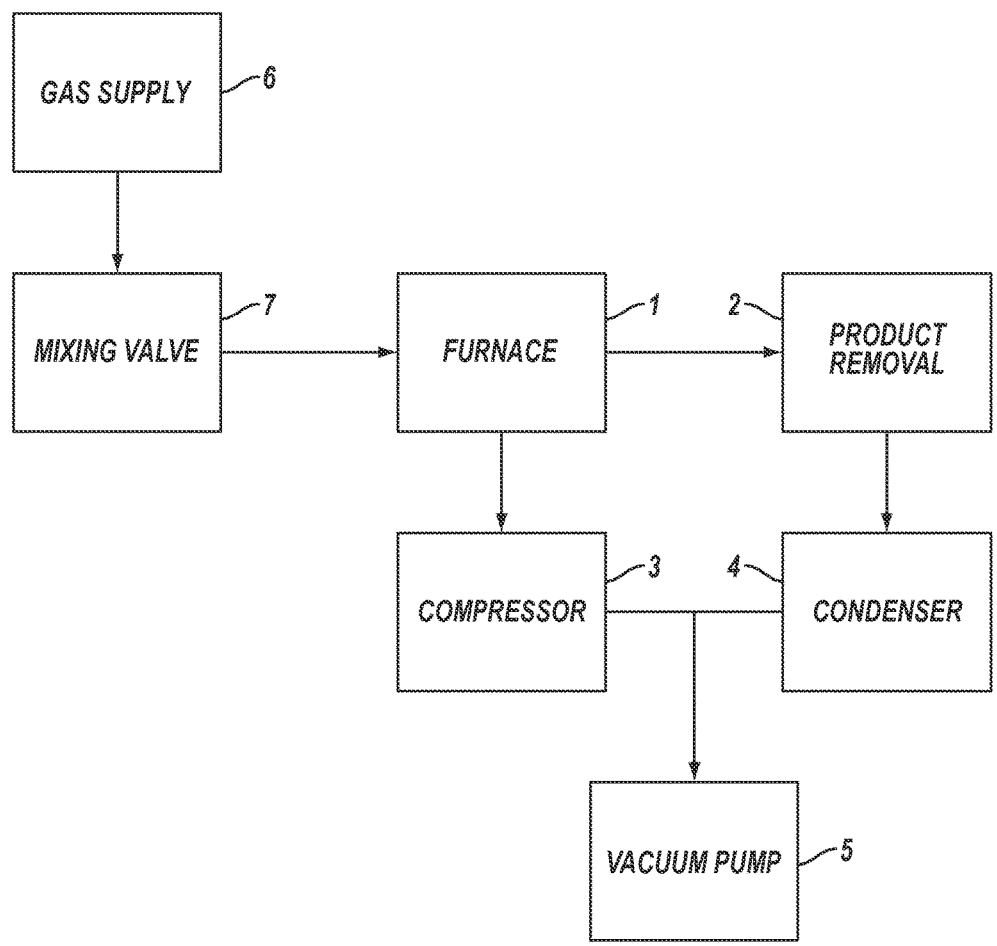
FIG. 1B illustrates a process flow diagram indicating how processes of the current disclosure may be performed using single-pass of reaction gases.

FIGS. 83A-83G depict schematic views of an exemplary continuous production apparatus for carbon nanotube production. The apparatus comprises individual sub-systems for gas supply 101, gas handling 102, reaction 103, product separation 104, water separation 105, water treatment 106, product packaging 107, and utilities 108. The arrowed lines indicate the flow of materials (gas, liquid, etc.). Dashed and arrowed lines indicate the flow of information. Other symbols refer to various miscellaneous instruments and/or equipment required for the system functionality, such as, for example, valves. The subsystems may be modified so as to be combined, or may be added to with additional subsystems as fitting desired. This is similar to the batch system shown in FIG. 1. The primary difference between the apparatus illustrated in FIGS. 83A-83G and the apparatus illustrated in FIGS. 1A and 1B is the addition of a heat exchange system and product removal system.

Figure 83A:
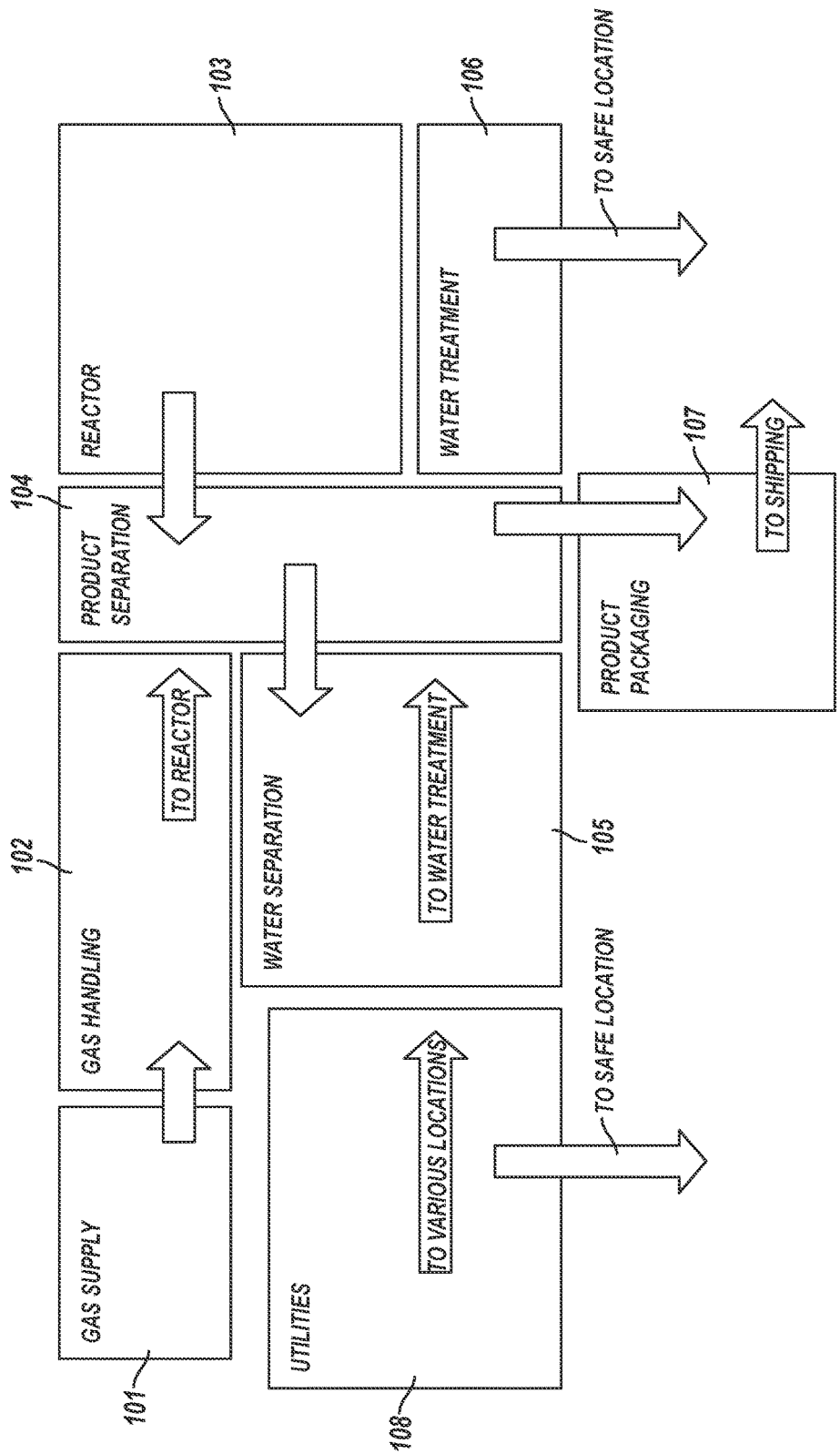
FIGS. 83A-83I depict schematic views of an apparatus and subsystems for carbon nanotube production.
Figure 83B:
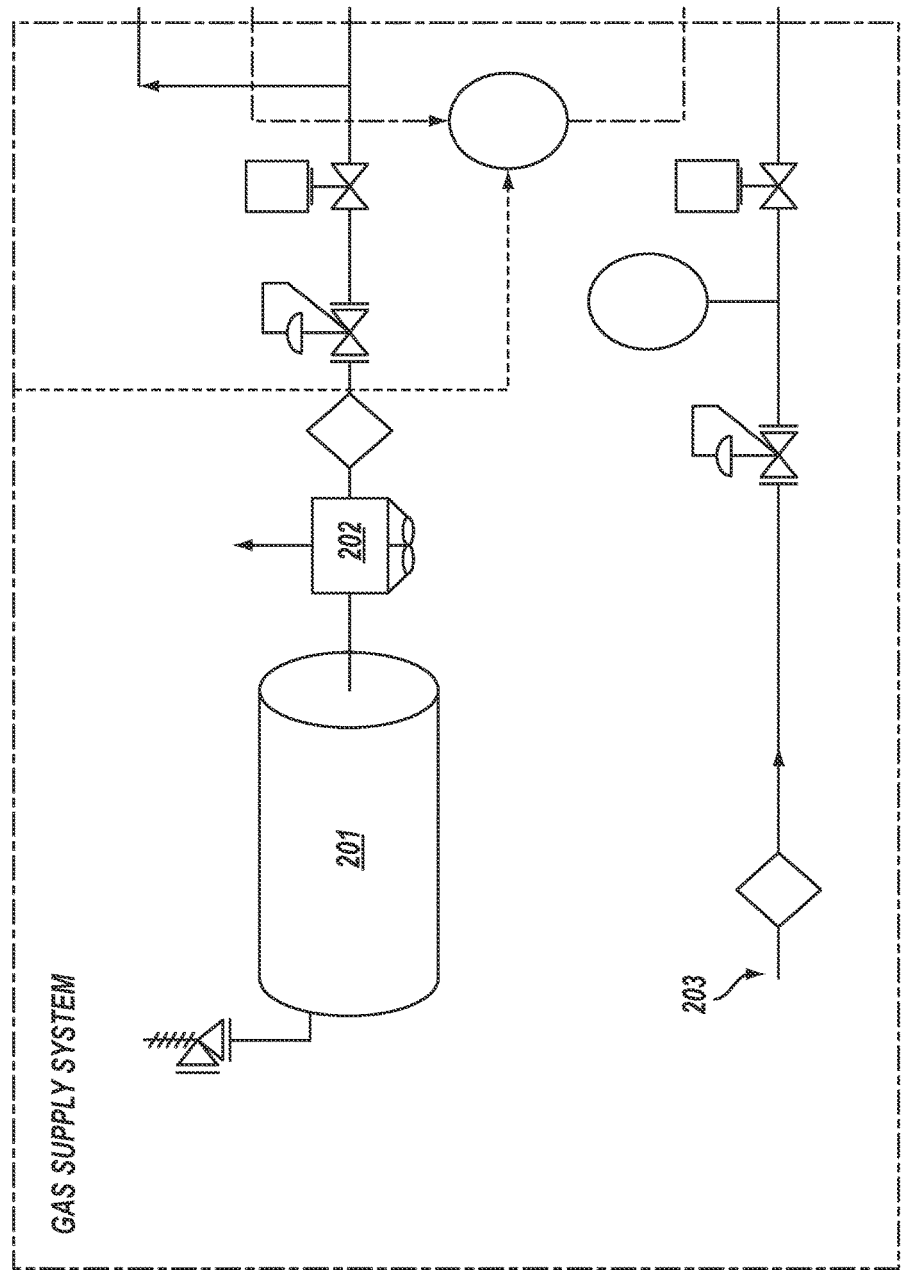
Figure 83C:
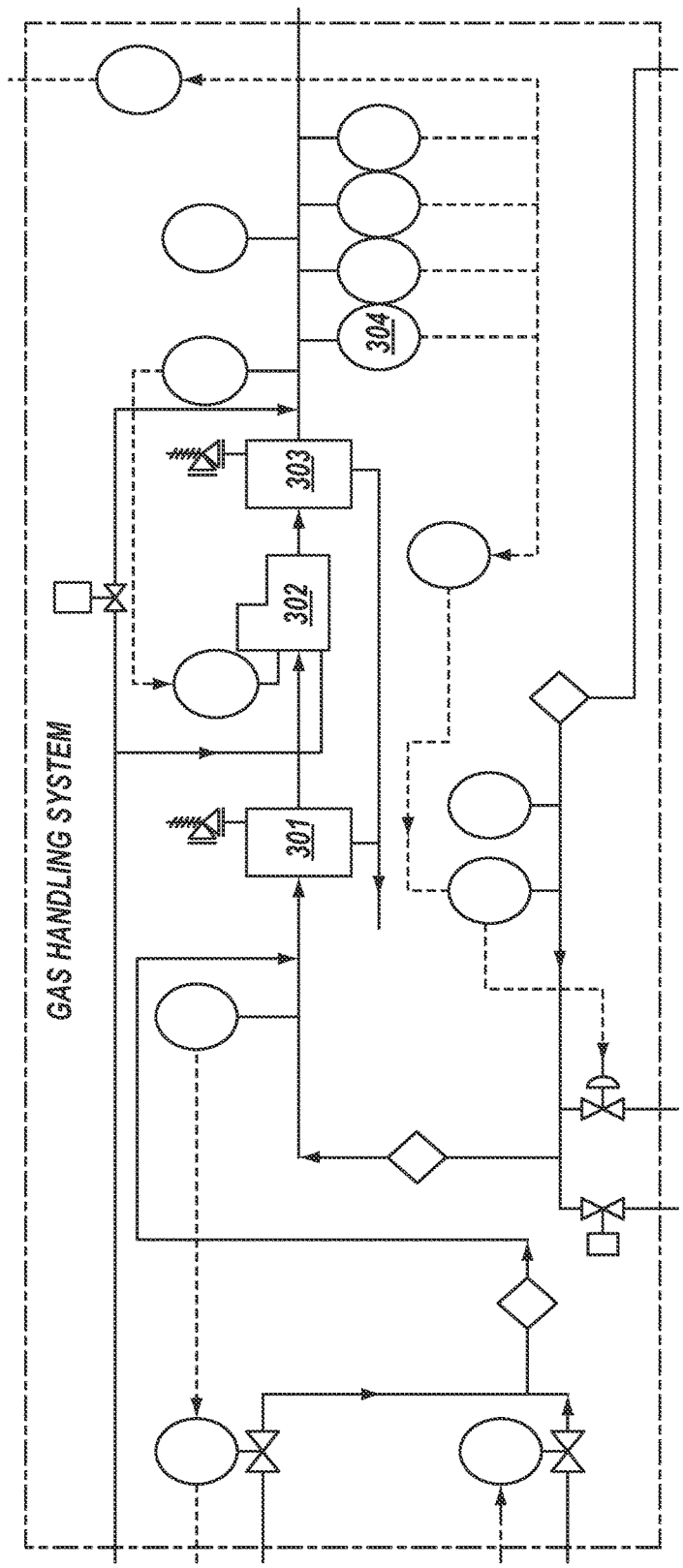
Figure 83D:
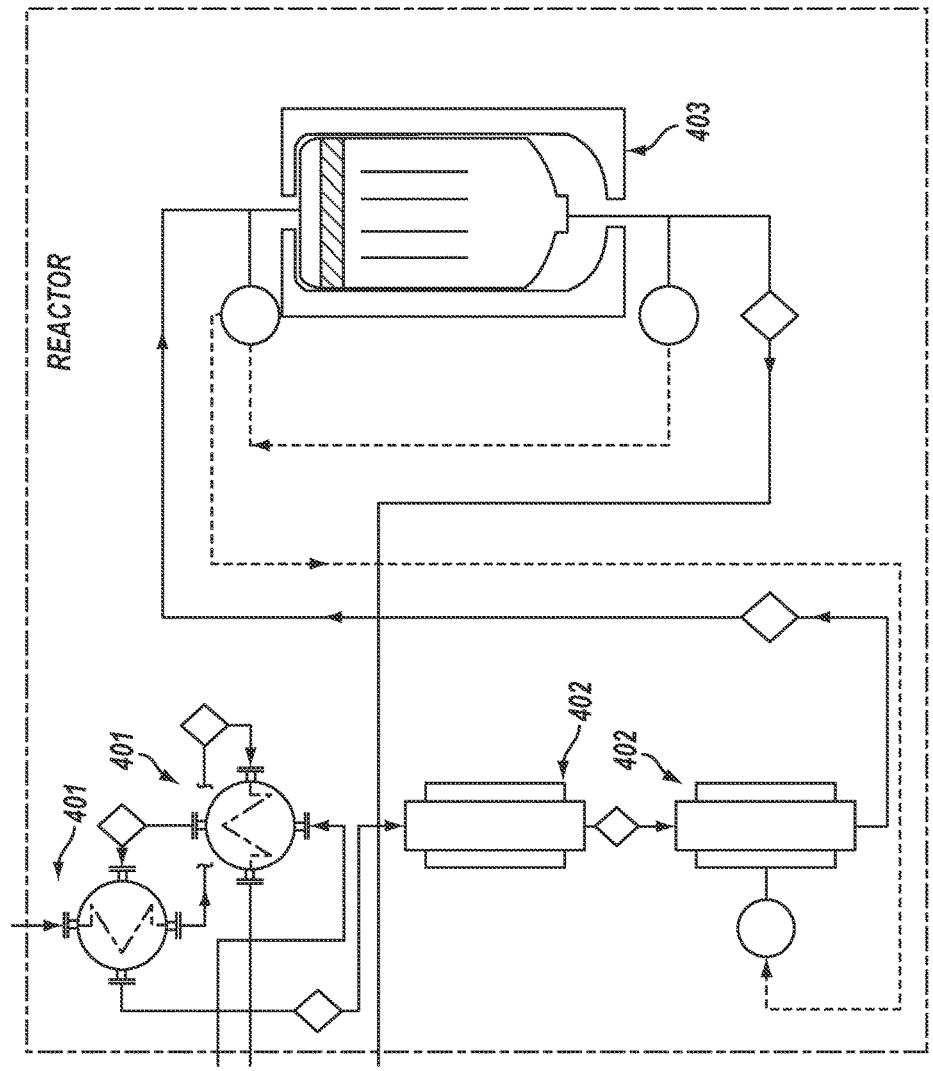

FIG. 83A depicts an overview of the various sub-systems that may be used in an exemplary CNT production apparatus. As depicted in FIG. 83B, a supply of liquefied carbon dioxide ($CO_2$) or other carbon oxide of specified purity is held in a tank 201 within the gas supply sub-system. When conditions such as pressure and temperature are appropriate, the $CO_2$ moves through a vaporizer 202, which evaporates the liquefied element, creating $CO_2$ gas. A portion of the $CO_2$ then moves into a gas handling sub-system (FIG. 83C) where a percentage of it is compressed within a compressor 302 with a flow of tank-held, recycled $CO_2$ gas 301 coming from a water separation sub-system (FIG. 83F). The compressed recycled flow is then combined with the remaining portion of the fresh $CO_2$ feed stream and a mixed feed stream coming from the gas supply sub-system (FIG. 83B) before moving into a tank 303 for holding for further processing.

The gas supply sub-system also provides a supply of methane ($CH_4$) of specified purity by a tube truck into a pipe 203 within the gas supply sub-system (FIG. 83B). Within the gas handling sub-system (FIG. 83C), the $CH_4$ and the remaining portion of $CO_2$ are mixed under appropriate reaction-specific conditions and in appropriate reaction-specific concentration and density. Those conditions and concentrations are typically dependent on what the desired end-product may be; for example, carbon nanotubes or graphite or carbon black form under different reaction conditions. The combined gas feed stream is then mixed with the compressed $CO_2$ flow to form a combined gas feed stream. The combined gas feed stream is analyzed by at least one analyzer 304 for information required for other components of the greater reaction system.

Figure 83E:
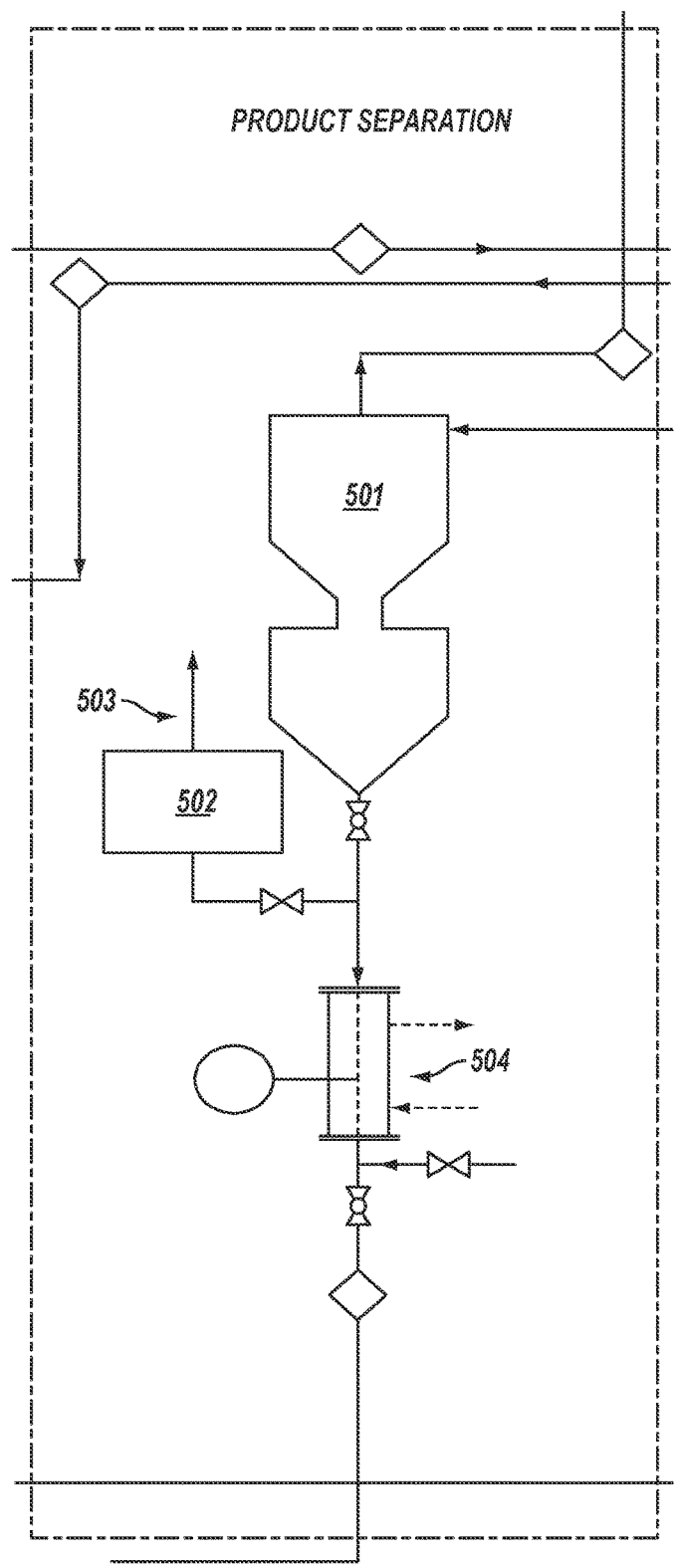
Figure 83F:
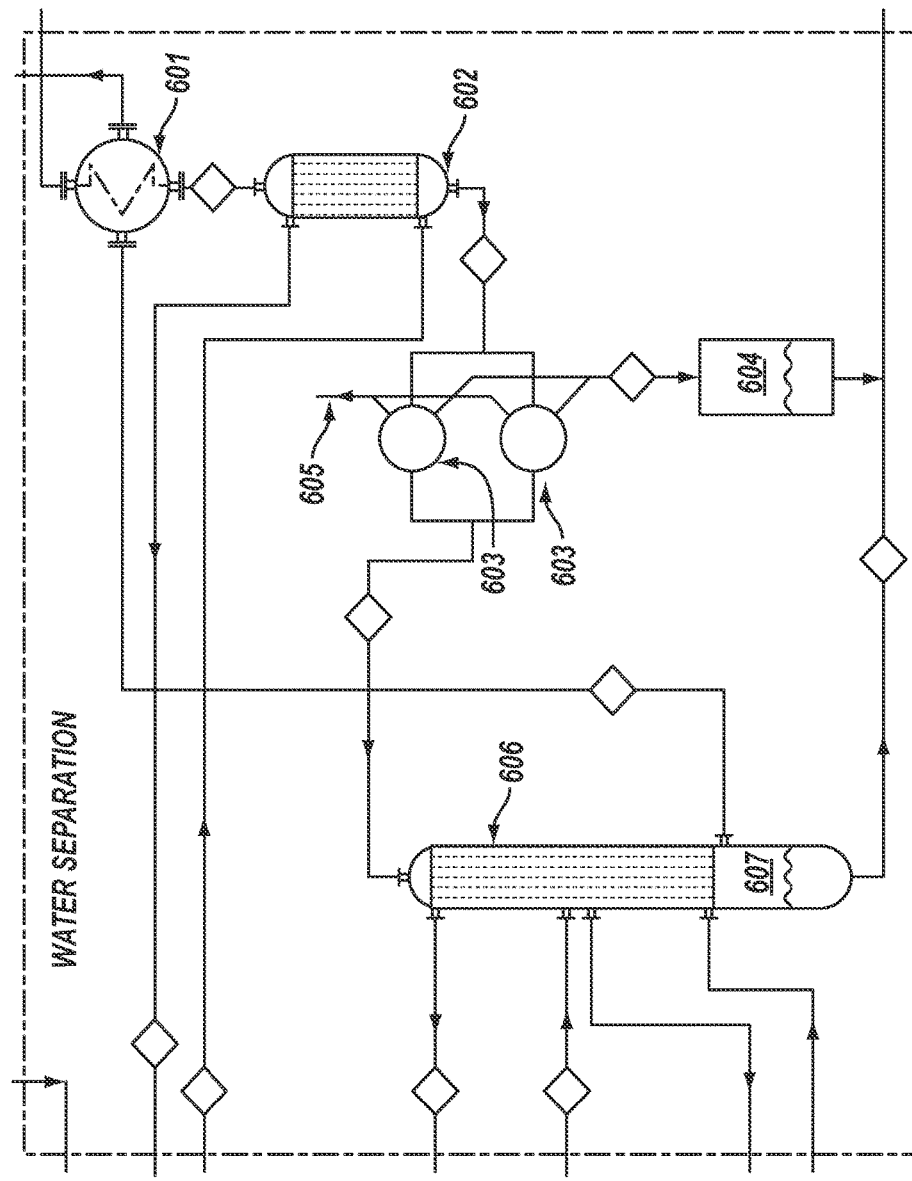
Figure 83G:
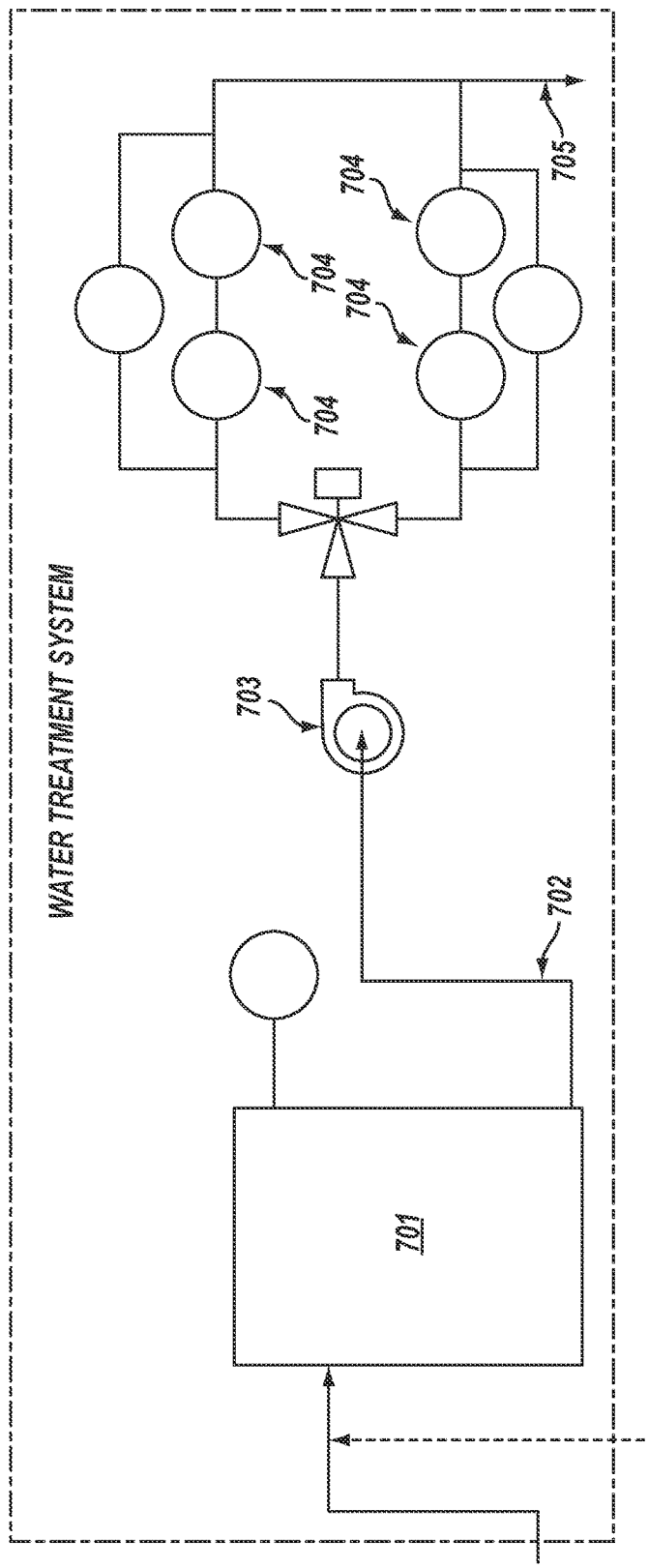

The combined gas feed stream then flows to a first gas-gas interchange heat exchanger 401, typically a cross-flow heat exchanger, within the reaction subsystem (FIG. 83D) where the combined gas feed stream receives heat from a flow of warmer gasses coming from a cyclone 501 within the product separation sub-system (FIG. 83E). There may be several heat exchangers utilized to achieve desired characteristics of the combined gas feed stream. The heat exchanger 401 is made of materials appropriate to the temperatures being used and also that is resistant to carbon dusting corrosion. In some embodiments, a small amount of water is added to the gas flow streams to cause a fine deposit of metal oxide on the surfaces of the heat exchanger to reduce or prevent metal dusting.

In the embodiment depicted in FIG. 83D, the combined gas feed stream moves into at least one electric heater 402 to bring the reactants up to specified reaction conditions. The heater 402 receives reaction feedback information from a reactor 403. When the combined gas feed stream achieves selected properties regarding, for example, temperature, it moves into the reactor 403 where CNTs are created. The reactor 403 may be ceramic-lined to mitigate the effects of carbon dusting corrosion. The reaction within the reactor may be of various sorts and embodiments, including those discussed in International Application No. PCT/US2010/029934.

Following the creation of CNTs or other morphologies of carbon, a reactor tail gas stream moves to a cyclone 501 within the product separation sub-system (FIG. 83E) where CNTs are separated from the reactor tail gas stream. The cyclone 501 and potentially all lines connecting the reactor 403 to the cyclone may also be ceramic-lines to avoid effects of carbon dusting corrosion. The cyclone 501 separates particles smaller than, for example, 12 microns assuming spherical particles with the density of graphite assumed for CNTs.

Figure 83H:
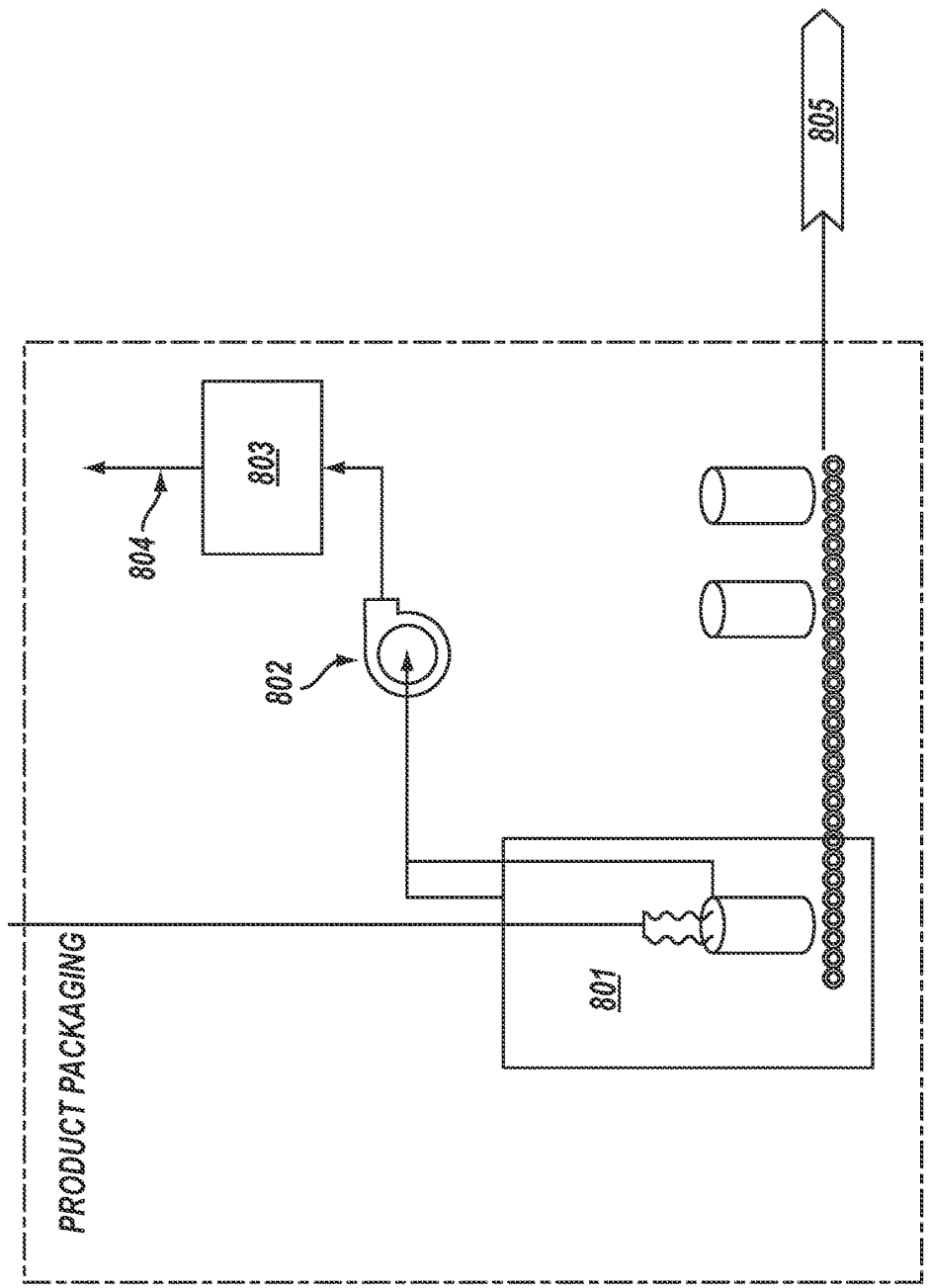

Referring still to FIG. 83E, the CNTs pass through a cooling apparatus 504, during which process some residual gasses, such as, for example, $CO_2$, may pass through at least one filter 502 and then be vented 503 to a safe location. After cooling, the CNTs or other carbon product moves into a type of shipping package 801, such as, for example, a barrel, in the product packaging sub-system (FIG. 83H). The shipping package may be selected to meet requirements for safe and effective transportation and delivery. In the process of packaging, further residual gas may pass through a pump 802, or a filter 803, and then be safely vented 804. After the CNTs are appropriately packaged for storage and shipping, the shipping package may be moved to a shipping area 805.

After leaving the cyclone 501, the clean tail gas stream returns to the reaction sub-system (FIG. 83D) and through the at least one heat exchanger 401 to transfer heat to incoming gases. Alternatively, the reactor tail gas stream may be first passed through a heat exchanger 401, and then to the cyclone 501. Placing the heat exchanger after the cyclone tends to lessen problems of metal dusting and creep failure. These problems may be even further reduced by injecting a small amount of water into the gas flow in front of the heat exchanger. This addition of water causes a small layer of metal oxide to form on the heat exchanger internal parts, protecting the heat exchanger from metal dusting. Alternatively, or in addition, the heat exchanger may be ceramic-lined.

The reactor tail gas stream may also pass through another heat exchanger 601 within the water separation unit (FIG. 83F) before entering a one-stage water cooling condenser 602. The clean tail gas stream passes through at least one filter 603 where water may be filtered out and into a holding tank 604. After the clean tail gas stream passes through the filter, there may be a quantity of gases safely vented 605, after which the clean tail gas stream moves into a two-stage condenser 606.

Figure 83I:
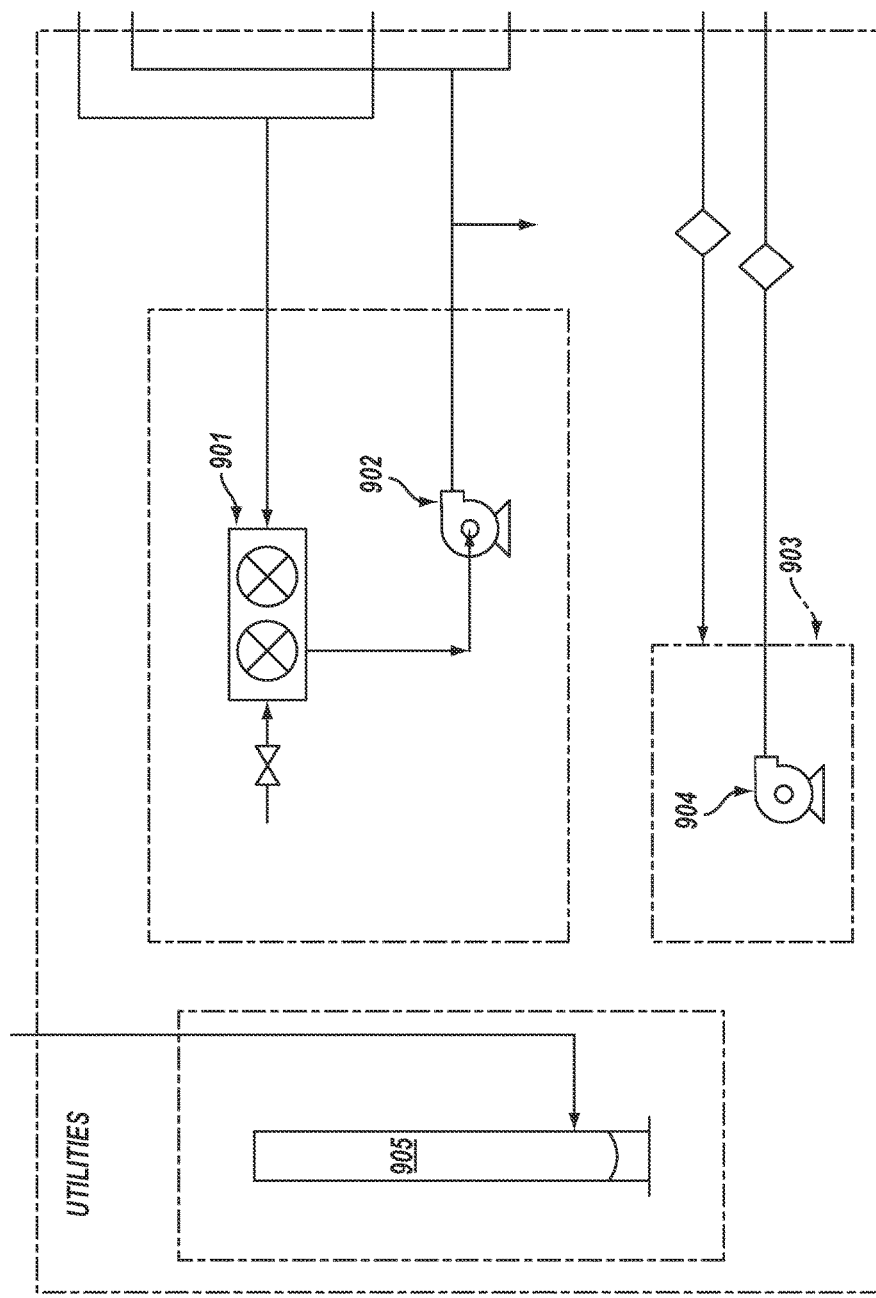
Figure 84:
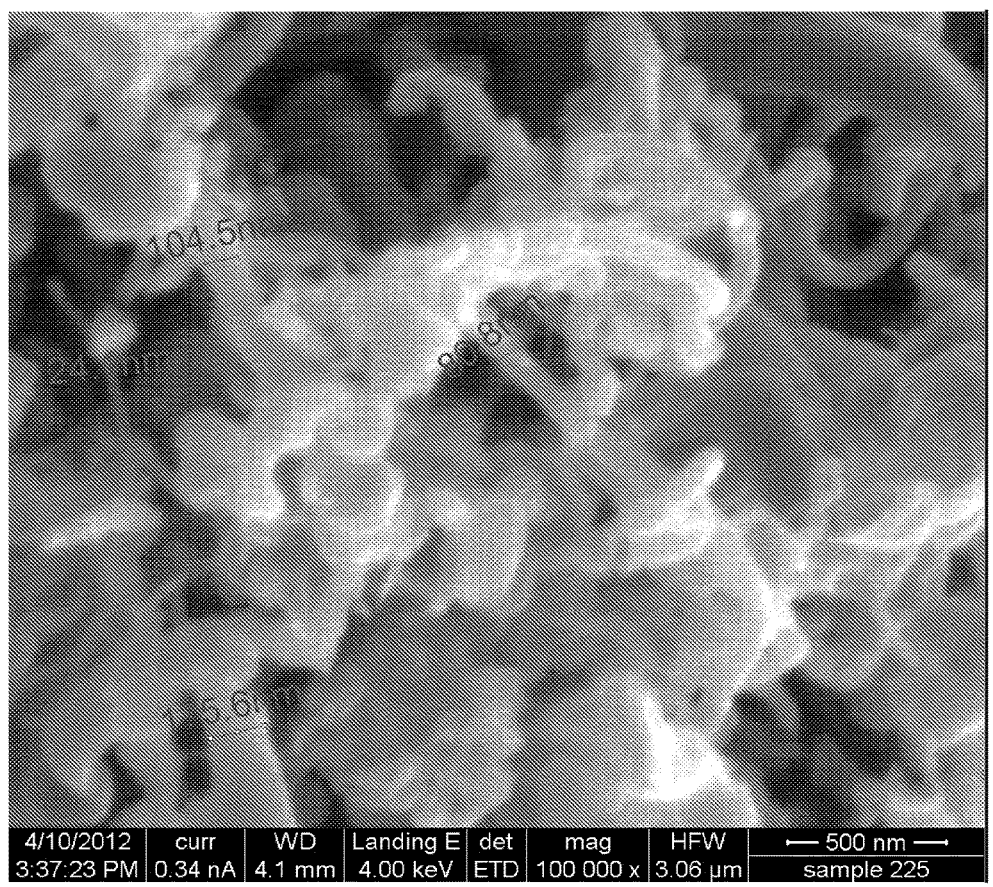
FIG. 84 depicts a SEM image of carbon nanotubes from sample 225 at 100,000× magnification.
Figure 85:
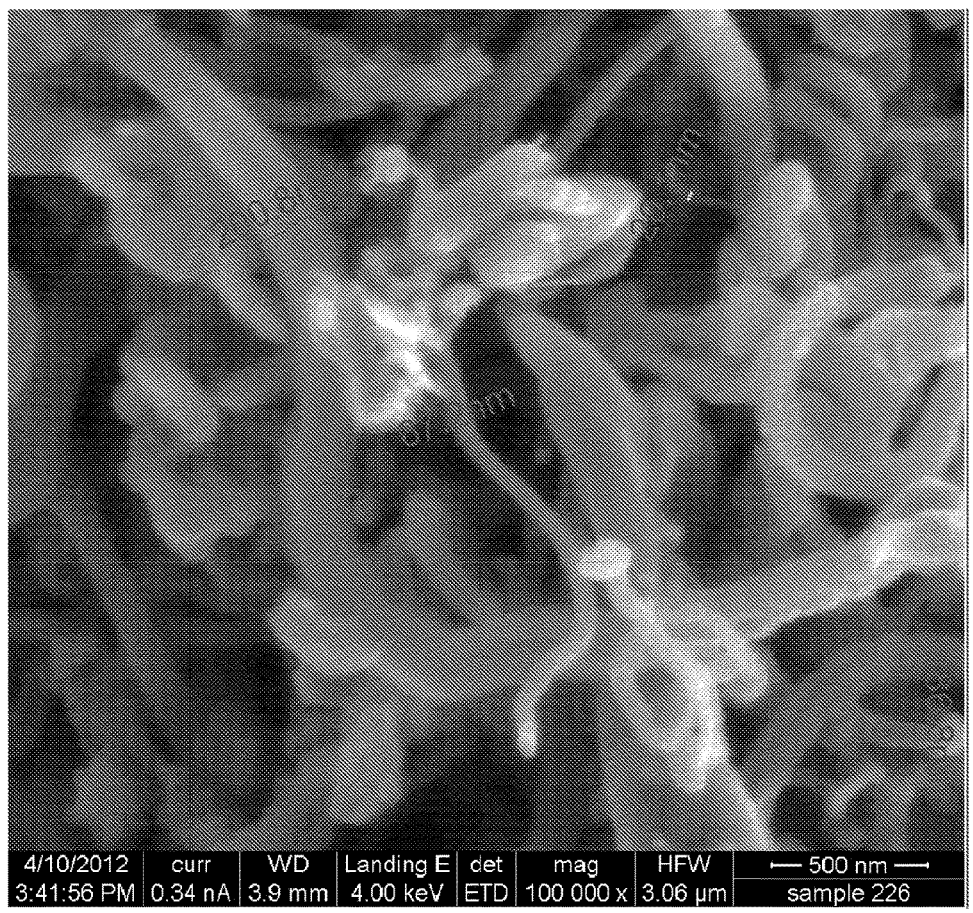
FIG. 85 depicts a SEM image of carbon nanotubes from sample 226 at 100,000× magnification.
Figure 86:
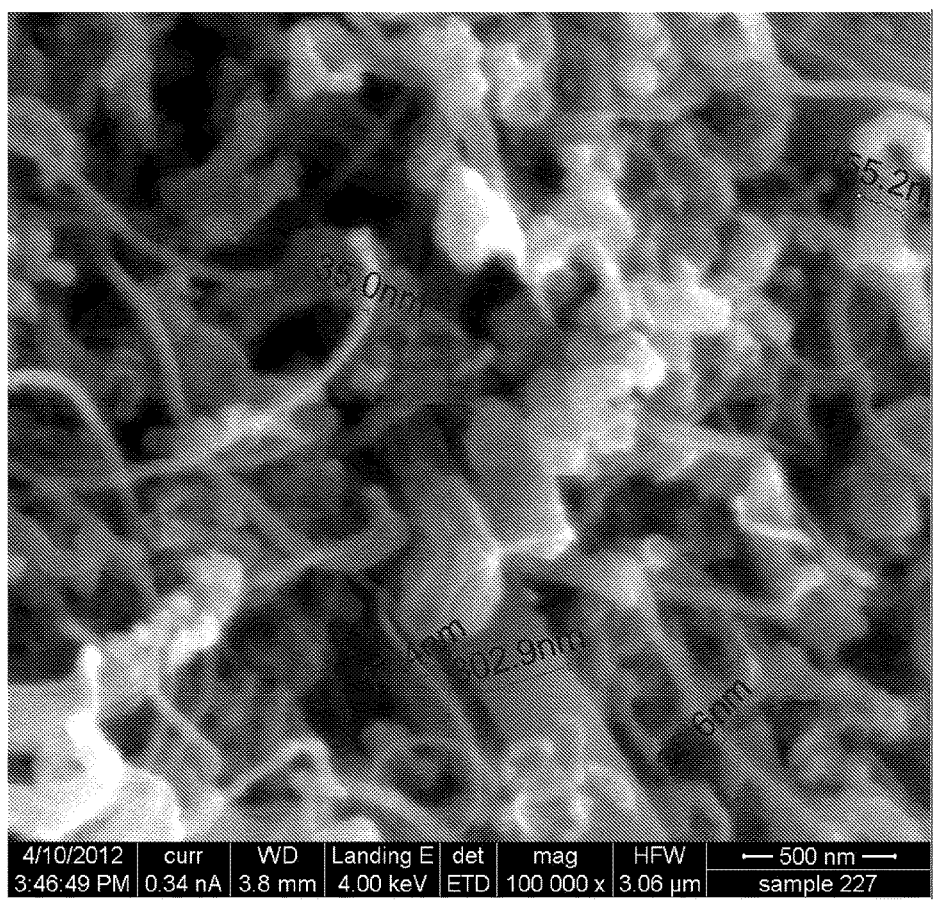
FIG. 86 depicts a SEM image of carbon nanotubes from sample 227 at 100,000× magnification.
Figure 87:
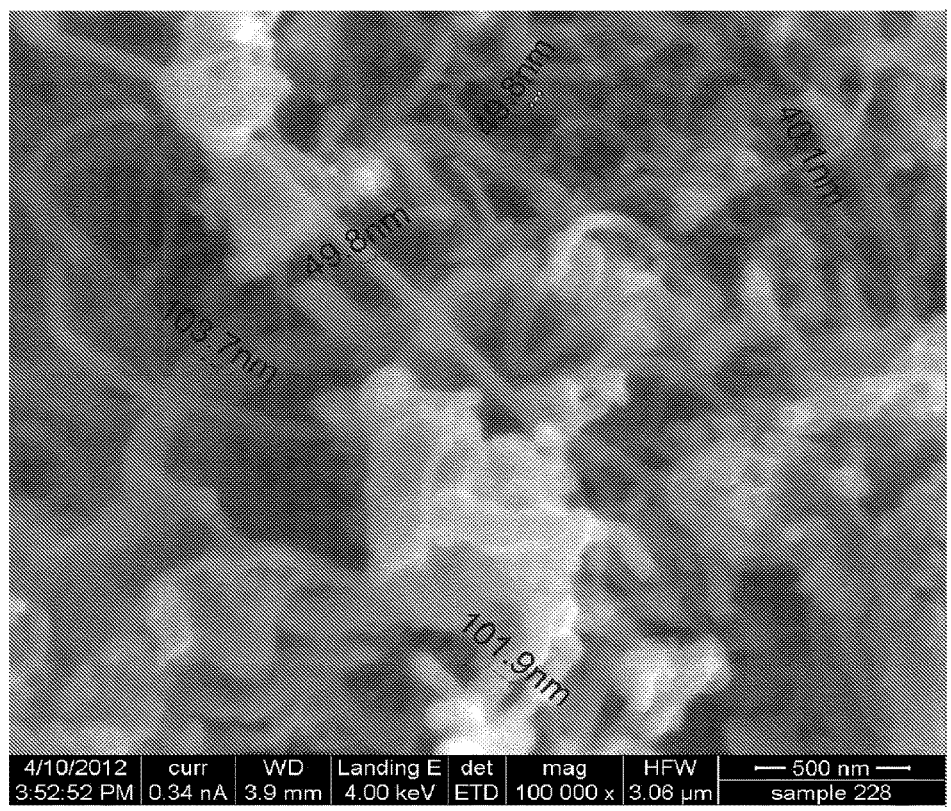
FIG. 87 depicts a SEM image of carbon nanotubes from sample 228 at 100,000× magnification.
Figure 88:
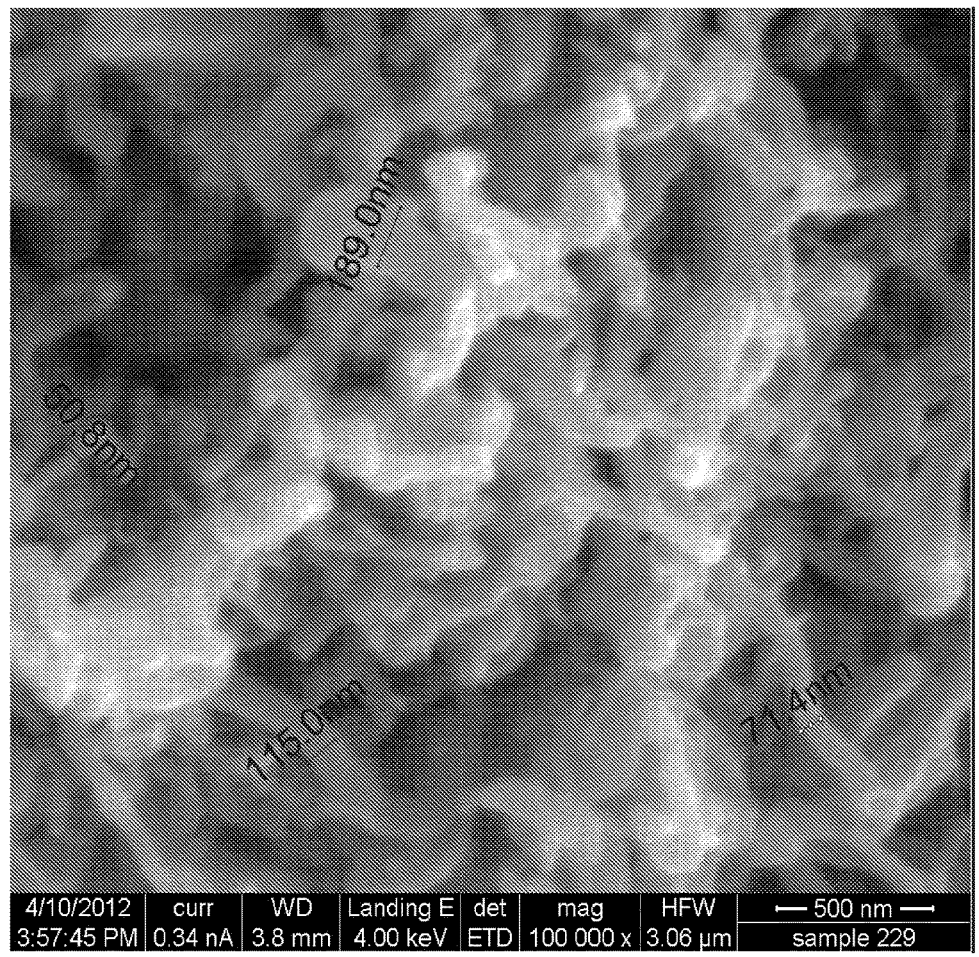
FIG. 88 depicts a SEM image of carbon nanotubes from sample 229 at 100,000× magnification.
Figure 89:
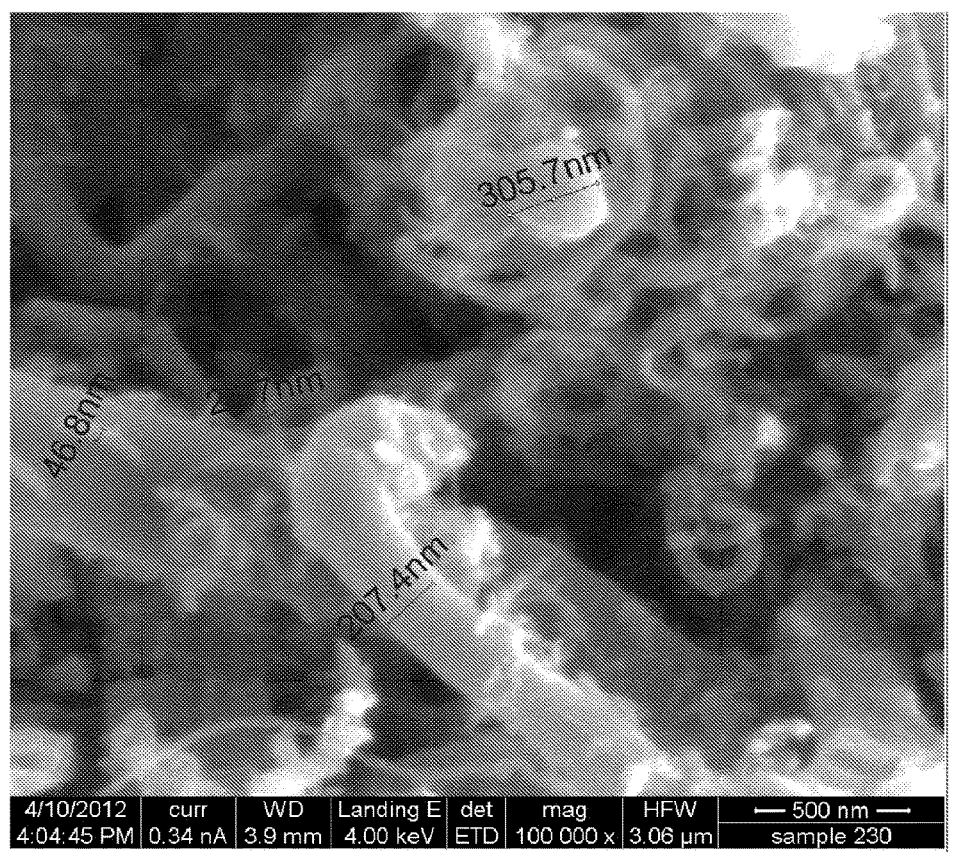
FIG. 89 depicts a SEM image of carbon nanotubes from sample 230 at 100,000× magnification.
Figure 90:
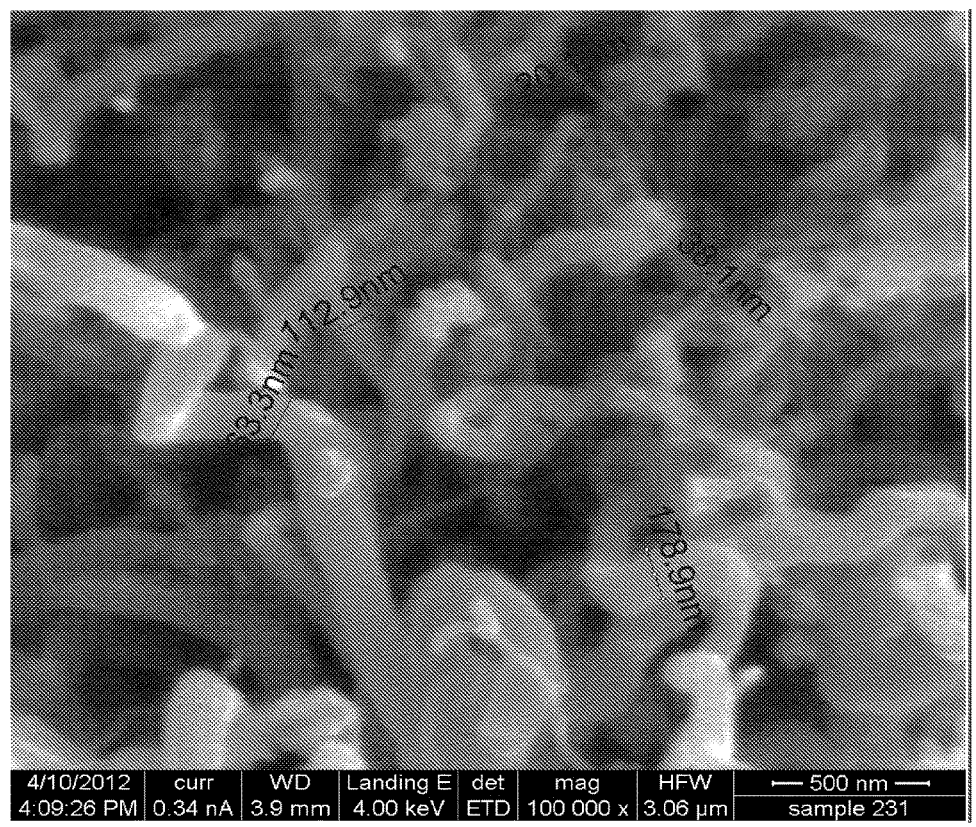
FIG. 90 depicts a SEM image of carbon nanotubes from sample 231 at 100,000× magnification.
Figure 91:
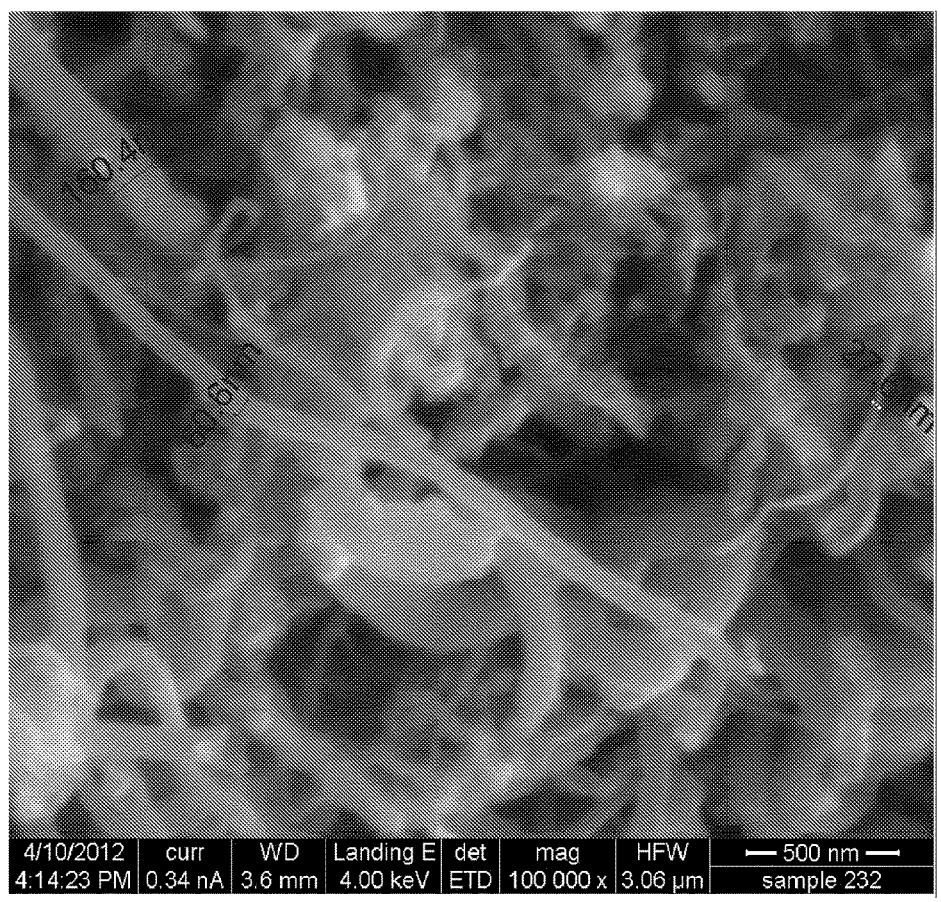
FIG. 91 depicts a SEM image of carbon nanotubes from sample 232 at 100,000× magnification.
Figure 92B:
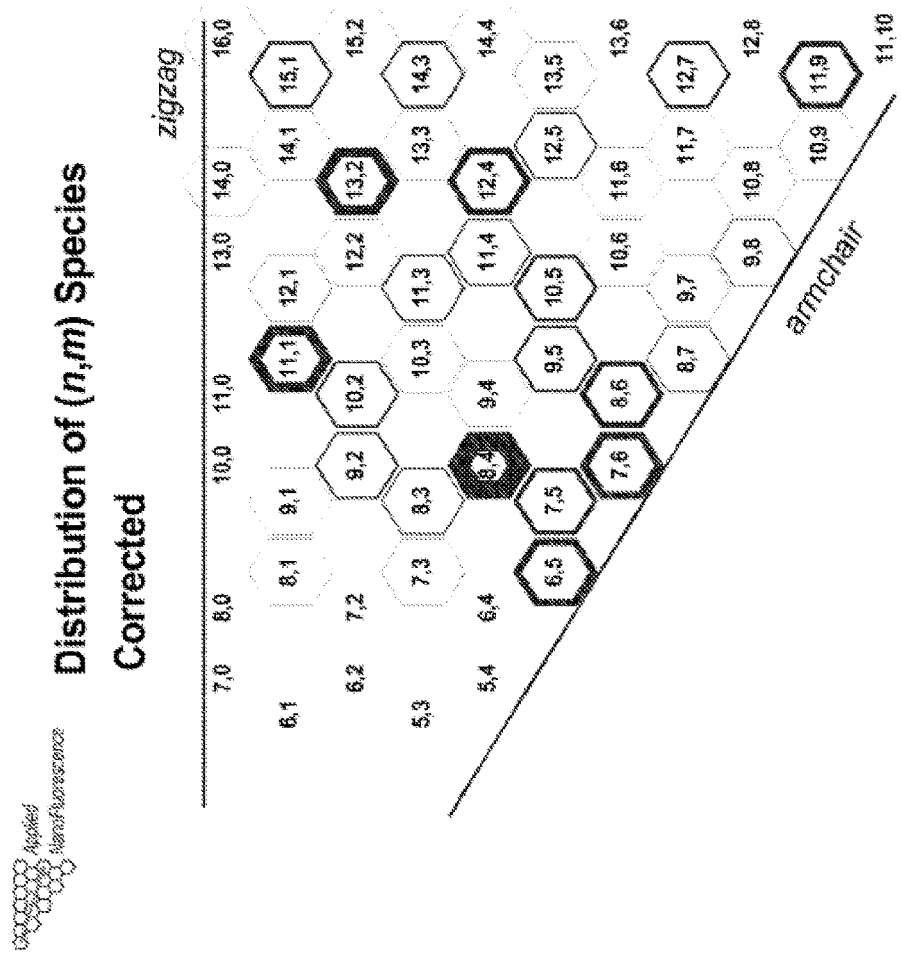
Figure 92C:
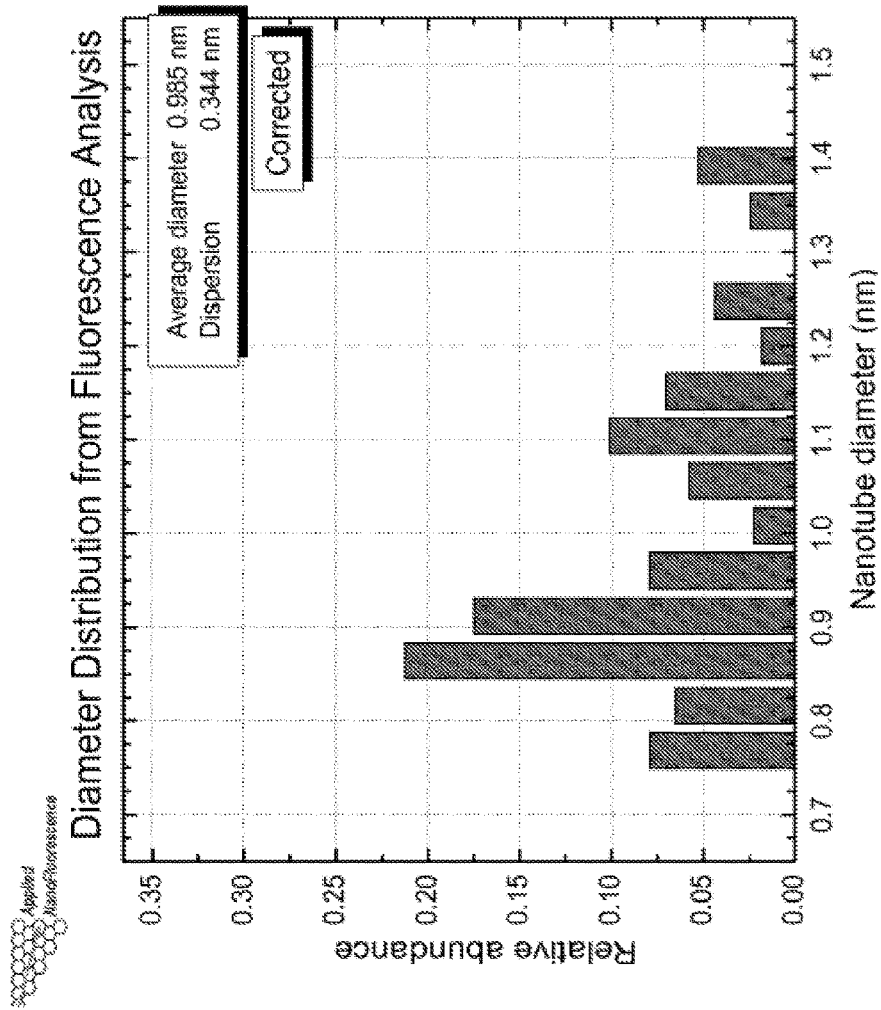
Figure 92D:
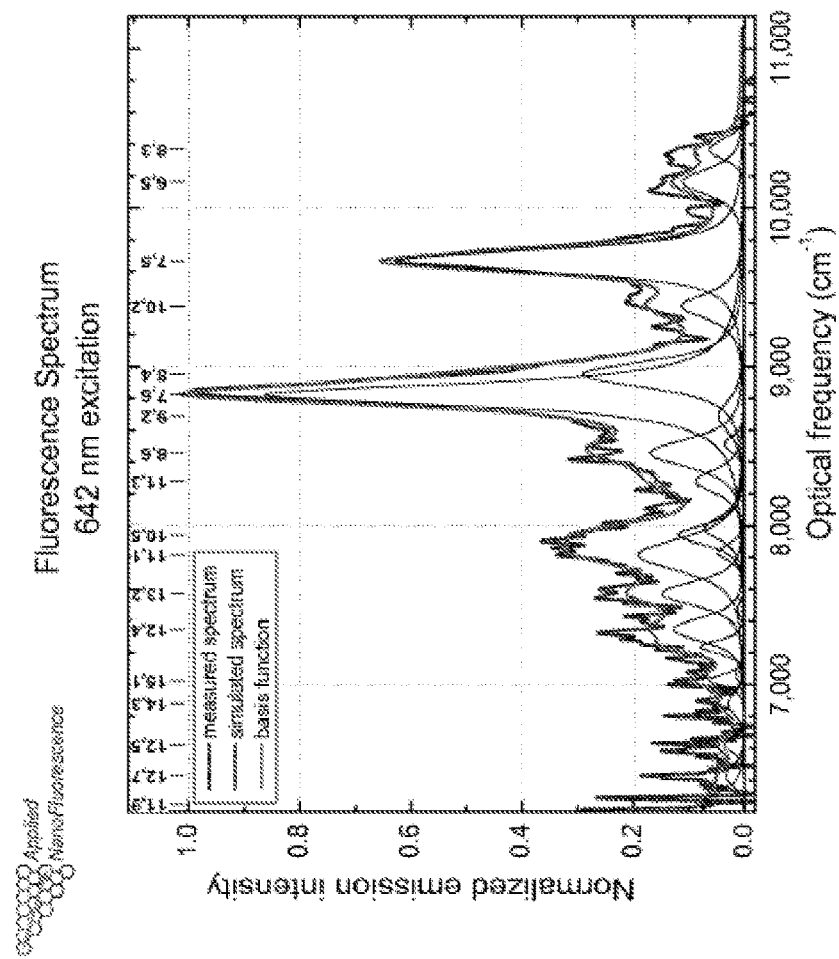
Figure 92E:
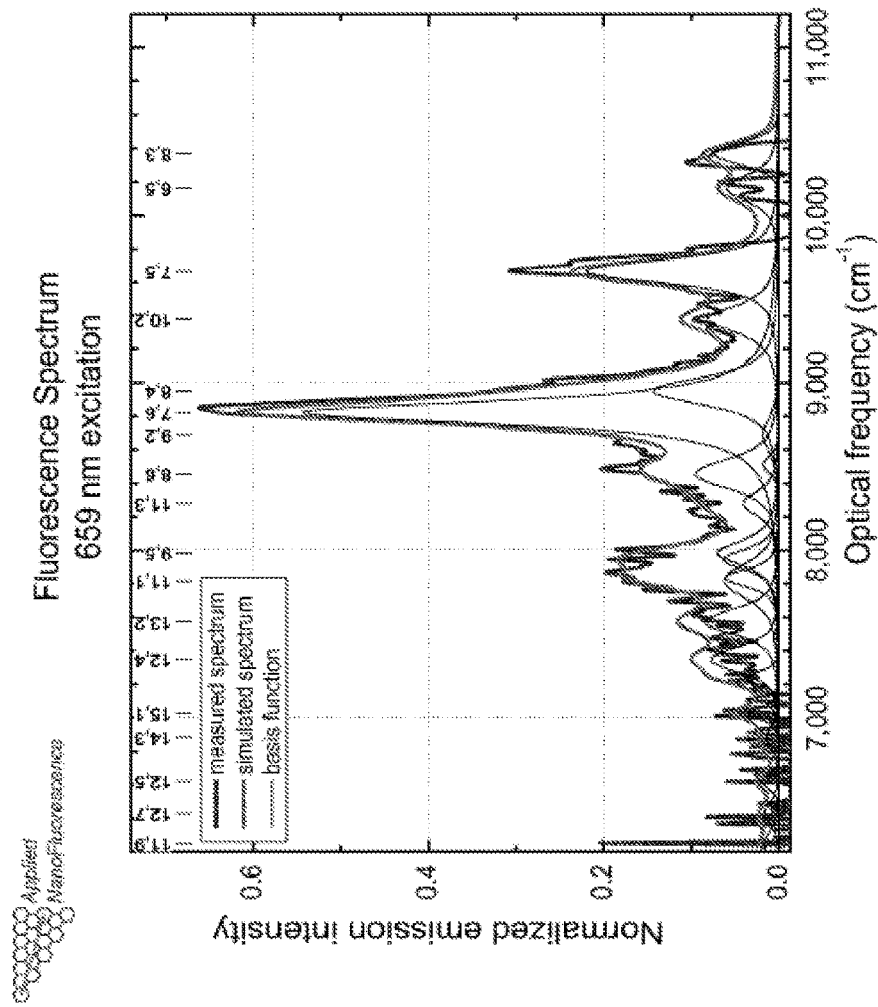
Figure 92F:
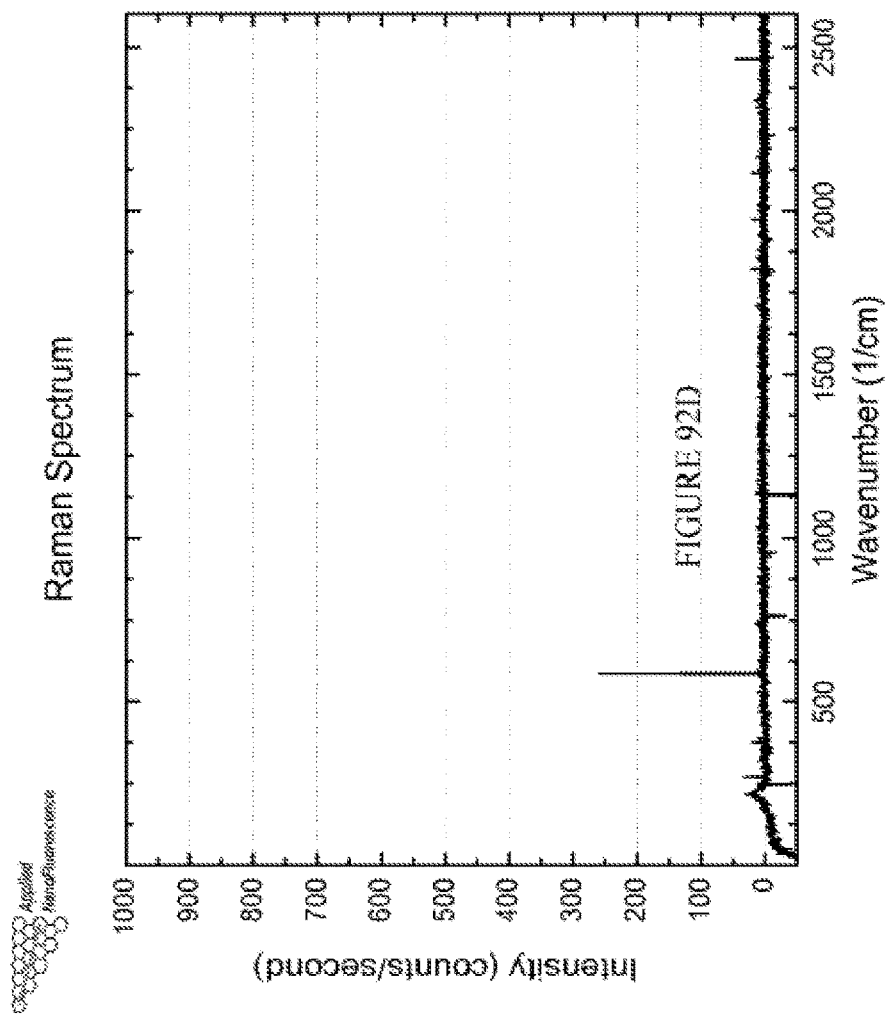

Within the two-stage condenser 606, a first set of coils uses a supply of water passing to and from a cooling tower 901 likely held within the utilities sub-system (FIG. 83I), with possible passage through a pump 902, to cool the clean tail gas stream. The clean tail gas stream then passes through the second stage in the two-stage condenser 606, which typically uses glycol as a coolant. The glycol passes to and from a vendor chiller 903 that houses a pump 904 within the utilities sub-system (FIG. 83I). After passing through the two-stage condenser 606, water may be held in a holding tank 607, before flowing through a pipe that intersects with the output for the tank 604 holding water near the one-stage water cooling condenser 602. The water travels into a water treatment tank 701 within a water treatment sub-system (FIG. 83G) where it is held for further processing. As the water is collected in the holding tank 607, recycled gases flow back to the heat exchangers 601 in the water separation sub-system (FIG. 83F) and finally to the tank 301 within the gas handling sub-system (FIG. 83C).

Within the water treatment sub-system (FIG. 83G), the tank 701 holding accumulated water systematically releases water through a pipe 702 that may be in or near the bottom of the tank. A pump 703 directs the water through filters 704. The water then passes to storage or a safe run-off 705.

The utilities sub-system (FIG. 83) may hold the systems for the two-stage condenser 606, as well as at least one vent 905 to a safe location, and other systems as necessary for the reactor to function. Furthermore, other apparatus may be used to generate CNTs according to the methods disclosed herein. FIG. 83 merely provides a single example.

Several samples were taken from the production apparatus shown in FIGS. 83A-83G. For each example, the carbon oxide was carbon dioxide, the reducing agent was hydrogen, and the catalyst was a mild steel plate. The reaction was conducted between approximately 625° C. and 640° C., at approximately 0.342 MPa (35 psig).

FIGS. 84-91 depict samples 225, 226, 227, 228, 229, 230, 231, and 232, respectively, at 100,000× magnification. In each case, the bi-modal nature of the resulting product is apparent.

In many of the samples, a characteristic composition is observed characterized by bi-modal size distribution of carbon nanotubes or carbon nanofibers. The larger diameter population appears to have a significant range in primary diameters with significant distribution of sizes. A smaller population is also observed with a much smaller distribution of sizes and characteristically less than approximately 20 nm in diameter.

FIGS. 92A through 92F show the chirality distribution of the single-wall population of bi-modal material in another sample, sample 73. FIGS. 92A through 92F provide the relative abundance of various chiralities of single-wall material in sample 73. The relative abundance was determined using a NanoFluorescence NS-2 analyzer (available from Applied Nanofluorescence LLC, of Houston, Tex.). This analysis tends to validate the visual observation that at least some of the secondary growth population include single-wall CNTs in at least some of the samples. Note that several different chiralities are present in various concentrations. Depending on the reaction conditions, the relative abundance may vary considerably. Particular formulations can be developed with higher yields in specific chiralities. This may have commercial significance because the chirality appears to affect whether the carbon nanotubes are metallic, and whether they are conductors or semi-conductors. See Mildred S. Dresselhaus & Phaedon Avouris, *Introduction to Carbon Materials Research*, in CARBON NANOTUBES: SYNTHESIS, STRUCTURE, PROPERTIES, AND APPLICATIONS, 1, 6 (Mildred S. Dresselhaus, Gene Dresselhaus, & Phaedon Avouris, eds., 2001).

As previously discussed, the nanotubes occur in forests, in pillow growths and in random agglomerations. FIG. 2 depicts a forest growth CNT product such as typically produced when the reaction occurs on a large, locally planar catalytic surface (such as a cylinder, wafer, or sheet of steel). FIG. 3 depicts images of the "forest" growth but at 2000× magnification.

A possible mechanism for at least some of the secondary population of CNTs involves growth on (and perhaps chemically attached to) the side walls of the CNTs forming the primary population. The theory here is that a population of catalyst atoms may be deposited on the surface or in the intersticies of the primary population. These atoms agglomerate through a process of Ostwald ripening until they develop a sufficient size for the nucleation of CNT growth under the reaction conditions.

Three possible mechanisms are contemplated for depositing catalyst atoms for the nucleating sites for growth of the secondary, smaller diameter growth are proposed: (a) growth tip erosion, (b) iron vapors in the reactor; and (c) carbonyl formation followed by decomposing to deposit iron atoms. The following discussion is provided solely for purposes of discussion and is not intended to be limiting. These mechanisms are not mutually exclusive, and thus any combination could be occurring. Furthermore, some other mechanism or mechanisms may be at work.

Growth Tip Erosion

Growth tip erosion involves atoms of iron from a catalyst peeling away from the growth tip. Those grains come into contact with other grains of iron (including, perhaps, iron vapor or iron from carbonyl decomposition), and agglomerate to form secondary growth point tips or nodes of a size sufficient to act as a catalyst nucleation site. The nucleation sites for the secondary growth are possibly formed through a process of Ostwald ripening of catalyst atoms. The agglomerated iron atoms could then catalyze additional CNT formation as further discussed below.

The secondary growth may occur as catalyst atoms (typically iron when a steel is used as the bulk catalyst) entrain on the tube walls of the primary growth through growth tip erosion and subsequently agglomerate through a process of Ostwald ripening on the surface of the primary growth carbon nanotubes to form the nucleating catalyst particles for the secondary growth. As the Ostwald ripening progresses, the agglomerations reach the threshold size that will support carbon nanotube growth, whereupon the growth is initiated which stops the further ripening of the nucleation sites thus limiting the size of the secondary growth to relatively small diameters.

Iron Vapor

The temperature and pressure inside the reactor are typically not sufficient to boil the iron catalyst. However, the conditions are sufficient that some small amount of iron atoms may vaporize. These atoms could then agglomerate into possible CNT catalyst nucleation sites, stick to the reactor walls or the side walls of the larger nanotubes, and catalyze additional CNT formation as further discussed below.

Carbonyl Decomposition

The reaction gases include carbon monoxide in the reaction gas mixture. Under reaction conditions, iron carbonyl formation seems likely. However, because of the heat and pressure in the reactor, any iron carbonyls formed are likely to quickly decompose, leaving free iron atoms in the reactor. These atoms could then agglomerate through Ostwald ripening into possible CNT catalyst nucleation sites, stick to the reactor walls or the side walls of other nanotubes, and catalyze additional CNT formation as further discussed below.

Secondary Growth

As can be surmised from considering the possible mechanisms for secondary catalyst site development, the secondary nucleation sites may be found at various, even random, places in the mass of previously formed carbon nanotubes and within the reactor. The secondary growth appears to be relatively uniform in diameter, which leads to the hypothesis that the onset of growth is almost immediate upon the nucleation sites reaching the minimum critical size.

Figure 93:
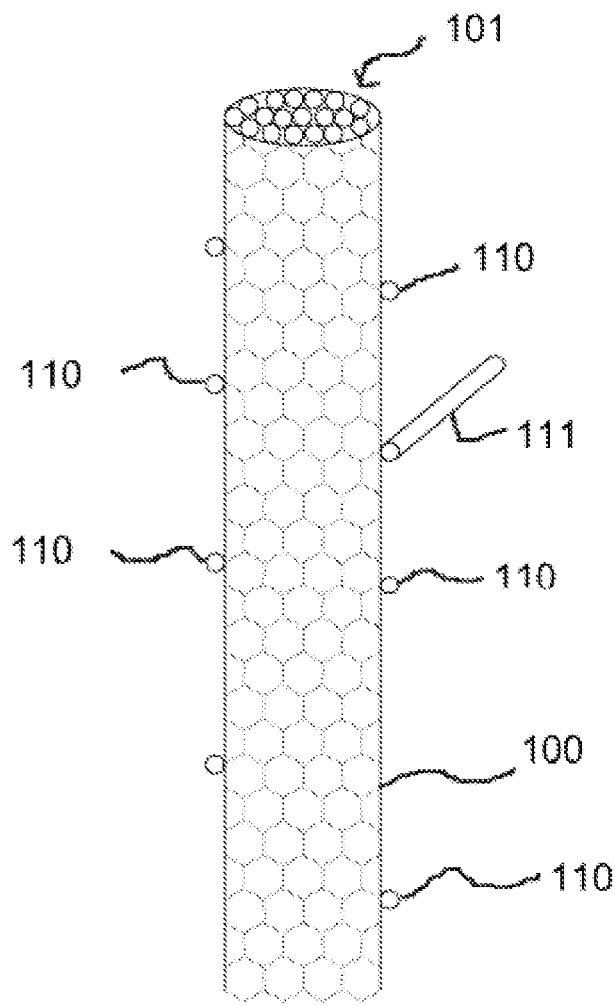
FIG. 93 depicts a schematic view of a carbon nanotube for explaining one theory of how multi-modal carbon nanotubes may be formed during the reactions disclosed and for concluding smaller diameter tubes may be chemically bonded to larger diameter nanotubes.
Figure 94:
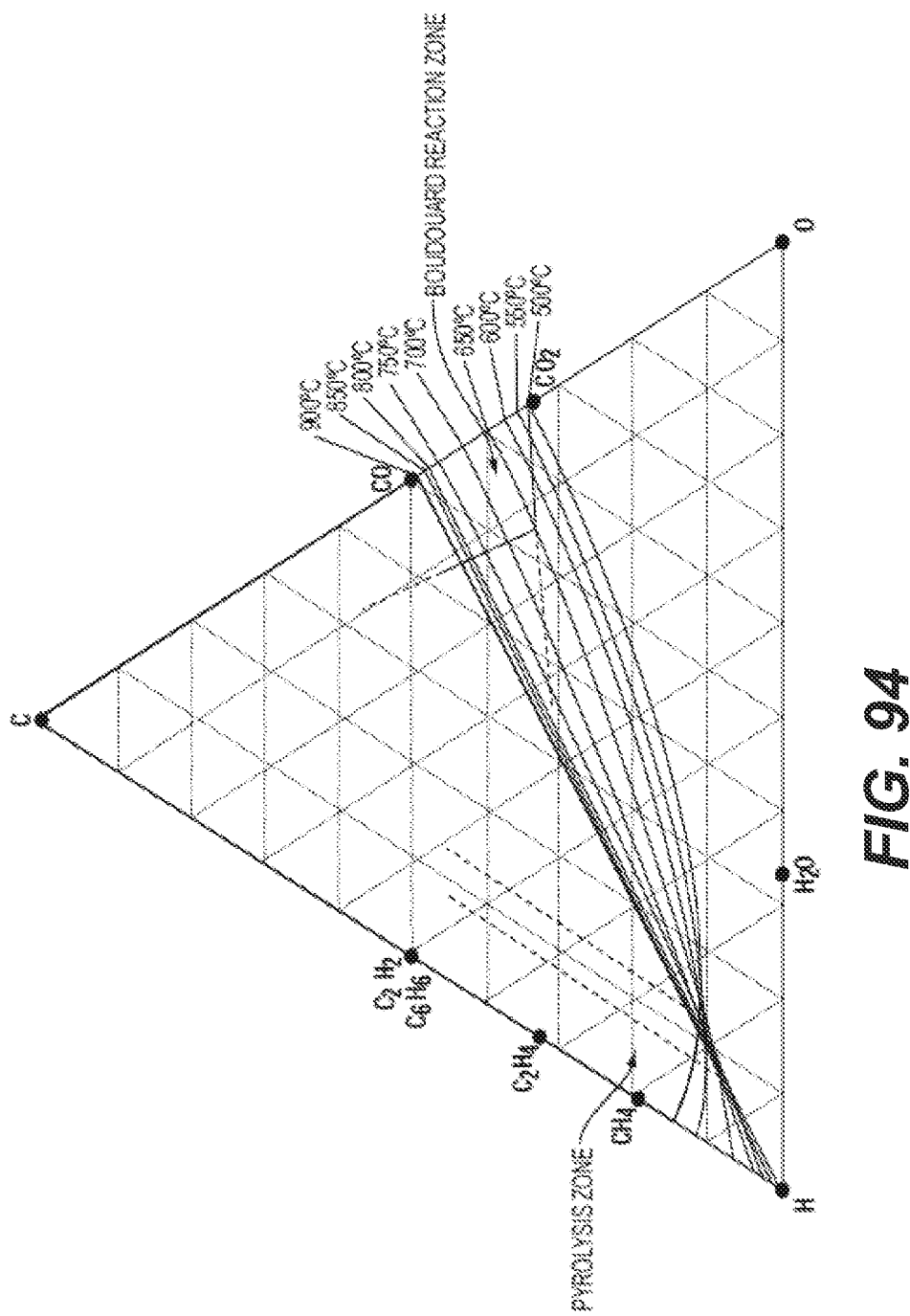
FIG. 94 depicts a C—H—O equilibrium diagram.

Although present analysis does not confirm this, it is possible that at least some of the secondary, small diameter carbon nanotubes are chemically bonded to the walls of the larger nanotubes, probably at defect sites in those walls. FIG. 93 depicts in a schematic fashion a theoretical basis of support for this premise. As depicted in FIG. 93, a larger diameter nanotube 100 grows outwardly from a catalyst surface 101, such as a sheet of steel. As the large diameter nanotube 100 grows, atoms or small agglomerations of catalyst atoms 110 such as iron detach from the catalyst sheet 101 and migrate along the nanotube 100. As mentioned above, this detachment may occur through surface migration, or by iron vapor condensing into solid iron that then agglomerates with other iron atoms, by the formation of a carbonyl such as an iron carbonyl or other catalyst containing gas or vapor which subsequently decomposes on the surface of carbon nanotubes depositing the metal atom to the surface of the carbon nanotubes, or by some combination of these or other mechanisms.

As depicted in FIG. 93, during the reaction, the agglomerated iron nanoparticles 110 may become lodged in defects in the outer wall of the carbon nanotube 100. These iron nanoparticles 110 may be, or may agglomerate through the process of Ostwald ripening to become of sufficient size to act as a nucleating particle of catalyst for additional nanotube formation. Thus, any iron nanoparticles lodged in the wall of the carbon nanotube may become a nucleation site for other carbon nanotubes 111. These other carbon nanotubes would likely be much smaller in diameter than the principle nanotube 100, and may be chemically bonded to the outer wall of the nanotube 100 because the defect may have opened bonds available to bond with the "new" nanotube.

Forest growth morphologies typically show this bi-modal distribution in size. In experiments conducted thus far, the primary growth has been the larger diameter nanotube comprising aligned carbon nanotubes perpendicular to the catalyst substrate (forming the "forest"), with the secondary population of smaller-diameter CNTs tangled within the primary growth. For example, FIG. 4 depicts forest growth with larger diameter CNTs generally aligned, and much smaller diameter CNTs intertwined in the forest growth.

FIGS. 8 and 9 depict a primary forest growth. Careful consideration of the images shows what appears to be "fuzz" about the CNTs. The apparent fuzz on the primary growth is likely to be the secondary growth. The secondary growth is often so comparatively small as to be either unobservable or to appear very fuzzy at low magnifications. However, these images illustrate the appearance of the secondary growth at approximately the magnification at which it first becomes visible in SEM images. FIGS. 10 and 11 show higher magnification images of Sample 112. As seen therein, smaller diameter CNTs are intertwined within the larger diameter "forest" growth.

The primary growth appears generally to occur in three primary morphologies: 1) "forest" growth where the primary growth is highly aligned and substantially perpendicular to the surface of the bulk catalyst; 2) "pillow" growth where the primary growth is highly entangled and appears to grow in distinct layers that look like stacked pillows; and 3) agglomerated material that is highly entangled but has no apparent structure. Typically, the secondary growth is dispersed within the primary growth material, apparently randomly oriented and highly entangled with the primary growth material. The secondary growth appears in samples of each of the three morphologies. For example, FIGS. 8-11 show this secondary growth in a forest morphology. FIGS. 12 and 13 show this secondary growth in a pillow morphology.

Thus, in some embodiments, a composition comprising a mixed population of carbon nanotubes comprises a primary population with relatively larger diameter nanotubes arranged in a substantially forest or pillow pattern, and a secondary population with relatively smaller diameter nanotubes that are highly entangled with the primary population.

The primary growth material typically appears to be multi-wall carbon nanotubes (MWCNTs), but the precise structure of the material has not been verified, in some cases because the diameter is too great for transmitting electron microscopy (TEM) to resolve the distinct walls of some of the nanotubes. It is possible that some of the primary growth material includes graphitic columns, what some literature refers to as carbon nanofibers. In any case, the structure is a fibrous material with a typical aspect ratio of approximately 500-1,000 to 1 and is composed of carbon with a minor (<5 wt % typically) catalyst residual. The presence of these other morphologies as the primary growth is intended to be included in the composition as described and claimed herein.

Thus far in the testing and evaluation, the TEM images of the secondary growth material show material with three or fewer walls and having the characteristic structure of carbon nanotubes. It is possible that the secondary growth material may have additional walls and may include carbon fibers of other morphologies. The presence of these other morphologies as the secondary growth is intended to be included in the composition as described.

FIGS. 5-7 depict, at increasing magnifications, electron microscopy images of forest growth carbon nanotubes having large diameters, with small diameter nanotubes intertwined within the larger nanotubes. As indicated by these images, the smaller diameter nanotubes appear to be single wall nanotubes.

Similarly, FIGS. 12-18 depict images of pillow growth morphology carbon nanotubes. As can be seen, for example in FIGS. 12 and 13, the pillow growth nanotubes comprise large diameter nanotubes with smaller diameter nanotubes intertwined within the larger nanotubes. Experiments indicate that the bi-modal carbon nanotube mixture combines the properties of both the larger and the smaller diameter nanotubes. For example, as indicated in Table 1, tests of a bi-modal forest growth conducted by the University of Dayton Research Institute indicate superior electrical conductivity for the bi-modal carbon nanotube samples tested. Sample 112 had a four point resistivity at 87.6 kPa (12.7 psi) of 0.223 Ohms-cm compared to 0.262 Ohms-cm and above for typical materials tested.

TABLE 1

| | Electrical Resistivity | | | |
|---|---|---|---|---|
| Pressure (gauge): | 87.6 kPa P (Ohms-cm) | D (kg/cubic m) | 29.0 kPa P (Ohms-cm) | D (kg/cubic m) |
| Sample 85 | 0.367 | 595.1 | 0.989 | 472.1 |
| Sample 112 | 0.223 | 579.7 | 0.527 | 410.4 |
| Third party sample 1 | 0.273 | 171.3 | 0.348 | 109.3 |
| Third party sample 2 | 0.262 | 264.2 | 0.389 | 151.0 |

The bi-modal materials thus may deliver the greater strength of the larger diameter CNTs and the enhanced thermal and electrical conductivity of the smaller diameter CNTs in many applications.

The bi-modal material appears to be easily wetted and dispersed. This may be due to the variety of sizes in the material that result in percolation paths of various sizes through the bulk material. These percolation paths may allow the solvent or matrix material to infuse the agglomerated material more easily. Regardless of specific mechanism, this property may make the bi-modal material useful in dispersions and infusions.

Separation of the two size populations could result in two grades of material corresponding to each of the bi-modal populations, assuming that if the smaller nanotubes are chemically bonded to the outer walls of the larger diameter nanotubes, this chemical bond may be broken without destroying the material. Such separations may be done, for example, by dispersing the bi-modal material, centrifugal separation of the populations, and withdrawing the separated populations from the centrifuge. Separation may prove to be an economical means of developing high volume single-wall CNT production by growing the single-wall CNTs in a bi-modal mix with subsequent separation.

Therefore, the compositions and methods disclosed herein have several advantages over prior compositions and methods. Although specific embodiments of the disclosed compositions and methods are described herein, various modifications and changes may be made by those skilled in the art without departing from the spirit and scope of the invention.

The invention claimed is:

1. A method of producing a mixture of carbon nanotubes having a bi-modal size distribution, the method comprising:
   mixing a carbon dioxide gas stream and a reducing agent gas stream to form a reaction gas mixture comprising greater than about 90 percent reducing gas;
   introducing the reaction gas mixture to a reaction vessel containing a solid stainless steel catalyst at a reaction temperature within a range of from about 450° C. to about 900° C. and a reaction pressure within a range of from about 53 kPa to about 133 kPa;
   reacting the reaction gas mixture in the presence of the solid stainless steel catalyst to form a bi-modal distribution of carbon nanotubes exhibiting a forest morphology and comprising larger, multi-walled carbon nanotubes having an average diameter within a range of from about 80 nm to about 150 nm and smaller, single-walled nanotubes having an average diameter less than or equal to about 25 nm;

recycling a tail gas from the reaction vessel into the reaction gas mixture; and removing the carbon nanotubes from the reaction vessel.

2. The method of claim 1, wherein the solid stainless steel catalyst comprises a material selected from the group consisting of stainless steel 304 and stainless steel 316L.

3. The method of claim 1, wherein recycling a tail gas from the reaction vessel into the reaction gas mixture comprises:

directing the tail gas into a cyclone separator to remove the carbon nanotubes from the tail gas and form a cleaned tail gas;

cooling the cleaned tail gas to condense and remove at least some water vapor present in the cleaned tail gas to form a de-watered tail gas, an amount of water vapor in the de-watered tail gas selected to effectuate a partial pressure of water vapor in the reaction gas mixture promoting carbon nanotube formation during the reaction of the reaction gas mixture; and directing the de-watered tail gas into the reaction gas mixture.

4. The method of claim 1, where mixing a carbon dioxide gas stream and a reducing agent gas stream to form a reaction gas mixture comprising greater than or equal to about 90 percent reducing gas comprises forming the reaction gas mixture to comprise greater than 90 percent hydrogen and less than 10 percent carbon oxides.

5. The method of claim 1, wherein removing the carbon nanotubes from the reaction vessel comprises:

directing a reactor tail gas stream comprising the carbon nanotubes and the tail gas into a cyclone separator to separate the carbon nanotubes from the tail gas; and directing the separated carbon nanotubes through a cooling apparatus to remove residual gases therefrom.

6. The method of claim 5, further comprising directing the tail gas separated from the carbon nanotubes into a heat exchanger in communication with the reaction gas mixture to transfer heat to the reaction gas mixture.

7. A method for producing a mixture of carbon nanotubes having a bi-modal size distribution, the method comprising:

mixing a carbon dioxide gas stream and a reducing agent gas stream to form a reaction gas mixture comprising greater than about 90 percent hydrogen;

passing the reaction gas mixture into a reaction vessel containing a solid stainless steel catalyst at a reaction temperature greater than or equal to about 600° C. and a reaction pressure greater than or equal to about 53 kPa, the solid catalyst comprising an unsupported iron-based catalyst in which iron is not present in the alpha phase;

reacting the reaction gas mixture in the presence of the solid catalyst to form a bi-modal distribution of carbon nanotubes exhibiting a forest morphology and comprising larger, multi-walled carbon nanotubes having an average diameter within a range of from about 80 nm to about 150 nm, and smaller, single-walled nanotubes bonded to the larger, multi-walled carbon nanotubes and having an average diameter less than or equal to about 25 nm;

continuously maintaining a partial pressure of water vapor in the reaction vessel at a level effectuating a carbon activity level promoting the formation of the carbon nanotubes; and removing the carbon nanotubes from the reaction vessel; and subjecting the carbon nanotubes to a centrifugal separation process to break the bonds between the larger, multi-walled carbon nanotubes and the smaller, single-walled nanotubes.

8. The method of claim 7, wherein the iron is in a substantially non-oxidized state.

9. The method of claim 8, wherein the iron is in a reduced state.

10. The method of claim 7, wherein the solid catalyst comprises at least one form selected from the group consisting of a sheet, a plate, a wire, a wafer, a cylinder, and a fiber.

11. The method of claim 7, wherein the solid catalyst comprises at least one form selected from the group consisting of shavings, particles, shot, grit, and powder.

12. The method of claim 7, wherein the solid catalyst comprises a material selected from the group consisting of stainless steel 304 and stainless steel 316L.

13. The method of claim 7, wherein the reaction pressure is about 133 kPa.

14. A method comprising:

mixing carbon dioxide gas and a reducing agent gas to form a reaction gas mixture comprising greater than about 90 percent of the reducing agent gas;

introducing the reaction gas mixture to a reaction vessel containing a solid stainless steel catalyst at a reaction temperature within a range of from about 600° C. to about 950° C. and a reaction pressure within a range of from about 53 kPa to about 133 kPa;

reacting at least a portion of the carbon dioxide gas of the reaction gas mixture with at least a portion of the reducing agent gas of the reaction gas mixture in the presence of the solid stainless stain catalyst to form a tail gas comprising a bi-modal size distribution of carbon nanotubes exhibiting a forest morphology and comprising larger, multi-walled carbon nanotubes extending substantially parallel to one another having an average diameter within a range of from about 80 nm to about 150 nm, and smaller, single-walled nanotubes extending in one or more different directions than the larger, multi-walled carbon nanotubes and having an average diameter less than or equal to about 10 nm;

removing the carbon nanotubes and water vapor from the tail gas to form an at least partially de-watered tail gas; and recycling the at least partially de-watered tail gas into the reaction gas mixture.

15. The method of claim 14, wherein removing the carbon nanotubes and water vapor from the tail gas comprises:

directing the tail gas into a cyclone separator to remove the carbon nanotubes from the tail gas and form a cleaned tail gas; and removing at least a portion of water vapor present in the cleaned tail gas to form the at least partially de-watered tail gas, an amount of water vapor remaining in the de-watered tail gas selected to maintain a partial pressure of water vapor in the reaction gas mixture upon recycling the at least partially de-watered tail gas into the reaction gas mixture.

16. The method of claim 15, further comprising selecting the partial pressure of water vapor in the reaction gas mixture to promote carbon nanotube formation during the reaction of the carbon oxide gas of the reaction gas mixture with at least the reducing agent gas of the reaction gas mixture.

* * * * *